United States Patent
Yan et al.

(10) Patent No.: US 9,680,160 B2
(45) Date of Patent: Jun. 13, 2017

(54) EXTENDED TWO DIMENSIONAL METAL NANOTUBES AND NANOWIRES USEFUL AS FUEL CELL CATALYSTS AND FUEL CELLS CONTAINING THE SAME

(75) Inventors: Yushan Yan, Hockessin, DE (US); Shaun Alia, Lakewood, CO (US)

(73) Assignee: The Regents of The University of California, Oakland, CA (US)

(*) Notice: Subject to any disclaimer, the term of this patent is extended or adjusted under 35 U.S.C. 154(b) by 670 days.

(21) Appl. No.: 13/884,220

(22) PCT Filed: Nov. 8, 2011

(86) PCT No.: PCT/US2011/059815
§ 371 (c)(1),
(2), (4) Date: Jun. 6, 2013

(87) PCT Pub. No.: WO2012/064768
PCT Pub. Date: May 18, 2012

(65) Prior Publication Data
US 2013/0260282 A1  Oct. 3, 2013

Related U.S. Application Data

(60) Provisional application No. 61/411,069, filed on Nov. 8, 2010, provisional application No. 61/411,074, filed
(Continued)

(51) Int. Cl.
*H01M 4/92* (2006.01)
*B82Y 30/00* (2011.01)
(Continued)

(52) U.S. Cl.
CPC ............ *H01M 4/92* (2013.01); *B01J 23/38* (2013.01); *B01J 35/0013* (2013.01); *B01J 37/16* (2013.01);
(Continued)

(58) Field of Classification Search
None
See application file for complete search history.

(56) References Cited

U.S. PATENT DOCUMENTS

2005/0229744 A1   10/2005  Kijima
2006/0032329 A1*   2/2006  Rubinstein et al. ............ 75/255
(Continued)

FOREIGN PATENT DOCUMENTS

CN        1678514 A    10/2005
CN     101607197 A    12/2009
(Continued)

OTHER PUBLICATIONS

Chinese Application Serial No. 201180064500.6, Office Action mailed Feb. 4, 2015, (English Translation), 17 pgs.
(Continued)

*Primary Examiner* — Jeremiah Smith
(74) *Attorney, Agent, or Firm* — Schwegman Lundberg & Woessner, P.A.

(57) ABSTRACT

Metal nanotubes are provided comprising a composition having formula $(M_1)NT$: wherein $M_1$=Pt, Pd, or Au; wherein the nanotubes have: a wall thickness of from 2 to 12 nm; an outer diameter of from 30 to 100 nm; and a length of from 5 to 30 μm. Metal nanowires are also provided comprising a composition having formula $(M_2)NW$: wherein $M_2$=Ag or Cu; wherein when $M_2$=Ag, the nanowires have a diameter of from 25 to 60 nm and a length of from 1 to 10 μm; and when $M_2$=Cu, the nanowires have a diameter of from 50 to 100 nm and a length of from 10 to 50 μm. In other embodiments, fuel cells are also described having at least one anode; at least one cathode; an electrolyte membrane between the at least one anode and at least one cathode; and a catalyst comprising either of the above described metal nanotubes or nanowires.

11 Claims, 36 Drawing Sheets

Related U.S. Application Data on Nov. 8, 2010, provisional application No. 61/422,023, filed on Dec. 10, 2010, provisional application No. 61/411,077, filed on Nov. 8, 2010.

(51) Int. Cl.

| | | |
|---|---|---|
| *H01M 4/90* | (2006.01) | |
| *B01J 37/16* | (2006.01) | |
| *B01J 23/38* | (2006.01) | |
| *B01J 35/00* | (2006.01) | |
| *H01M 8/1018* | (2016.01) | |

(52) U.S. Cl.
CPC ........... *B82Y 30/00* (2013.01); *H01M 4/9041* (2013.01); *H01M 2008/1095* (2013.01); *Y10S 977/762* (2013.01)

(56) References Cited

U.S. PATENT DOCUMENTS

| | | | |
|---|---|---|---|
| 2006/0039848 A1* | 2/2006 | Matarredona et al. | 423/447.1 |
| 2007/0037696 A1* | 2/2007 | Gorer | B01J 23/44 502/177 |
| 2008/0182155 A1* | 7/2008 | Choi et al. | 429/44 |
| 2009/0220835 A1* | 9/2009 | Yushan et al. | 429/30 |

FOREIGN PATENT DOCUMENTS

| | | |
|---|---|---|
| CN | 101857217 A | 10/2010 |
| EP | 1550632 A1 | 7/2005 |
| WO | WO-2007100811 A2 | 9/2007 |

OTHER PUBLICATIONS

Chinese Application Serial No. 201180064500.6, Office Action mailed Nov. 26, 2015, 4 pgs.

European Application Serial No. 11788670.5, Amendment filed Jan. 20, 2014, 7 pgs.

European Application Serial No. 11788670.5, Office Action mailed Mar. 27, 2014, 6 pgs.

European Application Serial No. 11788670.5, Office Action mailed Nov. 4, 2015, 1 pg.

European Application Serial No. 11788670.5, Response filed Jan. 14, 2015 to Office Action mailed Nov. 4, 2015, 11 pgs.

International Application Serial No. PCT/US2011/059815, International Preliminary Report on Patentability mailed May 23, 2013, 8 pgs.

International Application Serial No. PCT/US2011/059815, International Search Report mailed Sep. 14, 2012, 5 pgs.

International Application Serial No. PCT/US2011/059815, Written Opinion mailed Sep. 14, 2012, 6 pgs.

Alia, Shaun M, et al., "Porous Platinum Nanotubes for Oxygen Reduction and Methanol Oxidation Reactions", Advanced Functional Materials, 20(21), (2010), 3742-3746.

Chen, Zhongwei, et al., "Supportless Pt and PtPd Nanotubes as Electrocatalysts for Oxygen-Reduction Reactions", Angewandte Chemie International Edition, 46(22), (May 25, 2007), 4060-4063.

Kostowskyj, M. A, et al., "Silver nanowire catalysts for alkaline fuel cells", International Journal of Hydrogen Energy, 33(20), (2008), 5773-5778.

Lu, Xiafeng, et al., "Noble-Metal Nanotubes Prepared via a Galvanic Replacement Reaction Between Cu Nanowires and", Science of Advanced Materials, 2, (2010), 413-420.

Robertson, Nicholas J, et al., "Tunable High Performance Cross-Linked Alkaline Anion Exchange Membranes for Fuel Cell Applications", J. Am. Chem. Soc., 132(10), (2010), 3400-3404.

Shin, Tae-Yeon, et al., "Gold nanotubes wit a Nanoporous Wall: Their Ultrathin Platinum Coating and Superior Electrocatalytic Activity toward Methanol Oxidation", Chemistry of Materials, (Sep. 2, 2008).

Shin, Tae-Yeon, et al., "Gold Nanotubes with a Nanoporous Wall: Their Ultrathin Platinum Coating and Superior Electrocatalytic Activity toward Methanol Oxidation", Chem. Mater., 20(17), (2008), 5682-5686.

Zhang, J., et al., "Platinum Monolayer Electrocatalysts for O2 Reduction:? Pt Monolayer on Pd(111) and on Carbon-Supported Pd Nanoparticles", J. Phys. Chem. B, 108(30), (2004), 10955-10964.

Chinese Application Serial No. 201180064500.6, Office Action mailed Jul. 5, 2016, (w/ English Translation), 18 pgs.

Xu, Guorong, et al., "Fabrication of Cu Nanowires Arrays in porous anodic alumina templates", (w/ English Abstract), *Functional Materials*, vol. 38, (Mar. 20, 2007), 459-461.

Chinese Application Serial No. 201180064500.6, Office Action mailed Mar. 1, 2017, (English Translation), 7 pgs.

\* cited by examiner

EXTENDED TWO DIMENSIONAL METAL NANOTUBES AND NANOWIRES USEFUL AS FUEL CELL CATALYSTS AND FUEL CELLS CONTAINING THE SAME

CROSS REFERENCE TO RELATED APPLICATIONS

The present application is related to, and claims priority to, U.S. Ser. Nos. 61/411,069, filed Nov. 8, 2010; 61/411,074, filed Nov. 8, 2010; 61/422,023, filed Dec. 10, 2010; and 61/411,077 filed on Nov. 8, 2010, the entire contents of each of which are hereby incorporated by reference.

BACKGROUND OF THE INVENTION

Field of the Invention

The present invention relates to metal nanotubes and metal nanowires useful as fuel cell catalysts, particularly in proton or hydroxide exchange membrane fuel cells, and fuel cells comprising the catalysts.

Description of the Related Art

Optimizing energy demand within the transportation field is a significant worldwide concern and especially crucial within the United States (US). The transportation sector globally accounts for 20% of energy demand and relies heavily on fossil fuels.[1] In 2008, oil prices reached historic levels in part due to a strong increase in demand for transportation fuels.[2] Transportation is of particular concern in the US as the US accounts for 28% of worldwide transportation energy consumption.[3] Within US energy, 29% (27.03 quadrillion BTUs) is consumed in transportation and 83% is supplied by fossil fuels.[3, 4] Though the US is the primary user of fossil-fuel based transportation, from a global perspective, continual increases in worldwide demand will strain fuel cost. It is anticipated that developing nations, or countries identified within the non-Organization for Economic Cooperation and Development group, will significantly contribute with an annual inflation rate of 2.6% in transportation energy demands (2007-2035).[1]

Although a timeline for global peak oil production is not universally accepted, it is generally understood that peak oil production among countries outside of the Organization of Petroleum Exporting Countries has already passed, compromising energy security and impacting fuel costs.[5] For example, the US currently produces (5.3 million barrels per day in 2009) 55% of its peak (1970) production, but the US petroleum demand continued to increase by 19% over the same time frame.[3] In an effort to lessen the burden of fossil fuels on the transportation field, fuel cells have been examined as a potential technology to develop non-fossil fuel based transportation devices.

Fuel Cell Structure and Electrolyte Membranes

FIG. 57 illustrates a typical fuel cell with an anode portion (illustrated on the left) and a cathode portion (illustrated here on the right) which are separated by an electrolyte; supporting members are not illustrated. The anode portion carries out an anode half-reaction which oxidizes fuel releasing electrons to an external circuit and producing oxidized products; the cathode portion carries out a cathode half-reaction which reduces an oxidizer consuming electrons from the external circuit. The gas diffusion layers (GDL) serve to deliver the fuel and oxidizer uniformly across the catalyst layer. Charge neutrality is maintained by a flow of ions from the anode to the cathode for positive ions and from cathode to anode for negative ions. The dimension illustrated is for convenience and is not representative, as the electrolyte membrane is usually selected to be as thin as possible consistent with membrane structural integrity.

In the case of the illustrated hydroxide exchange membrane fuel cell (HEMFC), the anode half-reaction consumes fuel and $OH^-$ ions and produces waste $H_2O$ (also $CO_2$ in the case of carbon containing fuels); the cathode half reaction consumes $O_2$ and produces $OH^-$ ions; and $OH^-$ ions flow from the cathode to the anode through the electrolyte membrane. Fuels are limited only by the oxidizing ability of the anode catalyst but typically can include $H_2$, MeOH, EtOH, ethylene glycol, glycerol, and similar compounds. Catalysts are usually Pt or based on Ag or one or more transition metals, e.g., Ni. In the case of a PEMFC, the anode half-reaction consumes fuel and produces $H^+$ ions and electrons; the cathode half reaction consumes $O_2$, $H^+$ ions, and electrons and produces waste $H_2O$; and $H^+$ ions (protons) flow from the anode to the cathode through the electrolyte membrane. For such fuel cells, fuels are most commonly $H_2$ and MeOH.

PEMFCs have been identified as a transformative technology intended to create a new paradigm in the way energy is used. Although not limited to the transportation field, PEMFCs are well suited as transportation devices due to a low operation temperature and high energy density. Commercialization of this technology is principally limited by high material costs and low catalyst durability.[6, 7] These obstacles hinder the technology's application in the transportation field as they pose significant technological and financial risks to industry. In order overcome such developmental obstacles and to advance PEMFC commercialization, a technological breakthrough is required.

Utilizing hydrogen has allowed for such a breakthrough as it has resulted in the diversification of energy sources and production methodology; methods of hydrogen production include, but are not limited to fossil fuel reformation, the Kværner-process, electrolysis, solar, nuclear, and biological. As a beneficial PEMFC fuel source, hydrogen has an extraordinarily high specific energy density (Table 1) resulting in fuel cell vehicles that can provide the same output as conventional combustion engine vehicles while using half the energy input.[8-10] Estimations of the Government Performance and Results Act conclude that oil savings of 5.3 million barrels per day can be achieved from the use of light duty fuel cell transportation vehicles by 2050, assuming a 37% market penetration.[11]

TABLE 1

Specific energy densities of selected fuel sources.

|  | $W_e$ [MJ kg$^{-1}$] | $W_e$ [MJ L$^{-1}$] |
| --- | --- | --- |
| Hydrogen, g | 142.0 | 0.013 |
| Methanol | 21.9 | 17.3 |
| Ethanol | 28.8 | 22.7 |
| Ethylene glycol | 19.0 | 21.2 |
| Gasoline, auto | 45.8 | 33.9 |
| Natural gas | 46.6 | 0.037 |
| Coal, anthracite | 31.4 | 35.0 |

Since PEMFCs combine hydrogen and oxygen to produce the power output, water is the only emission. Previous studies have established that carbon dioxide generation can be significantly reduced using fossil fuels for hydrogen production in fuel cells as opposed to transportation utilizing fossil fuels directly.[12] Greenhouse gas emissions from hydrogen production are generated at a single point instead of at each end use application. Thus, on the occasion that fossil fuels are used for hydrogen production, the formation of greenhouse gases can be properly treated or sequestered at the singular production site. Overall, utilizing PEMFC based transportation would result in an end use application that is a zero emission entity—entirely eliminating any greenhouse gas emission contributions. An analysis conducted on a well-to-wheels basis asserted that fuel cell vehicles produced from fossil fuels produce 42% and 60% less carbon than hybrid electric and conventional internal combustion engine vehicles, respectively.[13]

In addition to PEMFCs, alternative fuel cell configurations traditionally include, but are not limited to solid oxide, alkaline, and direct alcohol fuel cells. Among these options, PEMFCs are the most suitable for the transportation field: solid oxide fuel cells require high temperatures for efficient operation; liquid alkaline electrolyte use requires a closed environment; and alcohols have a specific energy density less than hydrogen and traditional transportation fuels (Table 1).

PEMFCs utilize Pt for ORR and the hydrogen oxidation reaction (HOR). For PEMFC development, highly active cathode catalysts are of particular interest since the overpotential for ORR is significantly larger than HOR; it has previously been suggested that the stability of adsorbed oxygen at high potentials prevents proton and electron transfer and creates the observed ORR overpotential.[14, 15] Pt is regarded as the most active ORR catalyst, in part due to a nearly optimal binding energy with oxygen and hydroxide.[16] Although non Pt and non noble metal catalysts have been examined, larger overpotentials are generally observed, particularly in an acidic electrolyte.[17, 18] Early Pt development, therefore, focused on the reduction of particle size to 2-3 nm, thereby increasing surface area and ORR mass activity. The reduction in particle size, however, decreased the ORR specific activity and the improvements in mass activity were disproportionate to the surface area.[19, 20] Therefore, further particle size reduction cannot ensure the commercial viability of PEMFCs. In order to promote the development of Pt catalysts with high ORR activity, the DOE set benchmarks (2010-2015) for mass (0.44 $Amg^{-1}$) and specific (0.72 $mAcm^{-2}$) activity.

In addition to cost concerns, PEMFC commercialization is also limited by catalyst durability. The loss of ORR activity and surface area in PEMFC cathodes has been studied previously; Pt/C degradation can be categorized into the following areas: erosion of the carbon support; surface tension driven nanoparticle agglomeration; Ostwald ripening; and potential driven Pt dissolution and migration into the membrane.[21]

Recent developments of Pt nanomaterials have led in two promising directions: extended Pt networks that can improve ORR activity and durability; and Pt films that can decrease the catalyst cost.[22-26] Sun and Wang et al. recently synthesized Pt tetrahexahedrons, tailored from 20 nm to 240 nm in diameter by the electrochemical treatment of nanospheres; although the tetrahexahedrons were not studied for catalytic activity, the synthesis allowed for controlled facet growth.[22] Xia et al. studied Pt Pd nanodendrites, approximately 20 nm in diameter; the ORR activity, however, does not meet the DOE benchmarks and catalyst durability suffered due to the presence of Pd.[23] In Pt coatings, Adzic and Mavrikakis et al. electrochemically applied Pt monolayers to films of ruthenium, iridium, rhodium, gold, and Pd, finding improved ORR activity in the case of Pd.[24] Adzic et al. further applied a Pt layer to cobalt (Co) Pd core shell nanoparticles, thereby improving ORR activity.[25] Nørskov et al. also examined polycrystalline Pt films alloyed with Co, nickel, iron, vanadium, and titanium.[26] While the specific ORR activity of the $Pt_3Co$ film was three times greater than pure Pt, each of the preceding publications required electrochemical synthesis and is impractical in an industrial setting. Additionally, fundamental studies were previously conducted on Pt facet activity and lattice tuning. Marković et al. found that ORR activity on low index Pt surfaces increased in the order $\{100\}<\{111\}<\{110\}$.[27] Mukerjee et al. also modified Pt—Pt bond distances and d-orbital vacancies with the introduction of metal alloys; it was determined that lattice and electronic tuning impacted ORR activity.[28]

SUMMARY OF THE INVENTION

In one embodiment, metal nanotubes are provided comprising a composition having formula $(M_1)NT$: wherein $M_1$=Pt, Pd, or Au; wherein the nanotubes have: a wall thickness of from 2 to 12 nm; an outer diameter of from 30 to 100 nm; and a length of from 5 to 30 μm.

In an embodiment, the wall thickness of the nanotubes is from 3 to 11 nm.

In another embodiment, the outer diameter of the nanotubes is from 30 to 80 nm.

In an embodiment, the length of the nanotubes is from 5 to 20 μm.

In an embodiment, $M_1$ can be either Pt, Pd, or Au.

In an embodiment the metal nanotubes have a loading of Pt in an amount of from 5 to 20 wt % on a surface of the metal nanotubes.

In an embodiment the metal nanotubes are formed of an alloy of Pt.

In an embodiment, the metal nanotubes have wall thickness of from 3 to 8 nm, outer diameter of from 30 to 80 nm, and length of from 5 to 30 μm.

In an embodiment, the metal nanotubes comprise porous Pt.

In an embodiment, the metal nanotubes are formed by galvanic displacement of a metal nanowire $(M_2)NW$, where $M_2$=Ag or Cu.

In one embodiment, metal nanowires are provided comprising a composition having formula $(M_2)NW$: wherein $M_2$=Ag or Cu; wherein when $M_2$=Ag, the nanowires have a diameter of from 25 to 60 nm and a length of from 1 to 10 μm; and when $M_2$=Cu, the nanowires have a diameter of from 50 to 100 nm and a length of from 10 to 50

In an embodiment $M_2$=Ag or Cu.

In an embodiment, the metal nanowires further comprise a Pt loading of from 1 to 20 wt % on a surface thereof.

In one embodiment, a fuel cell is provided comprising: at least one anode; at least one cathode; an electrolyte membrane between the at least one anode and at least one cathode; and a catalyst comprising the metal nanotubes as described herein.

In one embodiment, a fuel cell is provided comprising: at least one anode; at least one cathode; an electrolyte membrane between the at least one anode and at least one cathode; and a catalyst comprising the metal nanowires as described herein.

In an embodiment, the fuel cell is a proton exchange membrane fuel cell.

In an embodiment, the fuel cell is a hydroxyl exchange membrane fuel cell.

In an embodiment, the fuel cell is a proton exchange membrane fuel cell.

In an embodiment, the fuel cell is a hydroxyl exchange membrane fuel cell.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
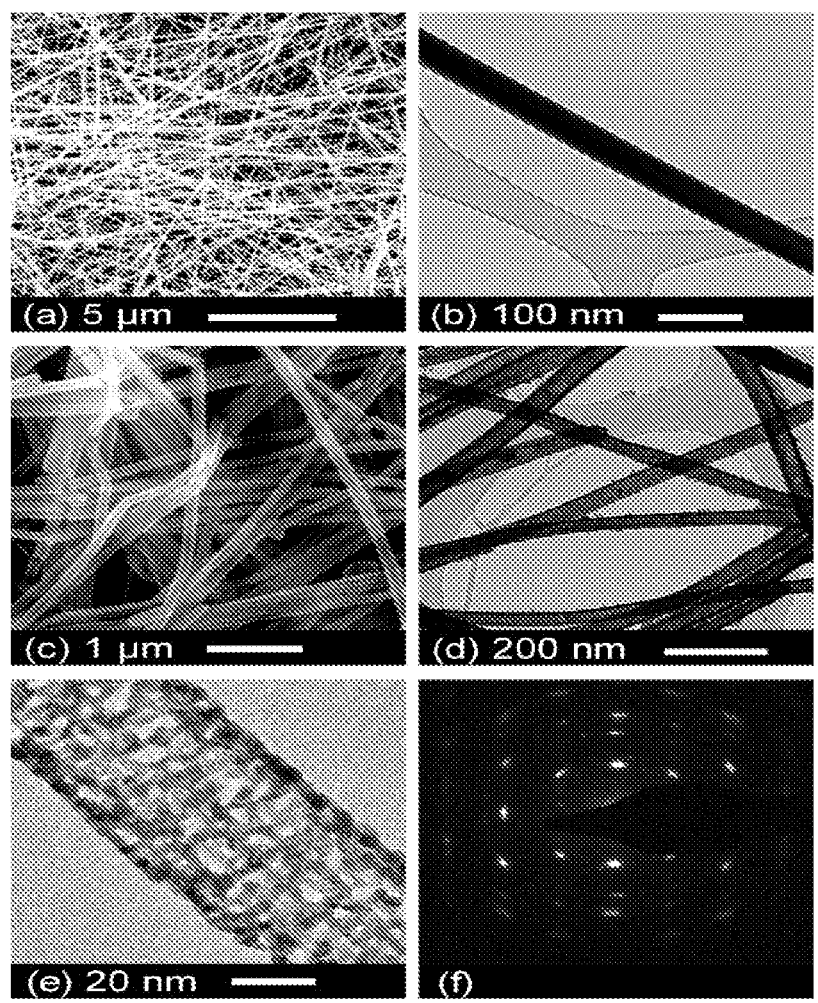
FIG. 1. a) SEM image of AgNWs; b) TEM image of AgNWs; c) SEM image of PPtNTs; d) TEM image of PPtNTs; e) HRTEM image of PPtNTs; and f) selected area diffraction pattern of PPtNTs. This pattern contained an interpenetrated set of two individual diffraction patterns, with the one in square symmetry corresponding to the [001] zone axis and the other one in rectangular symmetry corresponding to the [−112] zone axis. The mutual orientation of these two zones induced the generation of double diffraction, which accounts for the remaining spots.[51]

The present invention relates to metal nanotubes and metal nanowires useful as catalysts, particularly in fuel cells. The metal nanotubes of the present invention comprise a composition having formula $(M_1)NT$, wherein $M_1$=Pt, Pd, or Au; wherein the nanotubes have: a wall thickness of from 2 to 12 nm, preferably 3 to 11 nm; an outer diameter of from 30 to 100 nm, preferably 30 to 80 nm; and a length of from 5 to 30 μm, preferably 5 to 20 μm.

In one preferred embodiment, the metal nanotubes have $M_1$=Pd, and further comprise a loading of Pt in an amount of from 5 to 20 wt % on a surface of the Pd nanotubes. In other embodiments, the metal nanotubes are formed of an alloy of the metal M1, particularly alloys of Pt. In a particularly preferred embodiment, the metal nanotubes are Pt nanotubes (PtNT) having wall thickness of from 3 to 8 nm, outer diameter of from 30 to 80 nm, and length of from 5 to 30 μm. In further preferred embodiments, the PtNT is a porous PtNT (PPtNT). The metal nanotubes can preferably be formed by galvanic displacement of a metal nanowire $(M_2)NW$, where $M_2$=Ag or Cu.

The present invention further provides catalysts that are metal nanowires comprising a composition having formula $(M_2)NW$, wherein $M_2$=Ag or Cu; wherein when $M_2$=Ag, the nanowires have a diameter of from 25 to 60 nm and a length of from 1 to 10 μm; and when $M_2$=Cu, the nanowires have a diameter of from 50 to 100 nm and a length of from 10 to 50 μm. In a preferred embodiment, the metal nanowires further comprise a Pt loading of from 1 to 20 wt % on a surface thereof.

The metal nanotubes and metal nanowires of the present invention are useful as catalysts in membrane fuel cells, such as proton exchange membrane fuel cells (PEMFCs) or hydroxyl exchange membrane fuel cells (HEMFCs). The structure of such fuel cells are well known to those of ordinary skill in the art. The electrolyte membranes used in such fuel cells are also well known to those of ordinary skill in the art. Particularly preferred as such membranes are the electrolyte membranes disclosed in U.S. Pat. Nos. 7,691,514; 7,829,620; US Published Applications 2006/0088741; 2010-0159305; 2004/0167014; 2009/0220835; and U.S. application Ser. Nos. 13/123,477 and 13/091,122.

As further preferred embodiments of the present invention, fuel cells are provided having the metal nanotubes or metal nanowires of the present invention as catalysts.

The catalysts of the present invention should be understood as being useful for PEM anode and cathode applications as well as HEM anode and cathode applications. Even when this application or the materials incorporated by reference discuss a catalyst in connection with one or more specific applications, a skilled artisan should understand that the catalysts may also be deployed on the other of the anode and cathode and in both PEM and HEM systems and in various types of cells, including fuel cells, gas separation cells, electrolyzers, and solar hydrogen cells.

Although a significant amount of promising fundamental work has been completed in this area, literature is void of the solution synthesis of Pt nanomaterials capable of exceeding the DOE benchmarks for ORR activity. In order to accomplish this task, Pt catalysts were examined in three sections: Pt nanotubes (PtNTs) with improved ORR activity and durability characteristics to Pt/C; Pt/PdNTs with ORR activity exceeding the DOE benchmarks; and Pt/CuNWs with improved ORR activity and durability characteristics to Pt/PdNTs. Through the evaluation of the aforementioned sections, the trajectory of PEMFC commercialization can be outlined. As found in the following studies, the ORR activity and durability of Pt catalysts can be dramatically improved with the use of extended surfaces, thereby reducing the technological barrier to PEMFC deployment.

Additionally, HEMFC catalysts were studied as an alternative to PEMFCs. In contrast to alkaline fuel cells, HEMFCs utilize a solid polymer electrolyte thereby eliminating the liquid electrolyte and the need for a closed environment. HEMFCs have recently been developed as a potential replacement for PEMFCs, allowing for the use of non-precious metal catalysts in place of Pt. The current technological barriers impacting HEMFC commercialization includes the development of stable membranes with high hydroxide conductivity, ionomers with a controllable solubility, and non-precious metal catalysts with high activity and durability for ORR and HOR. Although membranes with hydroxide conductivity and stability have been studied, catalyst development has been limited and requires significant improvement to ensure HEMFC deployment.[29-38] Due to the higher ORR overpotential relative to HOR in an alkaline environment, ORR catalysts were developed to lessen the technological barrier to HEMFC deployment.[39, 40] AgNWs and Ag nanoparticles (AgNPs) were examined to address inadequacies in literature and determine the optimal morphology for ORR. Due to the low specific activity of Ag, PdNTs were developed with an ORR activity competitive to Pt, illustrating the benefit of the alkaline environment.

Additionally, DAFCs were studied as an alternative energy device. Although alcohols have a relatively low specific energy density and are not ideal in the transportation field, DAFCs use a convenient liquid fuel and are useful in portable electronics. The oxidation of alcohol, however, requires a higher overpotential than HOR; supported Pt ruthenium nanoparticles (PtRu/C) are typically utilized due to the high alcohol oxidation activity of Pt and the low redox potential of ruthenium. PtNTs were examined for methanol oxidation to demonstrate that the extended surface improved the activity for alcohol oxidation in addition to ORR. PdNTs were also studied for methanol, ethanol, and ethylene glycol oxidation in an HEMFC, since the alkaline electrolyte also reduces the overpotential for alcohol oxidation.

Porous Platinum Nanotubes for Oxygen Reduction and Methanol Oxidation Reactions

Platinum supported on carbon (Pt/C) is often the commercial electrocatalyst used in proton exchange membrane fuel cells (PEMFCs). Small Pt particles (2-3 nm in diameter) are used due to their high specific surface area and thus typically high mass activity. The carbon support spaces the particles to prevent agglomeration. Commercialization of PEMFCs is predominantly handicapped by the large amount of Pt catalyst required, mostly at the cathode, and low durability.[41] The decline in activity in commercial PEMFC cathodes has been thoroughly investigated and the degradation mechanisms can be generally categorized into the following modes: Pt loss and aggregation due to corrosion of the carbon support; Pt nanoparticle aggregation driven by surface tension; Ostwald ripening; and potential-dependent chemical dissolution of Pt and migration into the proton exchange membrane.[21]

Recently, a new class of electrocatalysts based on Pt or Pt alloy nanotubes has been developed.[42] These nanotubes are typically 3-8 nm in wall thickness, 30-80 nm in tube diameter, and 5-30 μm in length. Structurally these tubes are made of Pt nanoparticles when mild temperature is used in the galvanic displacement reaction. PtNT catalysts have been demonstrated to be much more durable than Pt/C catalysts under potential cycling conditions (e.g., 0-1.3 V versus a reversible hydrogen electrode, RHE) because they eliminate the carbon corrosion problem and significantly reduce aggregation, dissolution, and ripening. They also showed a significantly improved ORR specific activity over the Pt/C catalysts, which is typically explained by changes in coordination number, expressed crystal planes, and electronic structure of the surface Pt atoms.[19, 20, 43, 44]

In this study, a slight modification was made to the galvanic displacement reaction conditions to generate PPtNTs with a subsequent investigation of their ORR activity and durability. Durability was examined using a protocol similar to the one recommended by the U.S. Department of Energy. The catalytic activity and poison resistance for the methanol oxidation reaction (MOR) in direct methanol fuel cells (DMFCs) was also examined for the first time. Slow kinetics and intermediate adsorption at the anode during MOR, notably of carbon monoxide, often limit the performance of DMFCs.[45] Reaction mechanisms for the oxidation of methanol have been discussed in detail elsewhere, and the intermediates of formaldehyde, formic acid, and carbon monoxide are formed in the oxidation of methanol to carbon dioxide.[46] Bulk polycrystalline Pt electrodes (BPPt) have been previously found to have a higher degree of carbon monoxide adsorption and poisoning as compared to electro-dispersed Pt.[47, 48]

PPtNTs with a wall thickness of 5 nm, an outer diameter of 60 nm, and a length of 5-20 μm are synthesized by galvanic displacement with silver nanowires, which are formed by the ethylene glycol reduction of silver nitrate. ORR and durability experiments are conducted for PPtNTs, Pt nanoparticles supported on carbon (Pt/C), and bulk polycrystalline Pt (BPPt) electrocatalysts to evaluate their catalytic properties for use as cathode catalysts in proton exchange membrane fuel cells. PPtNTs demonstrate improved mass and specific activity for ORR and durability to Pt/C. Following durability testing, PPtNTs exhibit specific ORR activity approaching that of BPPt. Catalyst activity for the methanol oxidation reaction (MOR) is characterized through cyclic voltammetry and chronoamperometry techniques to evaluate the materials for use as anode catalysts in direct methanol fuel cells. The PPtNTs show improved specific activity for MOR and chronoamperometry characteristics over Pt/C and BPPt catalysts.

Results and Discussion

AgNWs were synthesized with a mean diameter of 60 nm and a length of 10-500 μm (FIG. 1 a and b). PPtNTs were synthesized with a mean thickness of 5 nm and a length of 5-20 μm (FIG. 1 c and d). Though pores were observed on PPtNTs (FIG. 1 e), crystal alignment was clear among the Pt crystallites (FIG. 1 f) possibly due to epitaxial growth of Pt nanoparticles templated from the five-fold twinned AgNWs. Based on our diffraction analysis, two sets of growth directions ([110] and [111]) were observed along the axial PPtNTs. It is believed that the AgNWs (also exhibiting [110] and [111] growth directions, data not shown) templates the Pt growth in a facile manner based on the close match in lattice constants between FCC Ag and FCC Pt, leading to parallel growth directions. Analysis of this templating mechanism is currently being investigated. The theoretical loading required for a monolayer coating of PPtNTs of this size on a glassy carbon electrode is 31.2 μg cm$^{-2}$ and the theoretical surface area of PPtNTs with a perfectly smooth surface is 18.7 m$^2$ g$^{-1}$. During this evaluation, the electrochemically active surface area (ECSA) of this material (determined at a loading of 40 μg cm$^{-2}$) was 23.9 m$^2$ g$^{-1}$, corresponding to a 127% utilization of Pt.[49] The large utilization of Pt in this material may be attributed to the wall porosity. In contrast, the ECSA of Pt/C observed at 40 mg cm$^{-2}$ was 70.4 m$^2$ g$^{-1}$ compared to a theoretical surface area of 112 m$^2$ g$^{-1}$, corresponding to a 62.9% utilization. The ECSA for all materials was determined by calculating the charge associated with an adsorbed monolayer of hydrogen.[50]

Figure 2:
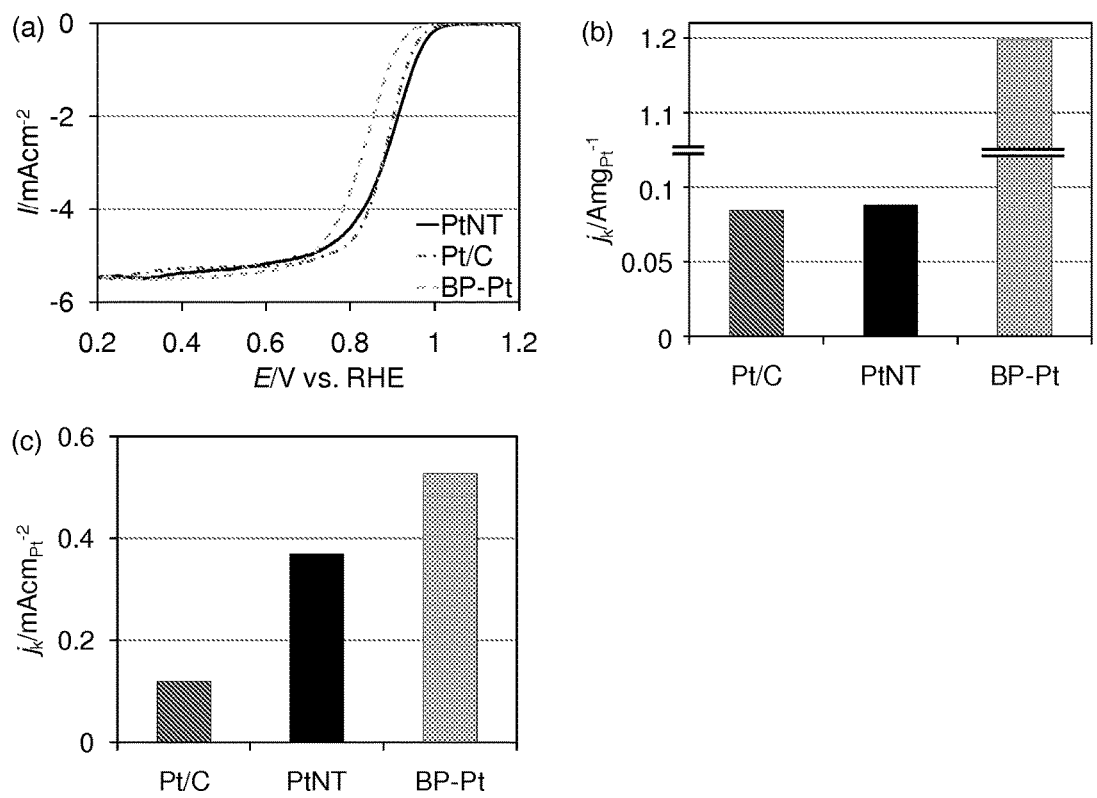
FIG. 2. a) Polarization curves for oxygen reduction at 20 mV s$^{-1}$, 1600 rpm for PPtNTs, Pt/C, and BPPt in an oxygen-saturated 0.1 M $HClO_4$ electrolyte. b) Mass and c) specific activities of PPtNTs, Pt/C, and BPPt at 0.9 V versus RHE.

Polarization curves for oxygen reduction were taken at the potential scan in the positive direction and were used to determine the mass and specific activities at the potential 0.9 V versus RHE (FIG. 2). Polarization curves were also taken in a positive potential scan in an argon-saturated 0.1 m $HClO_4$ electrolyte. These curves were used to remove background currents associated with the oxidation and reduction of Pt and the adsorption and desorption of hydrogen from the oxygen reduction polarization plots. The half wave potential of PPtNTs, Pt/C, and BPPt electrode are 0.889, 0.883 V, and 0.831 V, respectively. PPtNTs have a slightly higher mass activity than Pt/C (PPtNT: 0.088 A mg$^{-1}$; Pt/C, 0.084 A mg$^{-1}$), but they demonstrate a specific activity of 0.369 mA cm$^{-2}$, 3.1 times higher than that of Pt/C. As expected, BPPt has the highest specific activity, 0.528 mA cm$^{-2}$. The BPPt catalyst has a mass activity of 1.199 A mg$^{-1}$ when only the surface monolayer Pt atoms are considered in the calculation.

Figure 3:
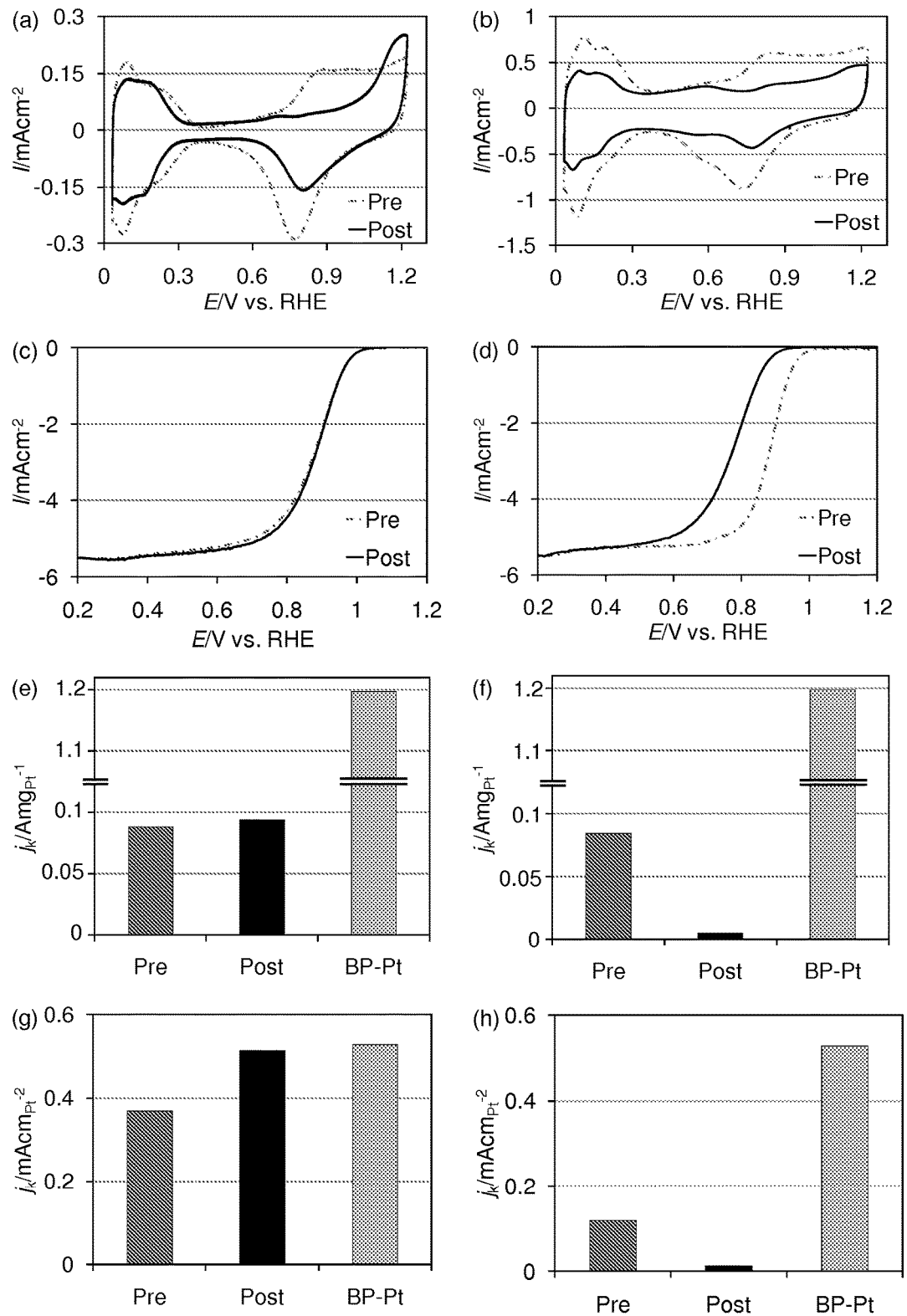
FIG. 3. a) Voltammetry curves taken at 20 mV s$^{-1}$ for a) PPtNTs and b) Pt/C at 0 and 30 000 cycles in an argon-saturated 0.1 M $HClO_4$ electrolyte. The potential cycles were completed between 0.6 and 1.1 V at a scan rate of 50 mV s$^{-1}$. Polarization curves for oxygen reduction taken at 20 mV s$^{-1}$, 1600 rpm for c) PPtNTs and d) Pt/C before and after 30 000 cycles in an oxygen-saturated 0.1 M $HClO_4$ electrolyte. Mass activity bar charts for e) PPtNTs and f) Pt/C before and after cycling at 0.9 V versus RHE. Specific activity bar charts for (g) PPtNTs and (h) Pt/C before and after cycling at 0.9 V versus RHE.
Figure 4:
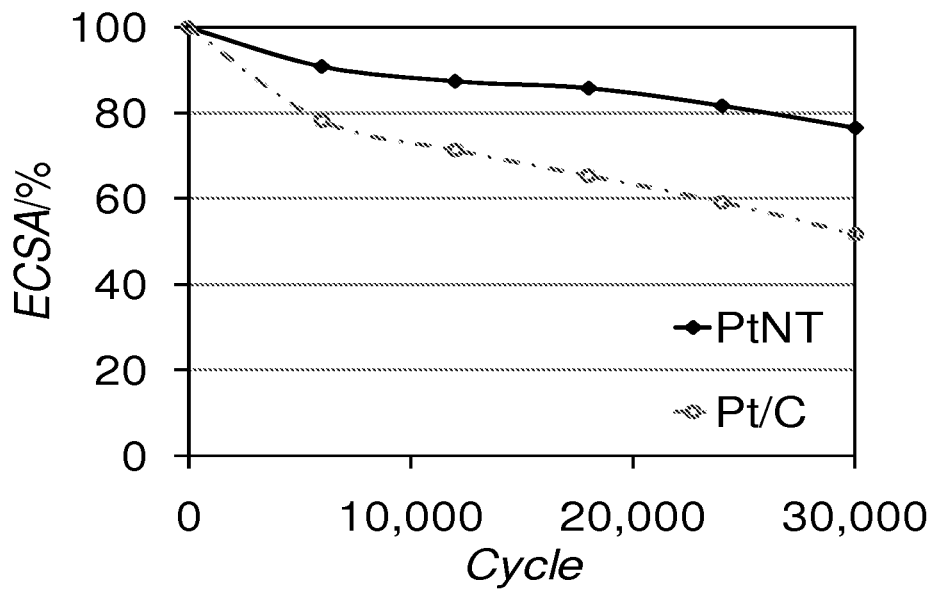
FIG. 4. Loss of ECSA for PPtNTs and Pt/C as a function of cycles of durability testing. ECSAs were calculated by hydrogen adsorption charges every 6000 cycles during the 30 000 cycles between 0.6-1.1 V versus RHE.

Durability testing was completed by cycling the applied potential 30 000 times in the range 0.6-1.1 V versus RHE (FIG. 3 a and b).[41] Periodic voltammograms were taken every 6000 cycles to monitor the ECSA. Oxygen reduction polarization curves for PPtNTs and Pt/C prior to and following durability testing are shown as well (FIG. 3 c and d). The ECSA of Pt/C degrades 48.3% over the 30 000 cycles, while PPtNTs lose 23.5% of their surface area (FIG. 4). Following durability testing, the half wave potential of Pt/C decreased to 0.775 V, corresponding to a shift of 108 mV. The mass and specific activities of Pt/C decreased to 5.33% and 20.9% of their original values, respectively. Conversely, PPtNT activity for ORR increased following cycling. The mass and specific activities of PPtNTs following durability testing were 0.094 A mg$^{-1}$ and 0.494 mA cm$^{-2}$, increasing to 106.8% and 133.9%, respectively, of their original values. The specific activity of PPtNTs following durability testing was 93.5% of the specific activity of a BPPt electrode. Durability testing seemed to oxidize Ag and clean the active faces of the PPtNTs. The activity increase corresponds to the removal of trace amounts of Ag left from the templating process.

Figure 5:
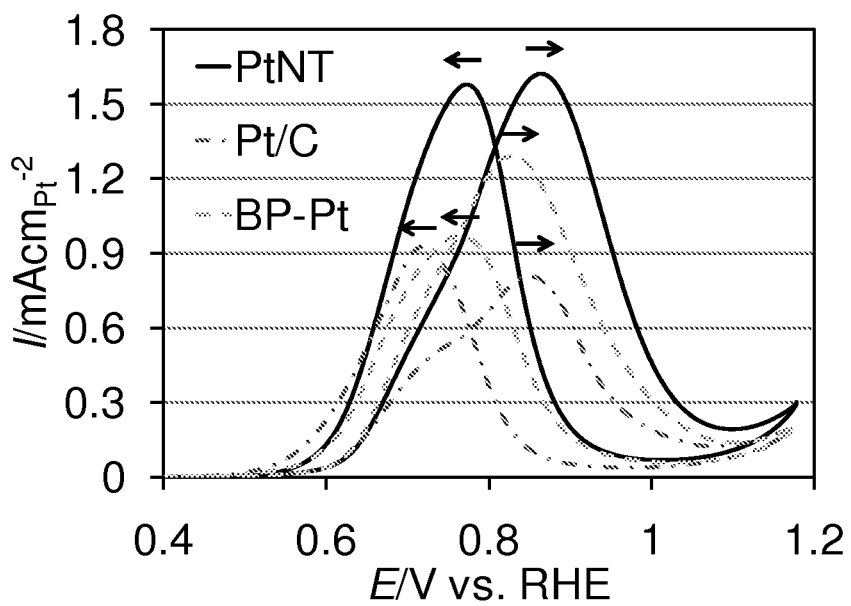
FIG. 5. Voltammetry curves taken at 5 mV s$^{-1}$ for PPtNTs, Pt/C, and BPPt in an argon-saturated 0.5 M $H_2SO_4$ electrolyte containing 1 M $CH_3OH$.

Voltammetry scans in terms of specific activity were conducted to demonstrate the improvement to MOR specific activity with Pt catalysts (FIG. 5). PPtNTs, Pt/C, and BPPt all have an initialization potential of 0.608 V versus RHE. Initialization potential has been defined as the potential at which the material generates a specific activity equal to 0.05 mA cm$^{-2}$ for methanol oxidation. Pt/C exhibits a peak specific activity of 0.809 mA cm$^{-2}$ at 0.850 V versus RHE, while PPtNTs exhibit a peak specific activity of 1.62 mA cm$^{-2}$ at 0.863 versus RHE. BPPt produces a peak specific activity of 1.29 mA cm$^{-2}$ at 0.830 V versus RHE. Therefore, PPtNTs produce a peak specific activity 2.01 times greater than Pt/C and 1.26 times greater than BPPt.

Figure 6:
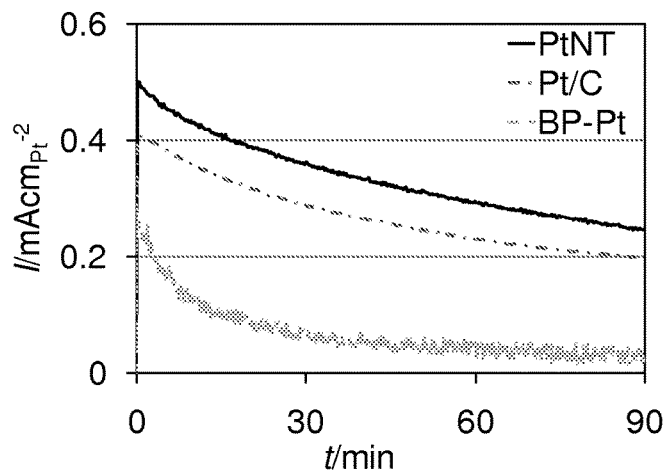
FIG. 6 Chronoamperometry of PPtNTs, Pt/C, and BPPt at a constant potential of 0.7 V versus RHE for 90 min.

Chronoamperometry was conducted to determine the effect of carbon monoxide adsorption during methanol oxidation. By holding the potential at 0.7 V versus RHE for 90 min, the potential sweeps that serve to oxidize adsorbed carbon monoxide from the Pt surface were eliminated (FIG. 6). PPtNTs produced an initial specific activity of 0.500 mA cm$^{-2}$ and a final specific activity of 0.245 mA cm$^{-2}$, corresponding to 49.0% of the initial response. Pt/C produced an initial specific activity of 0.408 mA cm$^{-2}$ and a final specific activity of 0.198 mA cm$^{-2}$, corresponding to 48.5% of the initial response. In this manner, PPtNTs maintained a specific activity 1.23 times greater than Pt/C for the oxidation of methanol during chronoamperometry. The BPPt electrode produced an initial specific activity of 0.289 mA cm$^{-2}$ and a final specific activity of 0.022 mA cm$^{-2}$, corresponding to 5.23% of the initial response. While PPtNTs exhibited a peak specific activity more akin to BPPt, it did not suffer from the carbon monoxide adsorption problem generally affiliated with BPPt catalysts. Chronoamperometry experiments performed at a potential greater than the bulk carbon monoxide oxidation potential (approximately 0.750 V versus RHE) yielded similar decay profiles for PPtNT, Pt/C, and BPPt catalysts. At fixed potentials lower than this threshold, however, BPPt activity for methanol oxidation decays at a significantly faster rate than PPtNTs or Pt/C over a wide range of potentials.

Figure 7:
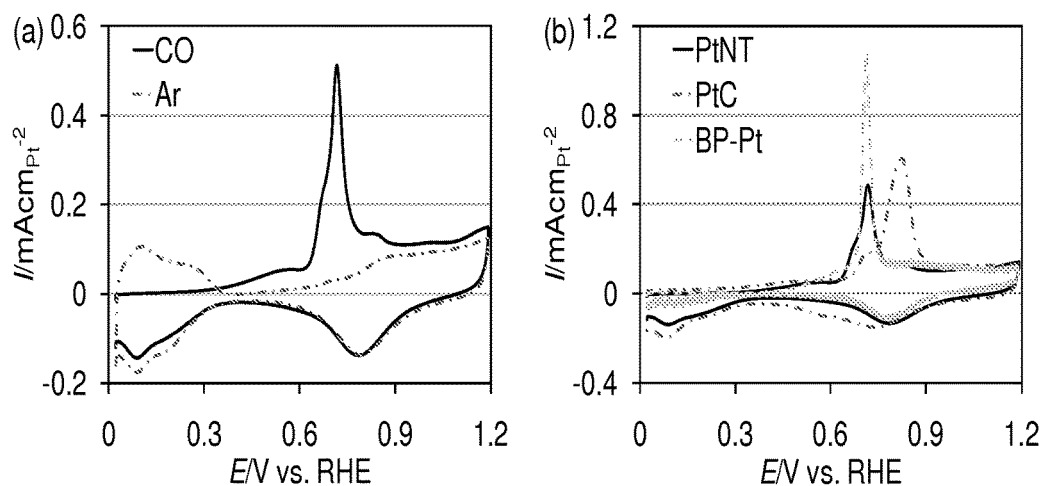
FIG. 7. a) Carbon monoxide stripping voltammogram taken at 20 mV s$^{-1}$ for PPtNTs with accompanying cyclic voltammetry in argon. b) Comparison plot of PPtNTs, Pt/C, and BPPt carbon monoxide stripping voltammograms in a carbon monoxide saturated 0.1 M $HClO_4$ electrolyte. Carbon monoxide adsorption was completed by immersing the rotating disk electrode in a carbon monoxide saturated electrolyte at a fixed potential of 0.050 V versus RHE for a period of 10 min.

Carbon monoxide stripping voltammograms were completed for PPtNTs, Pt/C, and BPPt (FIG. 7). Carbon monoxide adsorption was conducted by exposing the catalyst to carbon monoxide at a potential of 0.050 V versus RHE for a period of 10 min.[52] The applied potential ensured that all available carbon monoxide was not oxidized prior to stripping voltammetry. The peak potentials for carbon monoxide oxidation for PPtNTs, Pt/C, and BPPt are 0.716 V, 0.816 V, and 0.712 V versus RHE, respectively. Lower potential values in the PPtNT and BPPt electrodes indicate that less applied potential is required to reach the hydroxide adsorption region and oxidize carbon monoxide. A thin stripping peak as seen in the BPPt electrode also indicates an increase in accessibility due to its flat morphology.

Conclusions

PPtNTs were synthesized and tested for ORR and MOR for the first time. PPtNTs demonstrate an elevated ORR mass and specific activity to conventional Pt/C. Trace amounts of silver present within the material were dissolved into the electrolytic solution during durability testing, positively affecting the ORR results of PPtNTs. The specific activity of PPtNTs for ORR following durability testing approaches the value achieved with a BPPt electrode.

The peak specific activity of PPtNTs in MOR outperforms Pt/C and BPPt catalysts. The onset potential of PPtNTs for methanol oxidation is similar to that of Pt/C. Chronoamperometry results demonstrate, however, that PPtNTs do not suffer from the carbon monoxide adsorption characteristics associated with BPPt electrodes. Carbon monoxide stripping further shows a lower potential required to oxidize the intermediate on the PPtNT catalyst when compared to Pt/C, thus indicating an improved intermediate tolerance.

It is expected that the elimination of the carbon support would allow for a thinner electrode catalyst layer and for improved mass transport and platinum utilization within the catalyst layer. The porous structure of the PPtNTs may also help facilitate the access of reactants (e.g., hydrogen, oxygen and methanol) and the release of reaction products.

Experimental

PPtNTs were synthesized by galvanic replacement utilizing AgNWs as a sacrificial template.[42] AgNW templates were first synthesized via the ethylene glycol (Fisher Scientific) reduction of silver nitrate (Sigma-Aldrich) with platinum particles provided for seeding and polyvinyl pyrrolidone (Sigma-Aldrich) provided for shape control.

Prior to AgNW synthesis, ethylene glycol was refluxed in the presence of argon over a period over four hours to ensure the removal of impurities. Ethylene glycol (15 mL) was heated to 170° C. in a 3-neck round bottom flask (100 mL) equipped with condenser passing argon, addition funnel, thermocouple, and stir bar. Argon was passed through the condenser to ensure consistency and minimal particle content. Following 10 min at 170° C., a seeding solution of chloroplatinic acid in ethylene glycol (1.25 mL) was added to the solution in the flask. The seeding solution was left for five min to ensure complete platinum reduction and temperature stability. A separate ethylene glycol solution (18 mL) containing polyvinyl pyrollidone (0.1 M, $M_w$=40 000) and silver nitrate (0.05 M) was loaded into the addition funnel and added dropwise over a period of 19 min. The reaction then proceeded for 10 min at 170° C. and subsequently was quenched in an ice bath. Aliquots (5 mL) of the AgNW suspension were subsequently washed in ethanol, acetone, and water.[53-55]

For the synthesis of PPtNTs, chloroplatinic acid was utilized in the galvanic displacement of the AgNWs.[56-66] Cleaned AgNWs were dispersed in water (100 mL) and refluxed under argon in a three-neck round bottom flask (200 mL) equipped with condenser, addition funnel, thermocouple, and stir bar. Upon reaching reflux temperature at 100° C., chloroplatinic acid (43 mL, 1.0 mM) was added dropwise through the addition funnel over a period of 15 min. The reaction mixture was refluxed for 10 min and subsequently quenched in an ice bath. After quenching, the product was washed in a saturated sodium chloride (Fisher Scientific) solution to remove the silver chloride precipitate, followed by washing in water and ethanol. Prior to electrochemical experiments, the PPtNTs were acid treated in nitric acid (0.5 m) for 2 h and annealed at 250° C. for 1 h. Both of these processes were carried out under the presence of argon.

AgNWs were examined by scanning electron microscopy (SEM) using a Philips XL30-FEG microscope at 10 kV. PPtNTs were imaged by transmission electron microscopy (TEM) using a Philips CM300 microscope at 300 kV, while the morphological features were investigated using a FEI Technai TEM (T-20, 200 kV). The orientation/alignment of the constituent Pt nanoparticles within the nanotubes were probed via selected area diffraction at a camera distance of 32 cm. TEM specimens were prepared by pipetting a small amount (≈50 µL) of AgNW or PPtNT ethanolic suspensions onto holey carbon copper grids (Ted Pella, Inc. Redding, Calif.). The grids were dried at room temperature for 1 h.

Electrochemical experiments were conducted using a multichannel potentiostat (VMP2, Princeton Applied Research), a MSR type rotation controller (Pine Instrument), and a standard three-electrode setup, equipped with a reference electrode, platinum wire counter electrode, and glassy carbon working rotating disk electrode (Pine Instrument). The glassy carbon working electrode has a 5 mm diameter or a working area of 0.196 cm$^2$ and was coated with a platinum loading of 40 μg cm$^{-2}$. Following sample addition, 10 μL of a 0.05 wt % Nafion solution (5 wt % Liquion solution diluted with 2-propanol) was added onto the glassy carbon surface to ensure catalyst adhesion.

Oxygen reduction experiments utilized a double junction silver/silver chloride reference electrode (Pine Instrument). Corresponding cyclic voltammetry experiments to measure the charge associated with hydrogen adsorption were conducted in an argon saturated 0.1 m perchloric acid electrolyte at a scan rate of 10 mV s$^{-1}$. Oxygen reduction measurements were conducted in an oxygen saturated electrolyte at a scan rate of 20 mV s$^{-1}$ and rotation rate of 1600 rpm.

Voltage cycling is typically utilized to evaluate catalyst durability since this method leads to a faster platinum dissolution rate compared to chronoamperometry.[67, 68] Accelerated durability experiments were conducted by cycling the working electrode between 0.6 V and 1.1 V versus RHE in an argon saturated 0.1 m perchloric acid solution at a scan rate of 50 mV s$^{-1}$. Cyclic voltammetry measurements were taken every 6000 cycles at a scan rate of 20 mV s$^{-1}$. Oxygen reduction experiments were conducted prior to and following the 30 000 cycles of the catalyst.

Methanol oxidation experiments utilized a double junction mercury/mercurous sulfate reference electrode (Koslow Inc.). Methanol oxidation measurements were conducted at a scan rate of 5 mV s$^{-1}$ in an argon saturated sulfuric acid solution (0.5 m) containing methanol (1.0 m). The corresponding cyclic voltammetry experiments were conducted in an argon saturated sulfuric acid electrolyte (0.5 m) at a scan rate of 10 mV s$^{-1}$. Chronoamperometry experiments were conducted by monitoring current over a period of 90 min while holding the potential constant at 0.7 V versus RHE in an argon saturated sulfuric acid solution (0.5 m) containing methanol (1.0 m).[69]

Values versus silver/silver chloride and mercury/mercurous sulfate electrodes were converted to RHE by multimeter measurements between the experimental reference and a platinum wire in a hydrogen saturated electrolyte.[70]

Supportless Silver Nanowires as Oxygen Reduction Reaction Catalysts for Hydroxide Exchange Membrane Fuel Cells Polymer HEMFCs have emerged as a potential, commercially viable technology due to the use of non-precious metal catalysts in place of Pt. Major technological barriers for HEMFC commercialization have included: the development of hydroxide exchange membranes (HEMs) with high hydroxide conductivity and high chemical, mechanical, and thermal stability; ionomers with controlled solubility in addition to the same properties required for HEMs; and non-precious metal catalysts with high activity and durability for ORR and HOR. HEM materials with high hydroxide conductivity and alkaline stability by using novel cations and new crosslinking methods have been successfully explored; however, catalyst development thus far has been limited and requires substantial further efforts.[29-38]

For ORR in HEMFCs, Ag is often regarded as the prototypical catalyst due to its low cost and reasonably high performance.[13] Ag was further found to produce higher ORR activity at the solid HEM electrolyte/electrode interface than at the liquid KOH electrolyte/electrode interface.[71] Several studies have been completed evaluating Ag catalysts for ORR in alkaline electrolytes.[72-78] Blizanac et al. studied the activities of low-index single crystal surfaces in an alkaline electrolyte and suggested that ORR kinetics increases in the order of {100}≤{111}<{110}.[72] Marković and Blizanac et al. subsequently studied the effect of pH on Ag ORR activity and demonstrated that the shift from acidic to alkaline electrolyte resulted in a shift from a two-electron to a four-electron process.[73] Kostowskyj et al. synthesized AgNWs by electroless plating using a polycarbonate track etched template; however, the resulting nanowires have a relatively large diameter (>50 nm) and were aggregates of AgNPs rather than a true single crystal or twinned crystal nanowire structure.[74] Ni et al. evaluated AgNWs for ORR activity; although the nanowires had a multiple twinned crystalline wire structure, the ORR activity was modest and the analysis was void of ORR specific and mass activity measurements.[75] On the other hand, studies on AgNPs have focused on the development of RDE testing protocols and methanol tolerance.[76, 77] Currently, only one study has attempted to evaluate the Ag particle size effect on ORR activity.[78] While a general correlation was made, the AgNPs examined were relatively large (>20 nm) and the analysis lacked ORR specific and mass activity measurements.

To address the critical data gap in literature, highly crystalline fivefold twinned AgNWs (25-60 nm) and small diameter AgNPs (2.4-6.0 nm) were synthesized and studied as HEMFC ORR catalysts. The ORR specific and mass activities of these catalysts were investigated to evaluate the effects of particle size and the extended 2-D nanowire surfaces. Furthermore, the impact of morphology and size of the catalysts on ORR pathway and alcohol tolerance was studied. This study is the first of its kind and was motivated by findings in PEMFCs, for which a dramatic Pt particle size effect on ORR has been observed and extended 2-D Pt surfaces markedly improved ORR specific activity and durability.[20, 42, 79]

AgNWs with diameters of 25 nm, 40 nm, 50 nm, 60 nm are synthesized by the ethylene glycol reduction of Ag nitrate. AgNPs with diameters of 2.4 nm, 4.6 nm, and 6.0 nm are synthesized by the lithium triethylborohydride reduction of Ag nitrate. Rotating disk electrode (RDE) experiments in 0.1 M oxygen saturated KOH show that as the AgNPs become smaller, they have lower specific activity for ORR; AgNPs (2.4 nm-30 nm) also have a lower ORR specific activity than bulk polycrystalline Ag (BPAg). By contrast, thinner AgNWs demonstrate higher ORR specific activity, with 25 nm, 40 nm, and 50 nm AgNWs each exceeding the specific activity of BPAg. Particularly interesting is that AgNWs with a 25 nm diameter have an ORR mass activity higher than 2.4 nm AgNPs. Rotating ring disk electrode (RRDE) testing demonstrates a minimal degree of peroxide formation on AgNWs. The fraction of two electron transfer increases with the use of AgNPs by as much as an order of magnitude. There is a direct correlation between particle size reduction and increasing peroxide production, with 2.4 nm particles exceeding 30 nm particles by a ratio as large as 3:1. All Ag catalysts demonstrate minimal ORR activity loss in the presence of alcohols, illustrating the benefit of AgNPs and AgNWs as ORR catalysts in hydroxide exchange membrane fuel cells when alcohols are used as the fuel.

Results and Discussion

Figure 8:
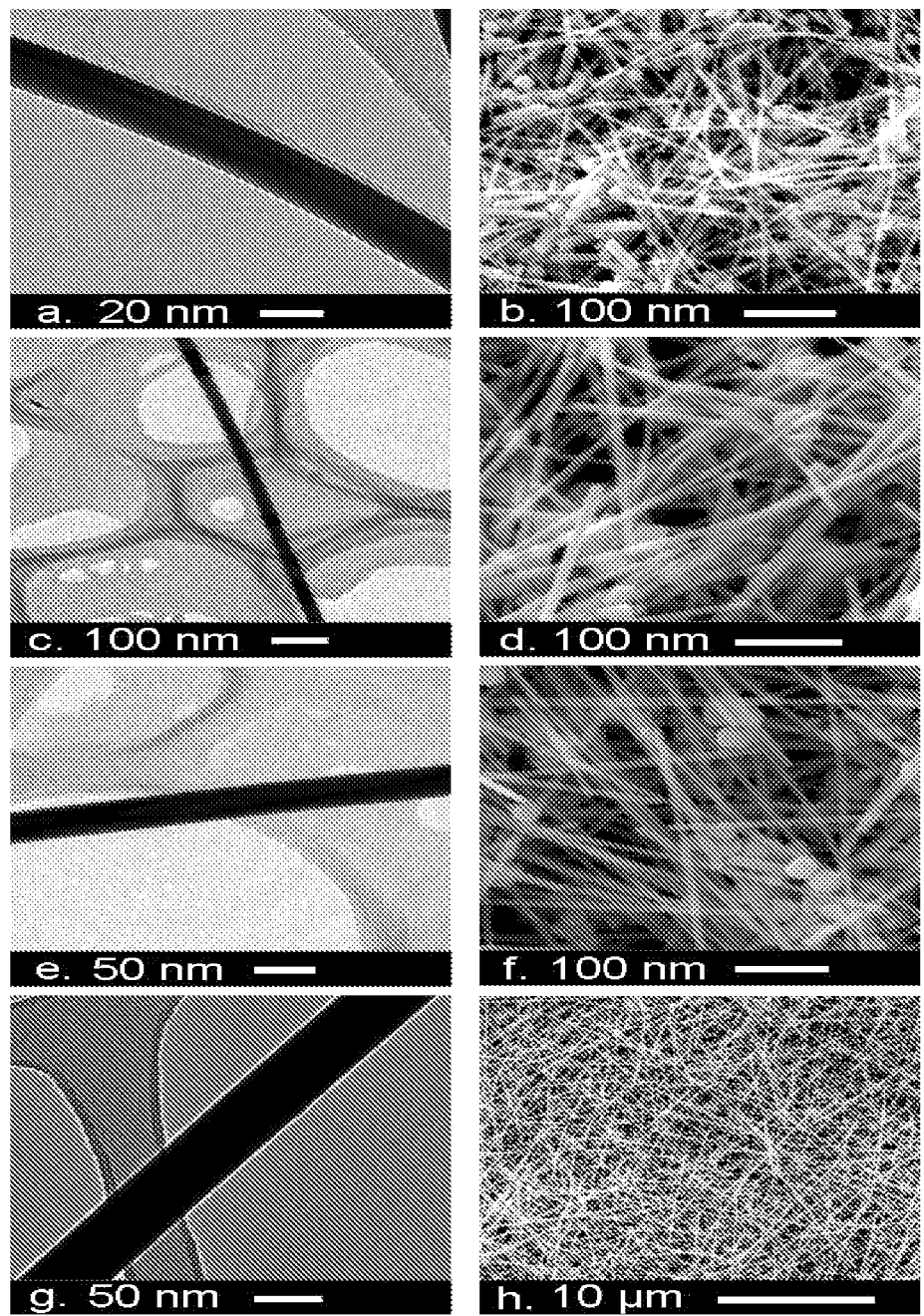
FIG. 8. TEM images of a) AgNWs 25 nm, c) AgNWs 40 nm, e) AgNWs 50 nm, g) AgNWs 60 nm. SEM images of b) AgNWs 25 nm, d) AgNWs 40 nm, f) AgNWs 50 nm, and h) AgNWs 60 nm.

By manipulating reaction temperature and time, AgNWs with diameters of 25 nm, 40 nm, 50 nm, and 60 nm were synthesized. Their median lengths are 1 μm, 4 μm, 7 μm, and 10 μm, respectively. Wire diameters and lengths were confirmed by TEM and SEM (FIG. 8). AgNPs, not present in the 60 nm AgNWs, appeared in the 25 nm-50 nm AgNWs since wire shortening decreased the molecular weight; AgNPs had a lower ORR activity than AgNWs and did not provide any advantage to the 25 nm-50 nm AgNWs. The AgNWs were previously shown to have a fivefold twinned structure.[79] Assuming the AgNWs have perfect pentagonal crossections, the side surface of the AgNWs will be terminated with the {100} facet; however, TEM images clearly show that both the side surfaces are rounded and as such are likely not exclusively {100}, but a mixture of {100} and high-index facets.[80] For example, repeated bisecting of the twinned {100} facets would yield increasingly higher indices, with {211}, {922}, and {911} facets exposed at 36°, 18°, and 9° incident to the {100} plane. Similarly, AgNWs with a perfectly pyramidal tip surface would have corresponded to the {111} facet, but the flat tips as confirmed by TEM (FIG. 9) suggest a {110} dominant surface.

Figure 9:
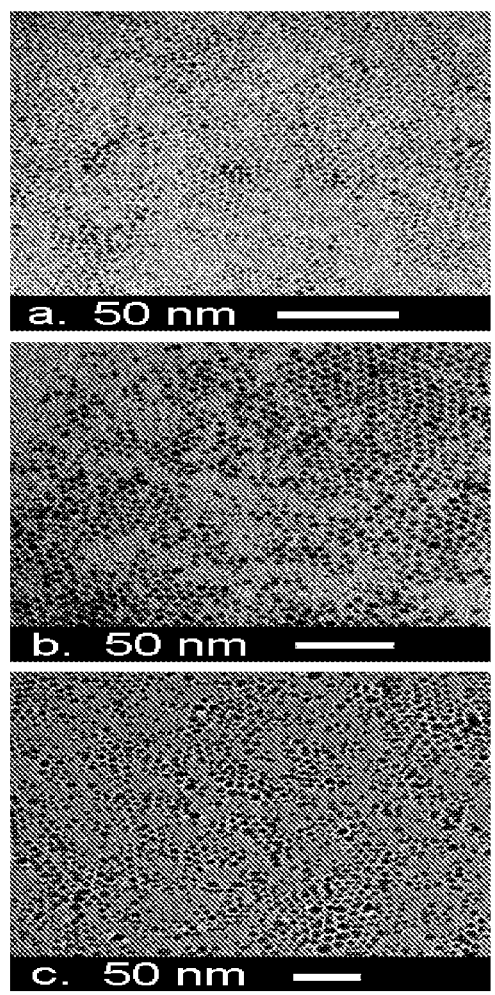
FIG. 9. TEM images of a) AgNPs 2.4 nm, b) AgNPs 4.6 nm, and c) AgNPs 6.0 nm.
Figure 26:
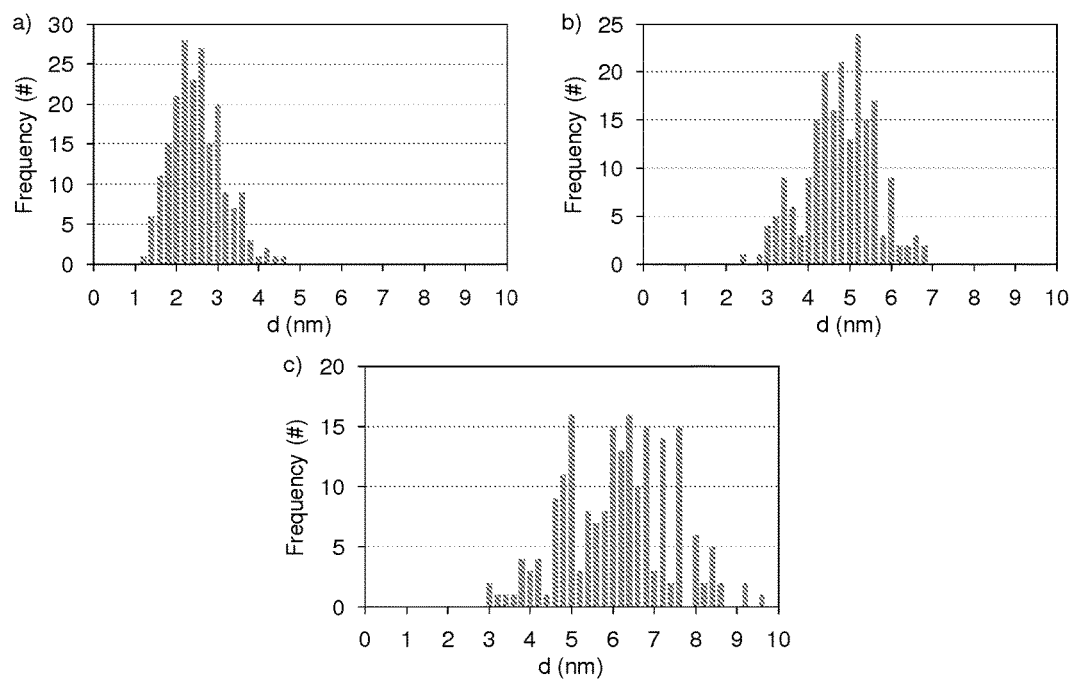
FIG. 26. Histograms of a) AgNPs 2.4 nm (±0.6 nm), b) AgNPs 4.6 nm (±0.9 nm), and c) AgNPs 6.0 nm (±1.3 nm).
Figure 27:
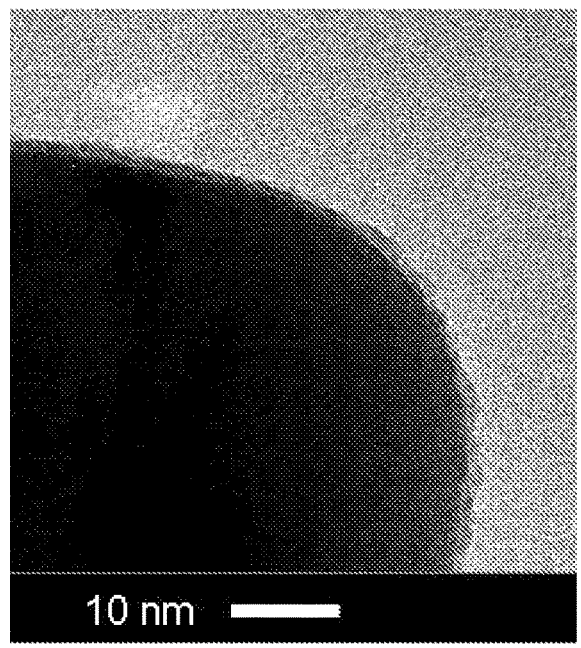
FIG. 27. TEM image of AgNWs 60 nm demonstrating a flat tip.

Multiple ligand concentrations were used in the synthesis of AgNPs, yielding particles with diameters of 2.4 nm, 4.6 nm, and 6.0 nm (FIG. 9 and FIG. 26). This is the first time that AgNPs with diameters less than 10 nm were studied for ORR in an alkaline electrolyte. Small diameter AgNPs are attractive as catalysts because they offer high surface area.

Figure 10:
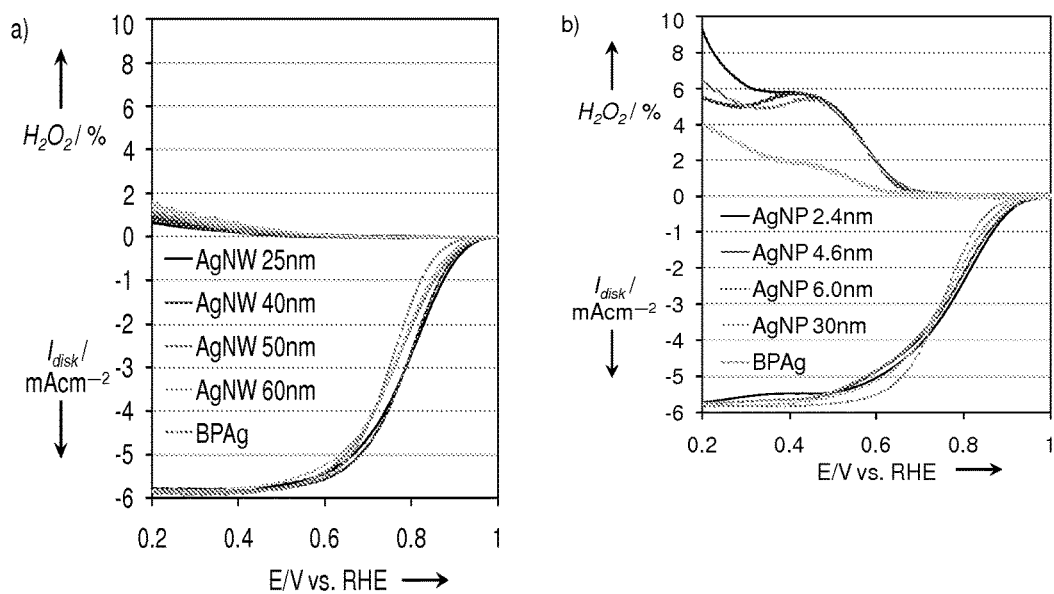
FIG. 10. Anodic polarization scans and percent peroxide formation of a) AgNWs 25 nm, AgNWs 40 nm, AgNWs 50 nm, AgNWs 60 nm, and BPAg and b) AgNPs 2.4 nm, AgNPs 4.6 nm, AgNPs 6.0 nm, and BPAg at 1600 rpm in a 0.1 M oxygen saturated KOH electrolyte. The disk portion performed anodic polarization scans at 20 mVs$^{-1}$ while the ring was held at a potential of 1.2 V vs. RHE.

The ORR activity and hydrogen peroxide production of AgNWs and AgNPs were assessed by RDE and RRDE experiments (FIG. 10). A commercial supportless AgNP catalyst (30 nm diameter) and BPAg were included as benchmarks. While a surface redox induced ORR hysteresis was not observed due to the high onset potential of Ag oxidation (1.17 V vs. RHE), the anodic scan protocol was maintained to be consistent with those employed in noble metal catalyst characterizations.[7]

Figure 11:
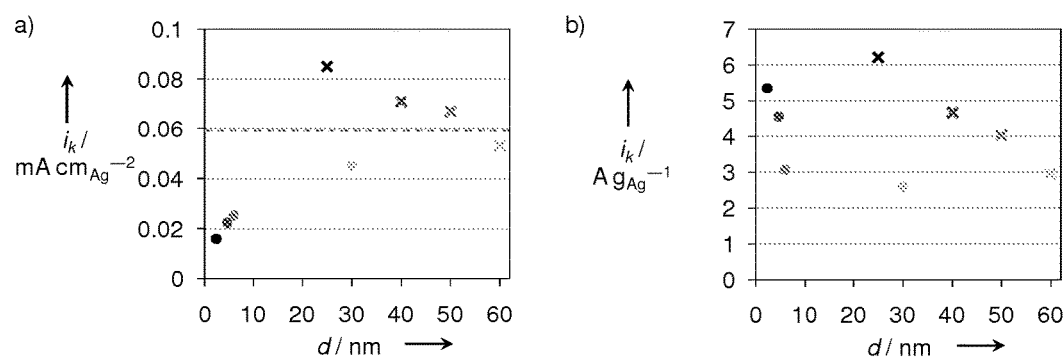
FIG. 11. a) Specific and b) mass ORR activity in relation to catalyst size. AgNWs are denoted by crosses (X), AgNPs by circles (●), and BPAg by the dashed line ( - - - ). ORR specific and mass activities were calculated at 0.9 V vs. RHE.

RDE data revealed that the ORR specific activity of 60 nm AgNWs was 90% of BPAg (FIG. 11). The BPAg electrode typically consists of large grains tens of micrometers in size. Its polished surface is highly crystalline without preferential growth directions and thus a mixture of low-index and high-index facets, producing an ORR activity that is a statistical average. While the 60 nm AgNWs surfaces were also a combination of facets, the extraordinarily high aspect ratio resulted in a side surface to tip surface ratio of approximately 100:1. The side surface dominance yielded a larger proportion of the 11001 facet. Although historically there has been a disagreement in literature, the {100} facet was recently shown to be the least active low-index Ag facet for ORR.[72, 81-83] Consequently, it is likely that the prominence of the {100} facet on the 60 nm AgNWs lowered the ORR specific activity to a value less than BPAg.

As the AgNW diameter was reduced, the ORR activity increased so that each of the remaining wires exceeded BPAg in specific activity. The most active wires, 25 nm AgNWs, produced an ORR specific activity 44% greater than BPAg. This is likely due to stronger presence of the {110} facet at the wire tips, the most active low-index Ag facet.[80] While the side surface to tip surface ratio of 60 nm AgNWs was 100:1, this ratio decreased to 10:1 in the case of 25 nm AgNWs. Wire shortening dramatically increased the prominence of the more active {110} facet at the wire tips, thereby increasing the ORR specific activity.[72]

Conversely, each AgNP catalyst failed to match the specific activity of BPAg and the ORR specific activity further decreased as the particle size was reduced. As with the AgNWs surfaces, the surface of the AgNPs is also terminated by a combination of low and high-index planes. However, it is important to note that there is a fundamental difference between the inclusion of high-index corner sites and high-index terrace sites. High-index corner sites are generally regarded as unstable, isolated, and less active. High-index Pt and gold terraces, however, have previously been shown to provide a greater density of edges, thereby creating a larger number of active sites for ORR and increasing specific activity.[22, 84, 85] Although these types of studies on Ag are absent, it is possible that high-index Ag terraces produced a high level of ORR activity for the BPAg and AgNW catalysts. It is also believed that the higher indices on AgNWs qualify as terraces due to the wire size and high aspect ratio. Although the side surfaces were rounded, the wire diameters and lengths yielded high-index facets with widths and lengths immensely larger than those possible on sub 10 nm nanoparticles. In contrast, AgNPs contain a large proportion of high-index corner sites; as the nanoparticle size was reduced, the proportion of corner sites increased, thereby decreasing ORR specific activity. Though not asymptotic, a distinct Ag particle size effect was observed, significantly hampering the ability of AgNPs to meet the mass activity of the AgNWs.

In commercial applications, mass activity ultimately determines the viability of a catalyst. It is surprising that 25 nm AgNWs have a mass activity 16% higher than 2.4 nm AgNPs in spite of having only 18% of the ECSA.

RRDE data shows that AgNWs of all diameters produced minimal $H_2O_2$ while significant $H_2O_2$ was produced by AgNPs. AgNW $H_2O_2$ formation slightly decreased with thinning diameter, in contrast to AgNPs, where the $H_2O_2$ fraction of the 2.4 nm AgNPs ranged from two to threefold that of the 30 nm AgNPs. The increase in $H_2O_2$ formation with decreasing particle diameter was previously attributed to an increased frequency of step or corner sites.[78] Although high index surfaces were formed on the rounded AgNWs, the catalyst length and facet width prevented the formation of corner sites. These terrace sites proved to favor four electron transfer and yielded an ORR response with minimal $H_2O_2$ formation.

Two electron transfer adversely effected the diffusion region of AgNP catalysts in ORR. Current observed on the ring portion of the RRDE represented current lost from the disk portion due to incomplete reduction. Whether due to $H_2O_2$ formation or deficient ORR activity, AgNPs reached the diffusion limited current at an overpotential 200 mV higher than AgNWs. AgNWs further produced earlier half wave potentials ($E_{1/2}$) than AgNPs (Table 2)

TABLE 2

ORR $E_{1/2}$ and ORR $E_{1/2}$ shifts following the addition of methanol, ethanol, and ethylene glycol. $E_{1/2}$ shifts were calculated as the potential shift in potential vs. RHE required to reach half the diffusion limited current of the catalyst excluding alcohol.

|  | KOH [V][a] | Methanol [mV][b] | Ethanol [mV][c] | EG [mV][d] |
|---|---|---|---|---|
| NW 25 nm | 0.791 | −5 | −19 | −36 |
| NW 40 nm | 0.789 | −10 | −23 | −56 |
| NW 50 nm | 0.765 | −9 | −30 | −49 |
| NW 60 nm | 0.752 | −4 | −15 | −34 |
| BPAg | 0.752 | −12 | −12 | −10 |
| NP 2.4 nm | 0.769 | −17 | −33 | −74 |
| NP 4.6 nm | 0.768 | −23 | −53 | −80 |
| NP 6.0 nm | 0.765 | −18 | −28 | −56 |
| NP 30 nm | 0.722 | −24 | −31 | −66 |

[a]ORR $E_{1/2}$ in a 0.1 m KOH electrolyte.
[b]ORR $E_{1/2}$ shift following the addition of 1.0 m methanol.
[c]ORR $E_{1/2}$ shift following the addition of 1.0 m ethanol.
[d]ORR $E_{1/2}$ shift following the addition of 1.0 m ethylene glycol.

Figure 29:
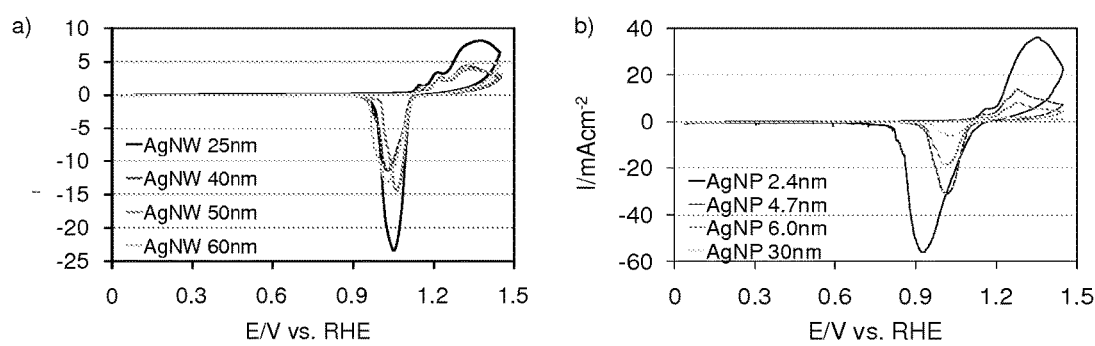
FIG. 29. Cyclic voltammograms of a) AgNWs 25 nm, AgNWs 40 nm, AgNWs 50 nm, and AgNWs 60 nm and b) AgNPs 2.4 nm, AgNPs 4.6 nm, AgNPs 6.0 nm, and AgNPs 30 nm at 20 mVs$^{-1}$ in a 0.1 M KOH electrolyte.
Figure 30:
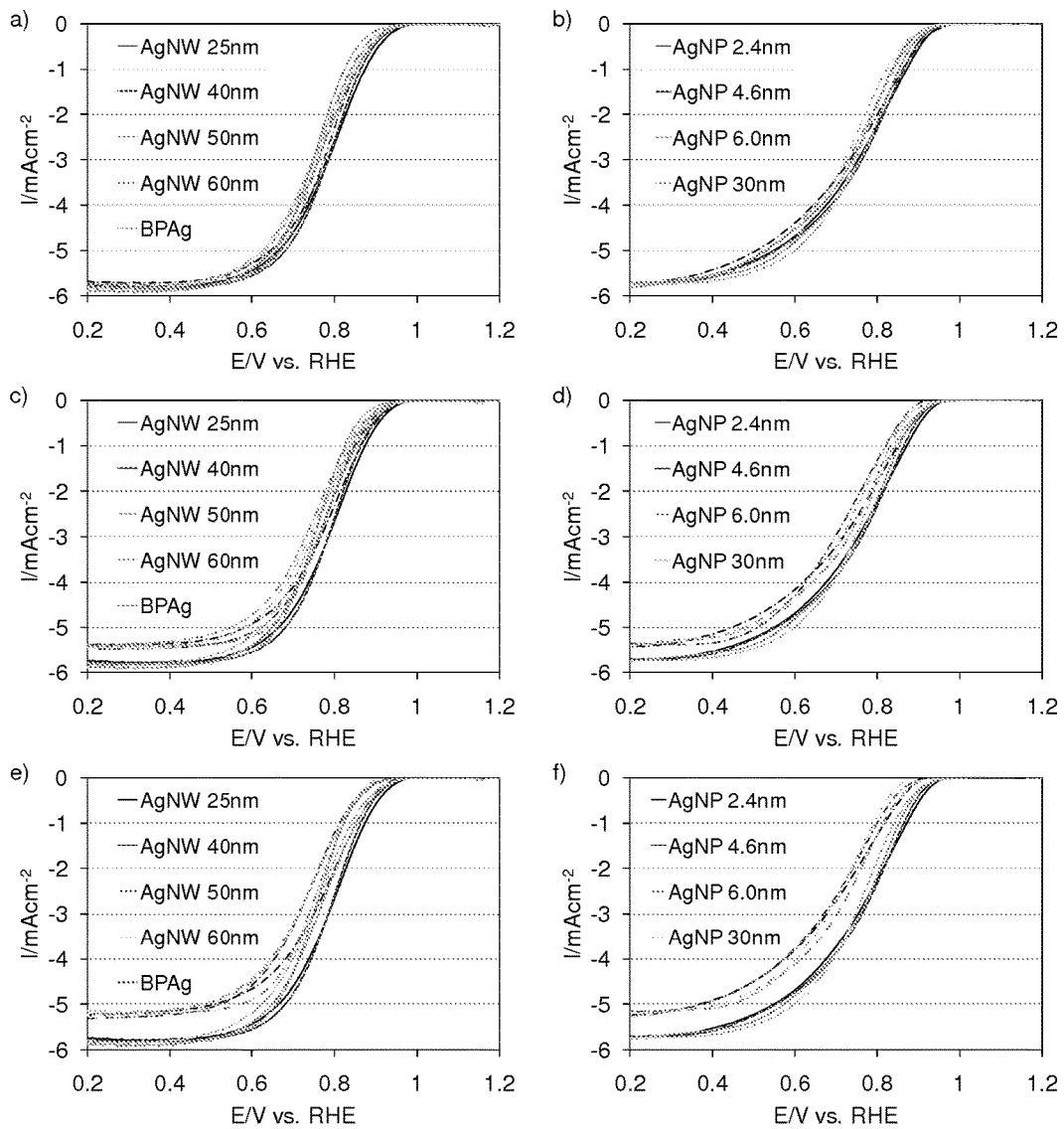
FIG. 30. Alcohol tolerance of AgNWs 25 nm, AgNWs 40 nm, AgNWs 50 nm, AgNWs 60 nm, BPAg, AgNPs 2.4 nm, AgNPs 4.6 nm, AgNPs 6.0 nm, and AgNPs 30 nm. a) Methanol tolerance for AgNWs and BPAg; b) methanol tolerance for AgNPs. c) Ethanol tolerance for AgNWs and BPAg; d) ethanol tolerance for AgNPs. e) Ethylene glycol tolerance for AgNWs and BPAg; f) ethylene glycol tolerance for AgNPs. Voltammograms were taken at a scan rate of 20 mVs$^{-1}$ and a rotation speed of 1600 rpm in an oxygen saturated 0.1 M KOH electrolyte with and without 1.0 M alcohol.
Figure 31:
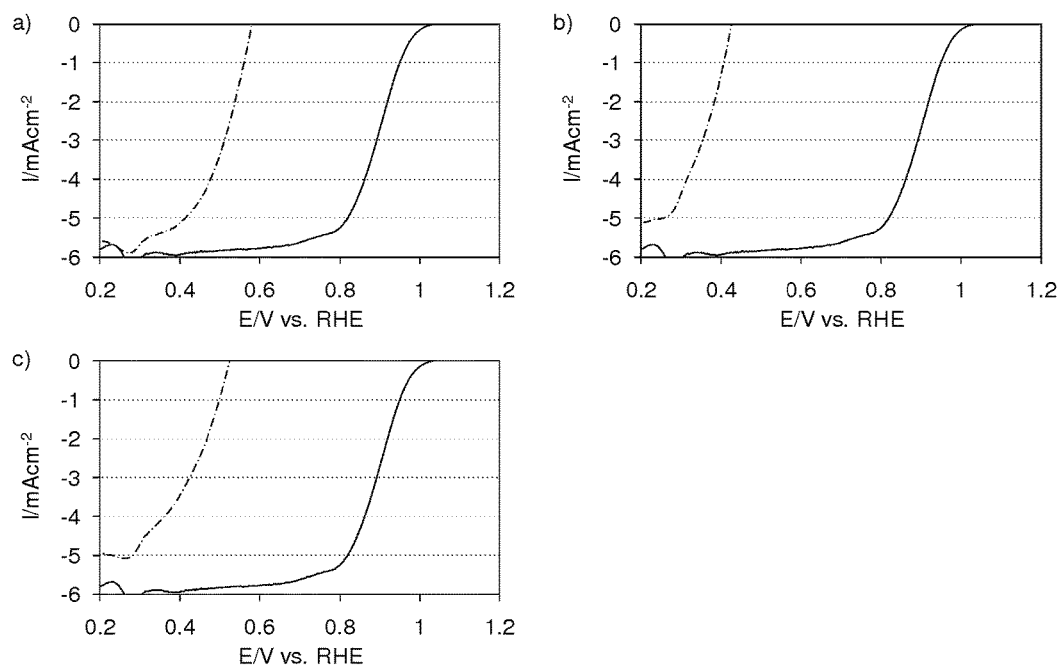
FIG. 31. a) Methanol, b) ethanol, c) and ethylene glycol tolerance of Pt/C. Voltammograms were taken at a scan rate of 20 mVs$^{-1}$ and a rotation speed of 1600 rpm in an oxygen saturated 0.1 M KOH electrolyte with and without 1.0 M alcohol.

The effects of alcohol introduction on ORR were also examined with the use of RDE experiments to systematically demonstrate the improved tolerance of Ag to Pt catalysts (Table 2 and FIG. 30).[11, 77, 86] AgNWs showed reduced diffusion limited currents and mean $E_{1/2}$ losses of 7 to 44 mV, increasing in the order of methanol to ethanol to ethylene glycol. Though AgNP deficits were greater ($E_{1/2}$ shifts of 21 to 69 mV). Ag ORR losses were minimal in comparison to commercial Pt catalysts which typically yield $E_{1/2}$ shifts of 400 to 600 mV (FIG. 29).

Conclusions

In summary, our study demonstrates that AgNWs with small diameters are clearly the path for ORR catalyst development for HEMFCs. Decreasing wire diameter yielded an increase in specific activity; AgNWs with a 25 nm diameter still exceed the mass activity of 2.4 nm AgNPs, in spite of having approximately one fifth the surface area. AgNWs in general produced hydrogen peroxide an order of magnitude lower than AgNPs and decreasing AgNW diameter further reduced the peroxide formation. The minimal hydrogen peroxide production suggests a nearly complete four-electron ORR process. It is also anticipated that the nanowire extended surface will reduce the modes of catalyst degradation during potential cycling, improving durability characteristics. Supportless AgNWs can also improve mass transport since they provide a porous and thinner catalyst layer due to the elongated wire morphology and the elimination of a carbon support. The findings here are also of interest for water electrolyzers that are based on either a liquid alkaline electrolyte or HEMs.

Experimental

AgNWs were synthesized by the reduction of Ag nitrate (Sigma Aldrich) with ethylene glycol (Fisher Scientific).[79, 87] Pt nanoparticles were provided for seeding to induce wire growth and polyvinyl pyrollidone (Sigma Aldrich) was utilized to control growth direction and morphology.

Ethylene glycol was heated in the presence of argon to reflux for 4 hours to ensure impurity removal. All morphologies of AgNWs were synthesized in the presence of argon under magnetic stirring in a three neck round bottom flask equipped with thermocouple, addition funnel, and condenser. In the synthesis of AgNWs 60 nm, 15 mL of ethylene glycol was heated to 170° C. Following a 10 minute period at reaction temperature, 1.25 mL of 0.4 mm chloroplatinic acid in ethylene glycol was added to the flask. Reduction of the seeding solution proceeded for 5 minutes to ensure reaction completion and to allow for the temperature of the flask contents to return to 170° C. Following this period, an ethylene glycol solution (18 mL) containing 0.05 m Ag nitrate and 0.1 m polyvinyl pyrrolidone was added dropwise over a period of 19 minutes. The reaction was allowed to proceed for ten minutes at which time it was quenched with an ice bath.

AgNWs 50 nm, AgNWs 40 nm, and AgNWs 25 nm were synthesized with varying volumes, temperatures, and reaction times. For reduced wire diameters, 15 mL of ethylene glycol was heated to reaction temperatures of 180° C. (AgNWs 50 nm), 185° C. (AgNWs 40 nm), and 190° C. (AgNWs 25 nm) and held for a period of 10 minutes. Chloroplatinic acid in ethylene glycol (0.75 mL, 0.4 mm) was subsequently injected into the flask. Following a 5 minute wait period, an ethylene glycol solution (9 mL) containing 0.05 m Ag nitrate and 0.1 m polyvinyl pyrrolidone was added dropwise and allowed to react for variable periods of time. Utilized drop and reaction times included 10 and 5 minutes (AgNWs 50 nm), 5 and 5 minutes (AgNWs 40 nm), and 3 and 2 minutes (AgNWs 25 nm), respectively, followed by submersion in an ice bath. All AgNW permutations were separated into 5 mL aliquots and washed in ethanol and acetone.

AgNPs were synthesized by the lithium triethylborohydride (Sigma Aldrich) reduction of Ag nitrate (Sigma Aldrich) with didecylamine dithicarbamate (DDTC) provided for shape control.[88] DDTC was synthesized by the stoichiometric combination of carbon disulfide (Sigma Aldrich) and didecylamine (Sigma Aldrich), each prepared in a 10 wt % ethanol solution.[89] Ethanol solubilized didecylamine was added dropwise to the carbon disulfide solution, followed by continued stirring for 30 seconds.

Ag nitrate (2.0 mmol) was dissolved in 8 mL of ethanol and added to a 500 mL round bottom flask. Following dispersion, 80 mL of toluene and varying amounts of DDTC were added under stirring. AgNPs 2.4 nm, AgNPs 4.6 nm, and AgNPs 6.0 nm were synthesized with 3.0 mmol, 2.0 mmol, and 1.0 mmol of DDTC, respectively. Lithium triethylborohydride (20 mmol) was subsequently added dropwise and the flask contents proceeded under stirring in an argon environment for 3 hours. The resulting toluene phase was extracted with a rotary evaporator and the AgNPs were cleaned in a glass frit (porosity E, Ace Glass) with exorbitant amounts of ethanol and acetone to remove excess DDTC. AgNPs were solubilized in tetrahydrofuran, collected, dried, and heated to 180° C. in oxygen for 1 hour to degrade the remaining DDTC prior to electrochemical testing.

RDE experiments were completed using a three electrode system containing a mercury/mercurous oxide reference electrode (Hg/HgO, Koslow), Pt wire counter electrode (Sigma Aldrich), and a 5 mm outer diameter glassy carbon working electrode (Pine Instrument Company) equipped with a modulated speed rotation controller (Pine Instrument Company). RRDE experiments were completed in the same three electrode system using a 4.57 mm outer diameter glassy carbon disk tip and a Pt ring with a surface area of 0.0370 cm$^2$, collection efficiency of 22%, and a ring-disk gap of 118 µm (Standard MT28 Series Tip, Pine Instrument Company). All electrochemical data was collected with a multichannel potentiostat (VMP2, Princeton Applied Research). Commercial electro catalysts were characterized as benchmark materials: AgNPs 30 nm (100 wt %, Quantum Sphere Inc.); and Pt/C (20 wt %, E-TEK). Catalyst loading for all RDE and RRDE experiments involving Ag catalysts was set at 100 µg$_{Ag}$ cm$^{-2}$. Pt/C loading was set at 40 µg$_{Pt}$ cm$^{-2}$. Following catalyst loading, 10 µL of a 0.05 wt % Nafion solution was applied to the disk electrode to ensure material adhesion to the glassy carbon.

Oxygen reduction experiments were conducted in an oxygen saturated 0.1 m KOH electrolyte at a rotation speed of 1600 rpm and a scan rate of 20 mVs$^{-1}$. Background scans were conducted in an argon saturated electrolyte to remove extraneous charge affiliated with hydrogen adsorption/desorption and metal oxidation/reduction. KOH electrolytes were used for a minimal amount of time to limit the possibility of electrolyte deterioration.[90] Potential values reported in RDE and RRDE experiments were converted to RHE by potentiostat measurements between a BPPt electrode and Hg/HgO electrodes in a hydrogen saturated 0.1 m KOH electrolyte.[70] Potential values are reported here with reference to RHE in order to compare these results to ORR benchmarks and previous studies in acidic media.[15, 91-97]

Figure 28:
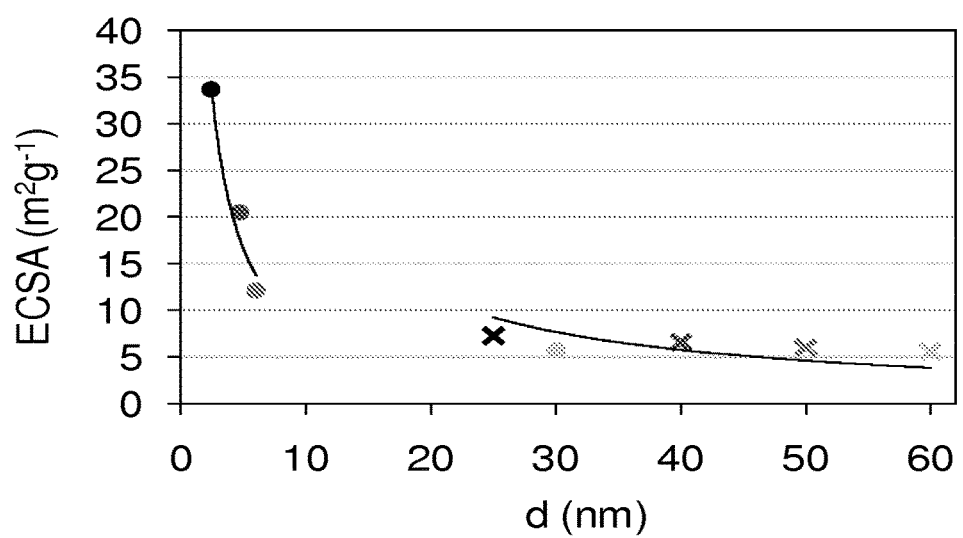
FIG. 28. ECSA in relation to catalyst size with AgNWs denoted by crosses (X) and AgNPs denoted by circles (●). Solid lines denote regressions inversely proportional to catalyst diameter.

ECSAs used in the calculation of specific ORR activity were obtained by the cyclic voltammogram peak associated with Ag to Ag$_2$O oxidation, assuming a coulombic charge of 400 µCcm$^{-2}$ (FIG. 28 and FIG. 29).[98-100] Regressions between NW size and surface area show a less than theoretical increase with diameter reduction (FIG. 28 b). The synthesis of reduced wire diameters yielded a mass similar to the AgNP byproduct, increasing the difficulty of wire cleaning. The increased AgNP content also accounted for the marginal reduction in wire ECSA. On the other hand, the synthesized AgNPs showed ECSAs lower than theoretical values which were attributed to catalyst loading and the lack of a catalyst support leading to particle agglomeration. Ligand elimination was confirmed by the lack of the ligand oxidation peak (0.5 V vs. RHE) as observed in the catalysts uncleaned by the heating process. Analysis of BPAg further yielded a rugosity of 1.36, within the anticipated range of surface areas for a polished BP electrode.

Catalyst ORR electron transfer was gauged with RRDE experiments (FIG. 10). The fraction of peroxide formation was calculated according to equation (1):

$$X_{H_2O_2} = \frac{\frac{2I_R}{N}}{I_D + \frac{I_R}{N}} \quad (1)$$

where $I_R$, $I_D$, and N were the ring current, disk current, and ring efficiency, respectively.[15, 101] Peroxide formation appeared in the diffusion region of ORR due to the delayed onset potential of the two electron pathway (0.67 V vs. RHE).[102, 103] AgNW catalysts each maintained two electron transfer fractions less than two percent.

Palladium and Gold Nanotubes as Oxygen Reduction and Alcohol Oxidation Catalysts in Hydroxide Exchange Membrane Fuel Cells Solid polymer HEMFCs were recently developed as an alternative to solid polymer PEMFCs. HEMFCs are potentially advantageous since the shift to an alkaline environment allows for the use of cost effective, non-Pt catalysts for ORR and HOR. Technological barriers to the commercialization of HEMFCs include the development of: stable HEMs with high hydroxide conductivity; soluble ionomers; and non-Pt catalysts with high activity for ORR and HOR. HEMs with various cations and degrees of crosslinking have previously been developed; in comparison, catalyst development is substandard and unable to adequately illustrate the potential benefit of HEMFCs.[29-33] Ag is commonly promoted as the benchmark HEMFC cathode catalyst since it is cost effective and the shift to an alkaline environment reduces the ORR overpotential. Ag catalysts, however, are generally of low surface area and express a specific ORR activity more than an order of magnitude less than Pt.[76] Recent increases in the price of Ag have further diminished the benefit of Ag as a HEMFC catalyst. Pd and Au, however, can be used as alternative ORR catalysts, producing comparable activity to Pt at a lower cost.[104, 105]

Pd has previously been studied as a catalyst for ORR in an alkaline electrolyte.[106-110] Chen et al. examined Pd particle size effects on ORR activity, determining that specific activity declined with decreasing diameter.[106] Chen et al. also compared the ORR activity of Pd and Pt nanoparticles; although the analysis was void of mass and specific activity measurements, it was determined that Pd produced a higher ORR activity and required a lower activation energy than Pt.[107] Although unavailable in an alkaline electrolyte, individual low index facets of Pd were studied previously for ORR in an acidic medium.[108] Beyond conventional morphologies, Pd is typically examined as an ORR catalyst in the form of alloys.[109, 110]

Au alkaline ORR catalysts have been studied with greater frequency.[84, 111-115] The effect of Au particle size on ORR activity in an alkaline electrolyte was studied by McFarland.[111] Although qualitative comparisons were made, the limited activity and the lack of specific activity analysis provided little insight into the application of Au as ORR catalysts. Numerous Au facets, however, were characterized by Adzic et al. and Jüttner for ORR; low index facets were found to produce ORR activity in the order: {111}<{110}<{100}.[84, 112, 113] Beyond conventional morphologies, Geng et al. studied quasi-extended surfaces in the form of Au icosahedra; the ORR activity, however, was extremely low and the analysis did not include mass or specific activity measurements.[114] Likewise, Solla-Gullón et al. examined Au nanocubes, but the ORR activity was limited and the study did not determine mass or specific activities.[115]

Solid polymer HEM DAFCs are also of interest in this study since the use of an alkaline environment reduces the overpotential for alcohol oxidation, the catalyst cost, and the rate of alcohol permeation through the membrane.[116, 117] Pd and Au have previously been utilized in catalysts for MOR, ethanol (EOR), and ethylene glycol oxidation (EGOR).[118-123] Although pure Pd or Au catalysts have not matched the activity of Pt for MOR, these metals are commonly used as a Pt alloy.[118, 119] Lamy et al. examined Pt and Pd alloys in for MOR in electrolytes with a variety of pHs, finding a synergistic effect and improved MOR activity in an alkaline environment.[118] Watanabe and Motoo studied Pt, Pd, and Au alloys for MOR in an alkaline electrolyte and determined that the activity improved with the additional of each ad-metal.[119] Pd is frequently reported as an alkaline EOR catalyst, often with activity greater than Pt.[120-122] Liu et al. demonstrated that the use of Pd nanoparticles produced an EOR activity fivefold greater than Pt fivefold.[121] Xu et al. also studied Pd nanowires which produced a significantly higher EOR activity than a Pd film.[122] Due to the template based synthesis and the large nanowire diameter (80 nm), the catalyst is impractical for commercial use. For EGOR, Au was previously studied by Moussa et al., who found that Au electrodes produced a higher peak activity and required a higher onset potential than Pt or Pd.[123] Pd is also commonly studied as a methanol or ethanol tolerant ORR catalyst.[107, 124]

This study is the first to examine the intrinsic activity of extended, high surface area, highly active Pd or Au catalysts for ORR and alcohol oxidation reactions. The work presented here was motivated by finding for Pt, where the use of extended network catalysts dramatically improved activity for ORR and MOR[42, 79] Previous studies have suggested that a similar effect could be observed for Pd and Au catalysts in an alkaline environment. Although fundamental work has demonstrated the potential use of Pd and Au as HEMFC and DAFC catalysts, promising extended network catalysts in this area are largely absent. To address these inadequacies in literature, PdNTs and AuNTs were studied for ORR and alcohol oxidation.

PdNTs and AuNTs with wall thicknesses of 5 nm, outer diameters of 60 nm, and lengths of 5-20 μm were synthesized by galvanic displacement with AgNWs. ORR activity was measured on PdNTs, AuNTs, bulk polycrystalline electrodes (BPPd, BPAu), and NP catalysts (Pd/C, Au/C, Pt/C) to evaluate activity for catalysts in hydroxide exchange membrane fuel cell cathodes. PdNTs produced a specific ORR activity 87%, 17%, and 42% greater than Pd/C, BPPd, and Pt/C, respectively. AuNTs produced a specific ORR activity 53%, 649%, and 21% greater than Au/C, BPAu, and Pt/C, respectively. All ORR catalysts and Pt ruthenium (Ru) nanoparticles (PtRu/C) were examined for methanol, ethanol, and ethylene glycol oxidation for use as DAFC anodes.

PdNTs produced an earlier onset potential than all catalysts in methanol and ethylene glycol oxidation; PdNTs further met or exceeded the specific activity of Pt/C in the low overpotential region for all examined alcohol oxidation reactions. AuNTs produced an earlier onset potential than PtRu/C and Pt/C in ethylene glycol oxidation. Additionally, ORR experiments in the presence of alcohol confirmed an increased tolerance of Au and Pd to alcohol introduction when compared to Pt.

Results and Discussion

Figure 12:
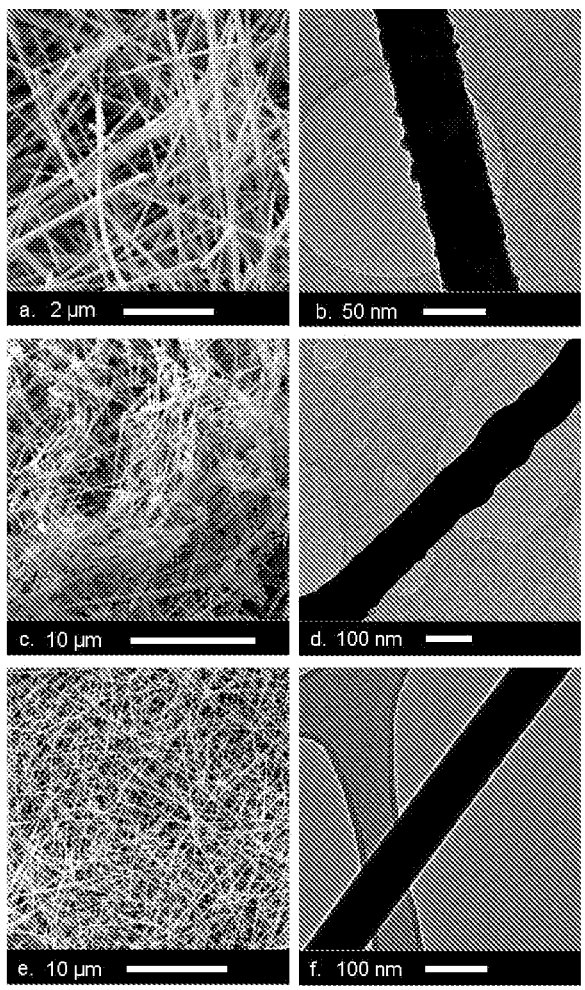
FIG. 12. SEM images of a) PdNTs, c) AuNTs, and e) AgNWs. TEM images of b) PdNTs, d) AuNTs, f) AgNWs.
Figure 32:
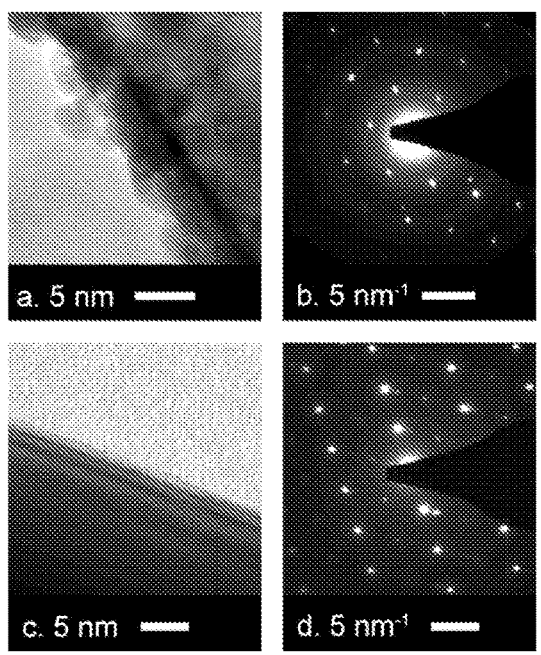
FIG. 32. High resolution TEM of a) PdNTs and c) AuNTs. SAEDs of b) PdNTs and d) AuNTs.

PdNTs and AuNTs were synthesized with a thickness of 5 nm and an outer diameter of 60 nm (FIG. 12 a-d). The length of PdNTs and AuNTs was found to be 5-10 μm and 5-20 μm, respectively. Nanotube morphology was templated from the AgNWs, found to have diameters of 60 nm and lengths of 10-500 μm (FIG. 12 e-f). Growth directions and lattice spacing of the nanotubes was also templated from the fivefold twinned nanowires; nanotubes were confirmed to have <110> and <111> growth directions (FIG. 32). PdNT spacing between the {100}, {110}, and {111} lattices was 2.48 Å, 2.49 Å, and 3.05 Å. AuNTs spacing between the 11001, 11101, and {111} lattices was 2.61 Å, 2.47 Å, and 3.08 Å. These lattices are significantly smaller than previously observed for nanoparticles or bulk polycrystalline forms of Pd or Au.[125, 126]

Figure 13:
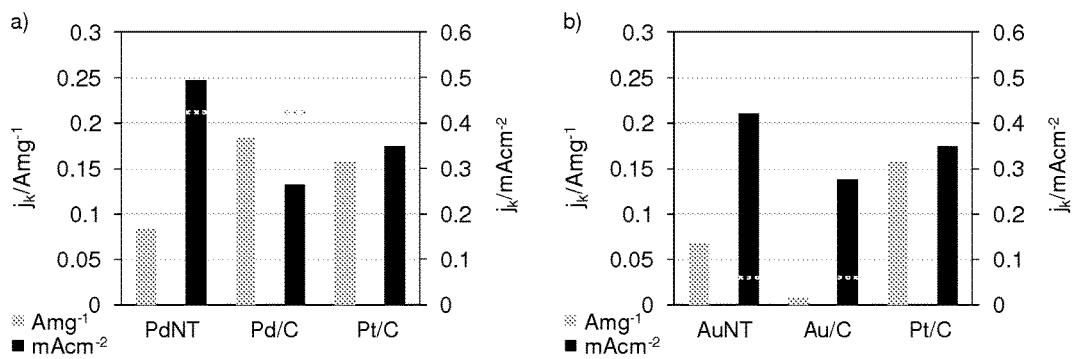
FIG. 13. Mass and specific activities of a) PdNTs, Pd/C, and Pt/C and b) AuNTs, Au/C, and Pt/C. All activities were determined at 0.9 V vs. RHE in a 0.1 M KOH electrolyte during an anodic polarization scan at 20 mVs$^{-1}$ and 1600 rpm. a) BPPd and b) BPAu specific activities were denoted with a dotted line ( - - - ).

PdNTs and AuNTs each produced a specific ORR activity greater than conventional nanoparticle catalysts (FIG. 13). PdNTs exceeded the ORR specific activity of Pt nanoparticles supported on carbon (Pt/C), Pd nanoparticles supported on carbon (Pd/C), and BPPd by 42%, 87%, and 17%, respectively. AuNTs exceeded the ORR specific activity of Pt/C, Au nanoparticles supported on carbon (Au/C), and BPAu by 21%, 53%, and 649%.

Figure 33:
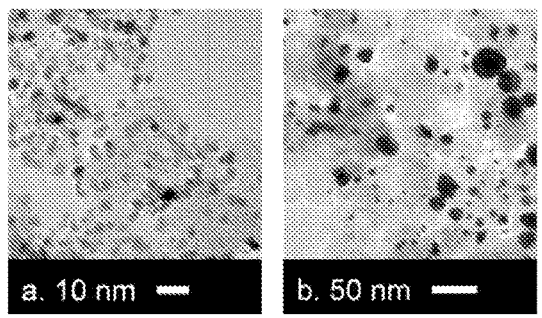
FIG. 33. TEM of a) Pd/C and b) Au/C.
Figure 34:
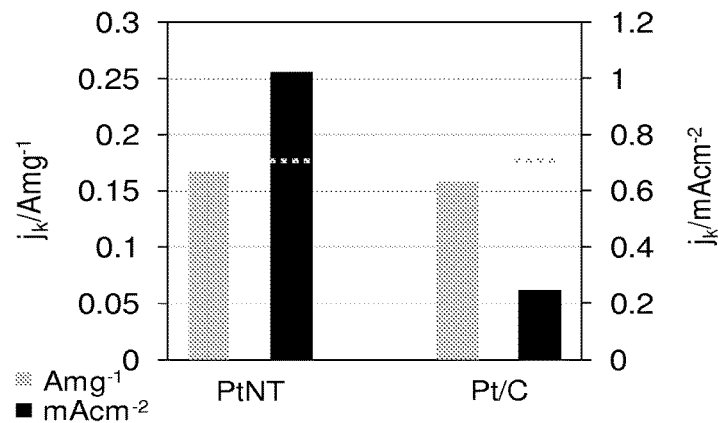
FIG. 34. Mass and specific activities of Pt nanotubes and Pt/C at 0.9 V vs. RHE in a 0.1 M KOH electrolyte during an anodic polarization scan at 20 mVs$^{-1}$ and 1600 rpm. Bulk polycrystalline Pt specific activity is denoted with a dotted line ( - - - ).
Figure 35:
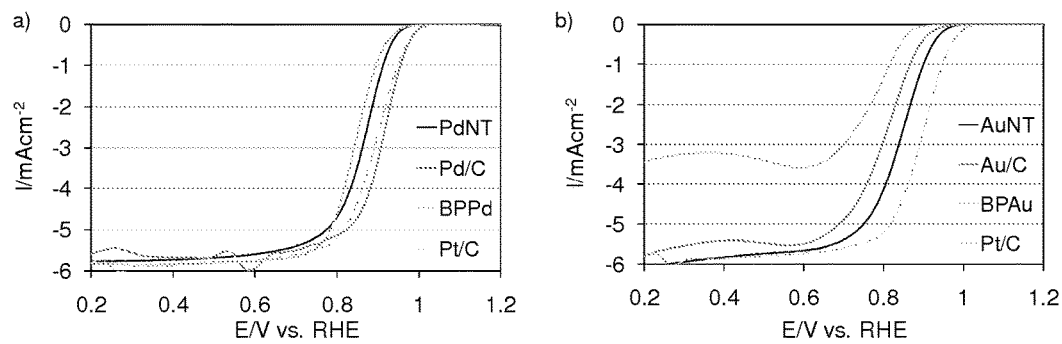
FIG. 35. Anodic polarization scans of a) PdNTs, Pd/C, BPPd, and Pt/C and b) AuNTs, Au/C, BPAu, and Pt/C at 20 mVs$^{-1}$ and 1600 rpm in an oxygen saturated 0.1 M KOH electrolyte.

In the case of PdNTs, the high activity for ORR was attributed to the extended surface and lattice tuning. Although ORR studies on single Pd facets in an alkaline electrolyte are unavailable, it is possible that the higher frequency of facets in the <110> zone axis contributed to the high ORR activity. In comparison to BPPd, it was anticipated that the compressed lattice spacing predominantly improved the ORR activity of PdNTs. The particle size of Pd/C was further found to be extremely small (2 nm) and this particle size effect significantly hampered the specific activity in comparison to PdNTs (FIG. 33).

Figure 36:
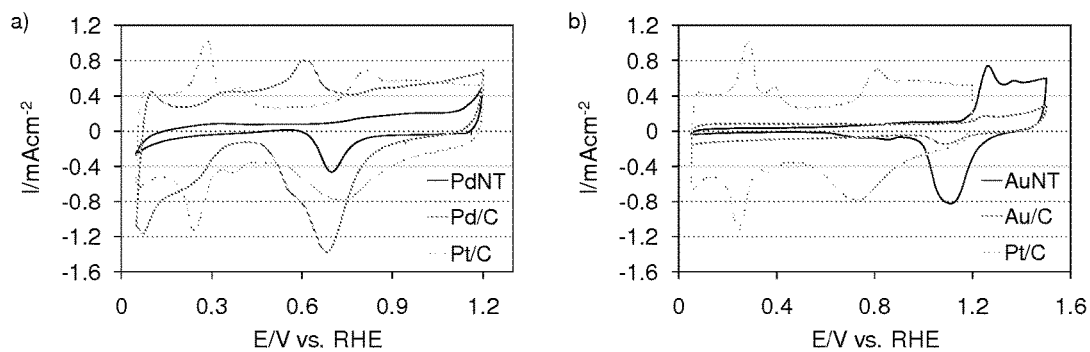
FIG. 36. Cyclic voltammograms of a) PdNTs, Pd/C, and Pt/C and b) AuNTs, Au/C, and Pt/C at 20 mVs$^{-1}$ in an argon saturated 0.1 M KOH electrolyte.

The high activity of the AuNTs was likewise attributed the extended surface and lattice spacing. The expressed facets, however, significantly contributed to the activity disparity between the AuNTs and BPAu. Previous studies found that there is a large gap in ORR activity between the low index Au facets. The half wave potential of the {111} facet was determined to be approximately 0.4 V lower than the {100} facet; this gap was much larger than observed on Pd in an acidic electrolyte.[84, 108, 112, 113] Since the BPAu electrode is a statistical average, the presence of the {110} and {111} facets, as well as higher indices along these zone axes, dramatically decreased the ORR activity of BPAu. AuNTs exclusively express the {100} facet and higher indices along the <110> zone axis, all facets with high activity for ORR. Therefore, there is an enormous disparity between the activity of AuNTs and BPAu. Furthermore, although Au/C consists of nanoparticles, these particles are large in size (10-40 nm) and the anticipated ORR particle size effect was largely adverted (FIG. 33). The ORR mass activity of AuNTs was also more than ninefold greater than Au/C, attributed to the large AuNT surface area as determine by cyclic voltammetry and confirmed by high resolution TEM (FIG. 32 and FIG. 36).

Figure 14:
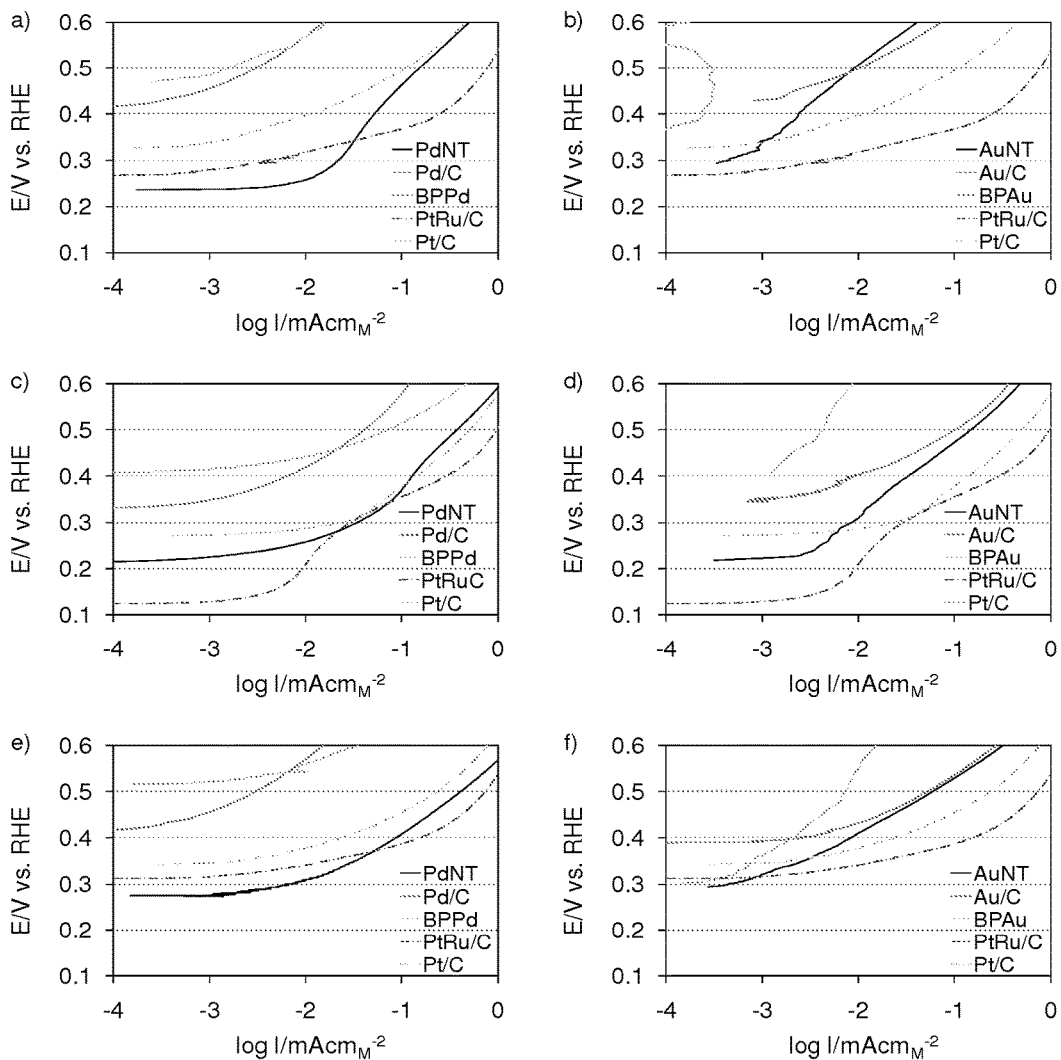
FIG. 14. Quasi steady state activities of Pd and Au catalysts for alcohol oxidation, performed at 1 mVs$^{-1}$ in a 0.1 M KOH electrolyte containing 1.0 M alcohol. a) Methanol, c) ethanol, and e) ethylene glycol oxidation of PdNTs, Pd/C, BPPd, PtRu/C, and Pt/C. b) Methanol, d) ethanol, and f) ethylene glycol oxidation of AuNTs, Au/C, BPAu, PtRu/C, and Pt/C.
Figure 37:
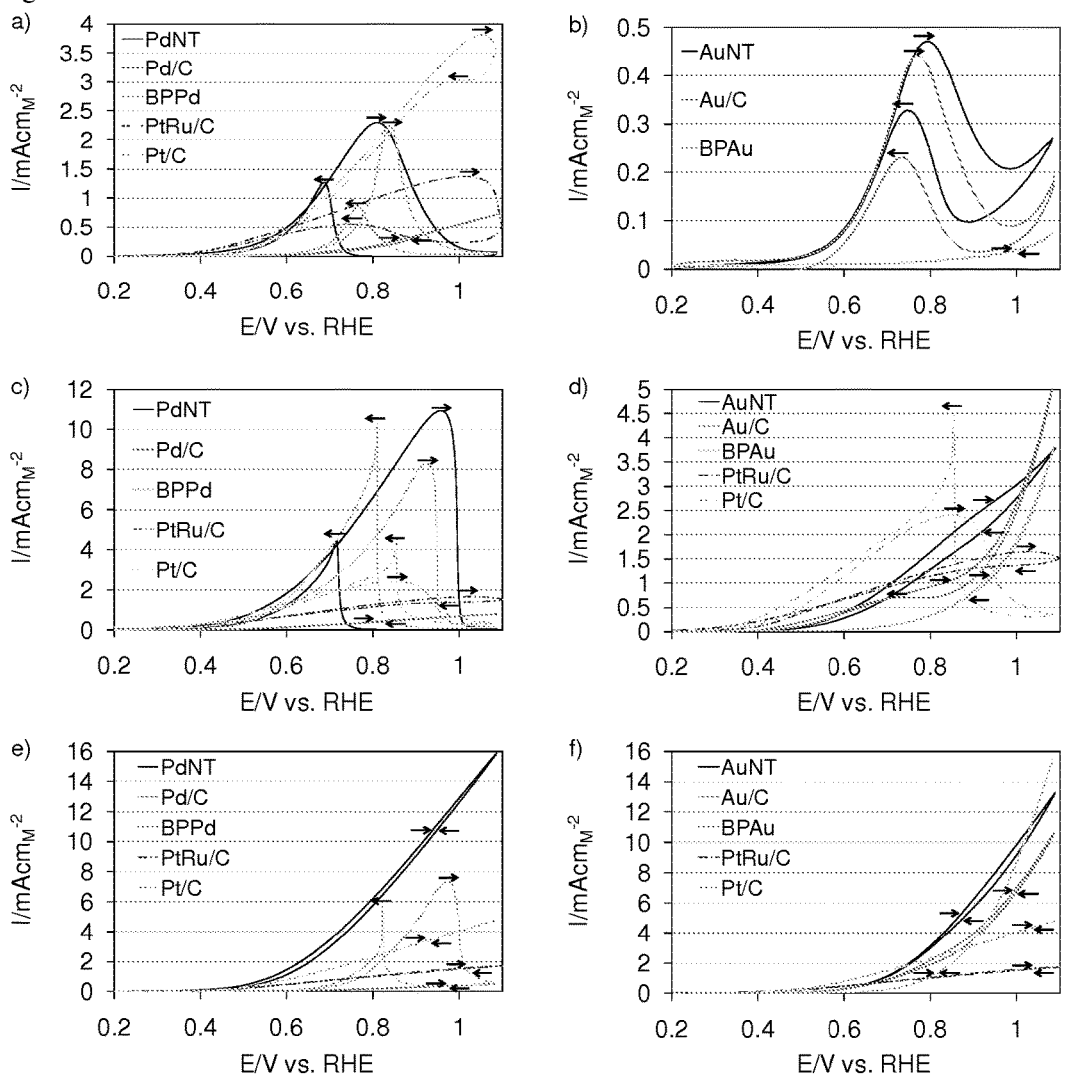
FIG. 37. Methanol oxidation voltammograms of a) PdNTs, Pd/C, BPPd, PtRu/C, and Pt/C and b) AuNTs, Au/C, and BPAu. Ethanol oxidation voltammograms of c) PdNTs, Pd/C, BPPd, PtRu/C, and Pt/C and d) AuNTs, Au/C, BPAu, PtRu/C, and Pt/C. Ethylene glycol oxidation voltammograms of e) PdNTs, Pd/C, BPPd, PtRu/C, and Pt/C and f) AuNTs, Au/C, BPAu, PtRu/C, and Pt/C. All alcohol oxidation experiments were performed in a 0.1 M KOH electrolyte containing 1.0 M alcohol at a scan rate of 5 mVs$^{-1}$. Forward (→) and reverse (←) scan directions were denoted in the figure by arrows.

The quasi steady activities of Pd, Au, and Pt catalysts were determined for MOR, EOR, and EGOR in an alkaline electrolyte (FIG. 14). PtRu/C was included in the analysis, since this catalyst is commonly used in acidic DAFCs. Complete voltammograms were performed but are not the focus since the onset potential region typifies the demand of DAFC anodes (FIG. 37).

PdNTs produced a lower onset potential than all examined catalysts for MOR and EGOR PdNTs further met or exceeded the specific activity of Pt/C in the low overpotential range for all alcohol oxidation. Among Pd catalysts, PdNTs significantly outperform Pd/C, producing a peak specific threefold to ninefold higher and an onset potential 0.15 to 0.20 V lower. In the low overpotential, PdNTs also produced a specific activity at least an order of magnitude greater than Pd/C for all alcohol oxidation experiments. It is also important to note that the PdNTs exceeded the mass activity of Pd/C regardless of potential or alcohol while only expressing one fourth the surface area.

AuNTs produced a lower onset potential than all Au or Pt catalysts in EGOR. Among Au catalysts, AuNTs produced a lower onset potential than Au/C in alcohol oxidation experiments. In terms of specific activity, AuNTs narrowly outperformed Au/C in both the low and high overpotential regions. Due to a significantly larger surface area, AuNTs produced approximately an eightfold higher mass activity for alcohol oxidation.

In the low overpotential region, extended networks and compressed lattices are beneficial characteristics. Previous studies of Pt in acidic electrolytes found that lattice compression improved the onset potential for MOR and carbon monoxide oxidation.[127, 128] The extended PdNT surface improved the alcohol oxidation activity in comparison to the small isolated particles of Pd/C; the compressed lattice of PdNTs further improved the onset potential.

Figure 15:
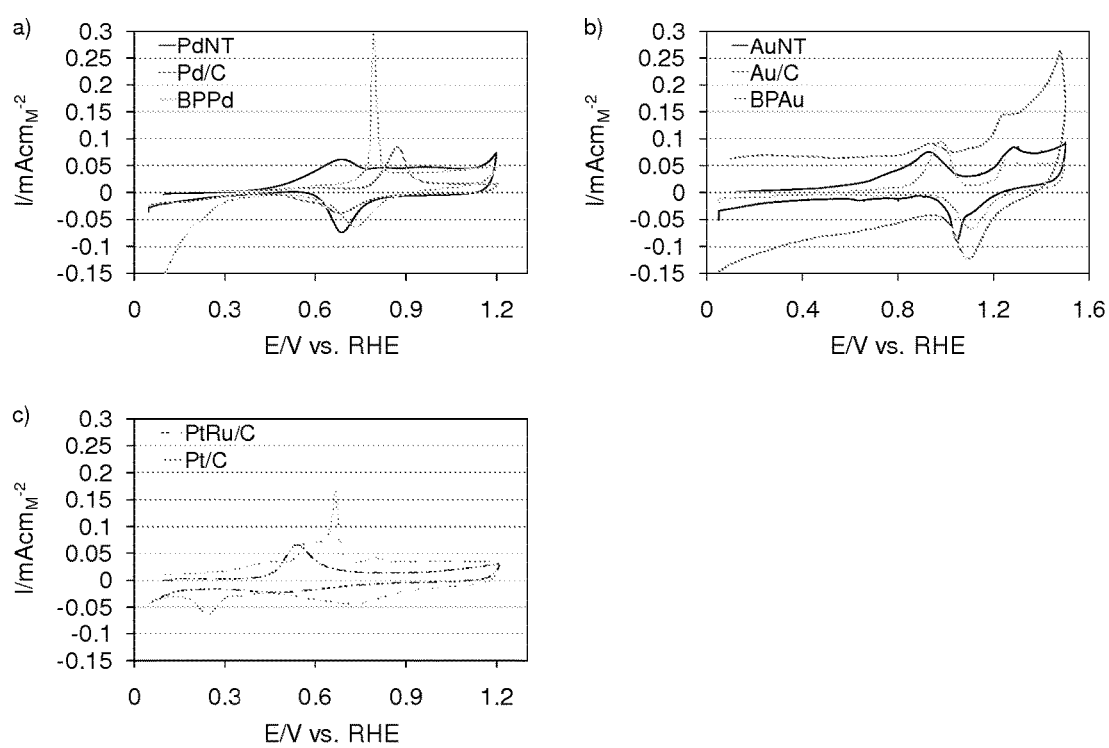
FIG. 15. Carbon monoxide oxidation voltammograms of a) PdNTs, Pd/C, and BPPd; b) AuNTs, Au/C, and BPAu; and c) PtRu/C and Pt/C. Catalyst exposure was set to 10 minutes at 0.1 V vs. RHE in a carbon monoxide saturated 0.1 M KOH electrolyte.

Carbon monoxide oxidation experiments were conducted to independently examine the intermediate tolerance of catalysts during alcohol oxidation (FIG. 15). PdNTs, Pd/C, and BPPd expressed peak carbon monoxide oxidation potentials of 0.695 V, 0.881 V, and 0.794 V, respectively. Although the PdNTs required a high potential for peak oxidation than Pt/C (0.668 V), the carbon monoxide onset potential for PdNTs (0.380 V) was similar to PtRu/C. AuNTs, Au/C, and BPAu produced peak carbon monoxide oxidation potentials of 0.939 V, 0.949 V, and 0.987 V, respectively. The high oxidation potential of carbon monoxide was attributed to the high redox potential of pure Au catalysts.

For intermediate tolerance, a compressed lattice and an electrodispersed surface are beneficial. Studies in acidic electrolytes found that electrodispersed Pt suffered less intermediate adsorption and poisoning during MOR.[47, 48] The carbon monoxide peak oxidation potential, lower for the nanotubes than nanoparticles, was attributed to the compressed lattice as templated from the fivefold twinned AgNWs. Further morphological analysis found that the PdNTs were composed of an agglomeration of Pd particles (<2 nm) solidified into nanotubes (FIG. 32). Although the PdNTs had a rough surface, the AuNT surface was extremely smooth. While the displacement potential for Au was higher (Au: 0.928 V; Pd: 0.179 V), the 1:1 Au:Ag displacement ratio slowed the rate of displacement resulting in a smooth, crystalline surface.

PdNTs, therefore, expressed the traits desirable in a pure metal alcohol oxidizing catalyst: a compressed lattice, lowering the onset potential of alcohol and intermediate oxidization; an extended network increasing specific activity; and a rough, electrodispersed surface decreasing intermediate adsorption and poisoning. In comparison to Pd/C, an electrodispersed surface, and BPPd, an extended surface, PdNTs dramatically excelled for alcohol oxidation experiments. AuNTs, however, were an extended network with a compressed lattice, but lacked an electrodispersed surface. In comparison to Au/C, a quasi-extended electrodispersed surface, and BPAu, an extended surface, AuNTs marginally exceeded in terms of specific activities and onset potentials. Furthermore, due to the high redox potential of pure Au catalysts, AuNTs were unable to outperform Pt catalysts in alcohol oxidation.

Figure 38:
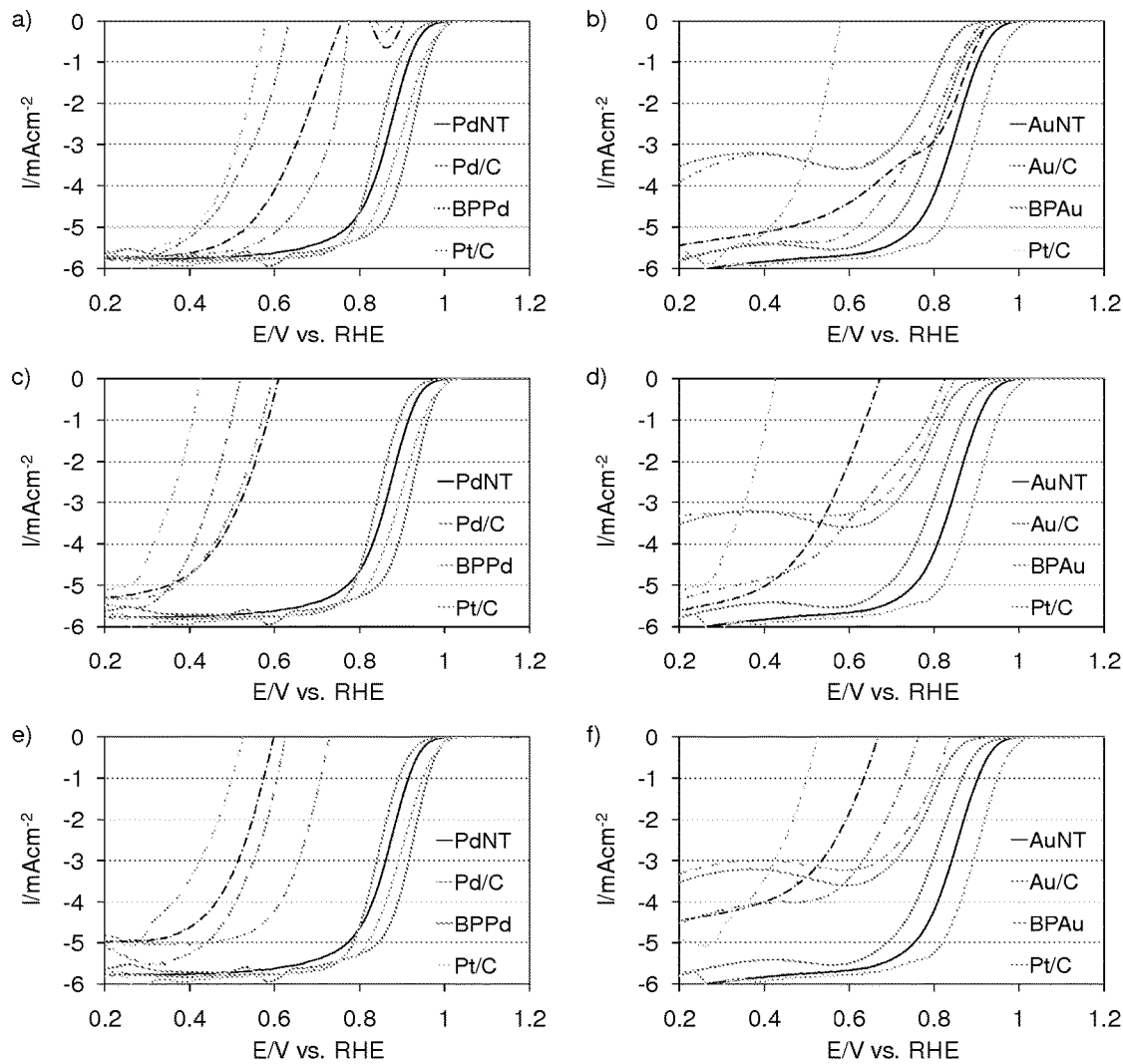
FIG. 38. ORR alcohol tolerance data of PdNTs, Pd/C, BPPd, and Pt/C in a) methanol, c) ethanol, and e) ethylene glycol. ORR alcohol tolerance data of AuNTs, Au/C, BPAu, and Pt/C in b) methanol, d) ethanol, and f) ethylene glycol. ORR data was collected during anodic polarization scans at 20 mVs$^{-1}$ and 1600 rpm in an oxygen saturated 0.1 M KOH electrolyte with and without 1.0 M alcohol.

The alcohol tolerance of catalysts for ORR was also examined through rotating disk electrode (RDE) experiments (Table 3 and FIG. 38). As anticipated from alcohol oxidation data, tolerance improved in the order: Pt<Pd<Au. Alcohol tolerance further depended on the alcohol utilized, improving in the order: ethanol≤ethylene glycol<methanol. Of particular interest is that the $E_{1/2}$ of PdNTs shifted less than Pd/C, in spite of higher mass activities and lower onset potentials for alcohol oxidation. The half wave potential shifts of AuNTs were larger than Au/C; since the Au surface characteristics and alcohol oxidation specific activities were similar, this difference was attributed to a larger ECSA.

TABLE 3

Alcohol tolerance for ORR. Catalyst $E_{1/2}$ was reported in V for ORR in a 0.1 m KOH electrolyte. Catalyst ORR $E_{1/2}$ shift following 1.0 m alcohol addition was reported in mV normalized to the reference electrode.

| | KOH [V][a] | Methanol [mV][b] | Ethanol [mV][c] | EG [mV][d] |
|---|---|---|---|---|
| AuNTs | 0.844 | −45 | −283 | −303 |
| Au/C | 0.800 | −30 | −158 | −161 |
| BPAu | 0.716 | 0 | −39 | −34 |
| PdNTs | 0.863 | −209 | −343 | −347 |
| Pd/C | 0.917 | −365 | −469 | −362 |
| BPPd | 0.842 | −111 | −334 | −182 |
| Pt/C | 0.894 | −380 | −538 | −466 |

[a]ORR $E_{1/2}$ in a 0.1 m KOH electrolyte.
[b]ORR $E_{1/2}$ shift following the addition of 1.0 m methanol.
[c]ORR $E_{1/2}$ shift following the addition of 1.0 m ethanol.
[d]ORR $E_{1/2}$ shift following the addition of 1.0 m ethylene glycol.

Conclusions

PdNTs and AuNTs were examined in this study to determine the effect of extended networks, growth directions, electrodispersion, and lattice tuning on catalytic activity for ORR and alcohol oxidation. This study is the first of its kind to examine high surface area extended network Pd or Au catalysts for ORR in an alkaline environment. Although Ag is generally regarded as the prototypical HEMFC cathode catalyst, Ag produces a specific ORR activity an order of magnitude less than Pt. Due to price recent fluctuations, Ag is unlikely to be useful in the commercial realization of HEMFCs. Pd and Au, however, are poised to fill this role; PdNTs and AuNTs each exceed the ORR specific activity of Pt/C. These catalysts demonstrate the ability of HEMFCs to utilize metals that produce a higher ORR activity than Pt at a lower cost.

This study is also the first of its kind to examine Pd or Au extended network catalysts for specific MOR, EOR, or EGOR activity. PdNTs produced a higher peak specific activity and a lower onset potential than Pd/C and BPPd for alcohol oxidation. PdNTs further required a lower onset potential than all examined catalysts in MOR and EGOR oxidation. At 0.2 V vs. RHE, PdNTs require an onset potential significantly than acidic DAFC catalysts. The high activity, low onset, and relatively low cost of PdNTs demonstrates the benefit of HEM DAFCs: the cost effective, convenient use of alcohol fuels with a significant sacrifice in cell voltage in comparison to HEMFCs. The use of Pd and Au further improves the alcohol tolerance of DAFC cathodes; PdNTs and AuNTs can therefore not only be utilized as DAFC anodes, but as highly active alcohol tolerant ORR catalysts as well.

Experimental

PdNTs and AuNTs were synthesized via the galvanic displacement of AgNWs. The AgNW template was synthesized by the reduction of Ag nitrate with ethylene glycol.

Ethylene glycol was first refluxed in an argon environment for 4 hrs. to ensure impurity removal prior to AgNW synthesis. Fifteen mL of the resulting ethylene glycol solution was added to a 3-neck round bottom flask equipped with a condenser, thermocouple, and addition funnel. Following 10 min. at 170° C., 1.25 mL of 0.4 mm chloroplatinic acid in ethylene glycol was added to the flask. Five minutes were allowed for the Pt to reduce and the flask contents to return to reaction temperature. An ethylene glycol solution (18 mL) containing 0.05 m Ag nitrate and 0.1 m polyvinyl pyrrolidone was then added dropwise over a period of 19 minutes. The reaction proceeded for another 10 min. at which point it was quenched in an ice bath. The AgNWs were subsequently separated into 5 mL aliquots and washed in ethanol and acetone.

Two aliquots of AgNWs were repeatedly washed in water and then dispersed in a 200 mL aqueous solution of 16.74 mm polyvinyl pyrrolidone. This solution was heated to reflux in a 3-neck round bottom flask fitted with a condenser, thermocouple, and addition funnel. In the synthesis of PdNTs, 100 mL of an aqueous solution of sodium tetrachloropalladate (1.75 mm) was added dropwise to the flask over a period of 15 min. In the synthesis of AuNTs, 100 mL of an aqueous solution of Au (I) chloride (3.50 mm) was added dropwise to the flask over a period of 15 min. The reaction proceeded for an hr. prior to being quenched in an ice bath. PdNTs and AuNTs were washed with sodium chloride, followed by water.

SEM images were taken with a Philips XL30-FEG microscope at 20 kV; TEM images were taken with a Philips CM300 microscope at 300 kV. Selected area electron diffraction (SAED) patterns were taken at a length of 24.5 cm. SAED patterns contain the superimposed fivefold twinned lattices, with the {100} ([001]), {111} ([1$\overline{12}$]), and {110} ([1$\overline{12}$], [001]) reflections present. Spacing between the {111} lattices was confirmed with high resolution TEM; spacing between the {100}, {111}, and {110} lattices was confirmed with SAED.

RDE experiments were conducted in a 3-electrode system equipped with a 5 mm glassy carbon working electrode, platinum wire counter electrode, and mercury mercurous oxide reference electrode. The working electrode was equipped with a modulated speed type rotation controller and data was collected by a multichannel potentiostat. Catalysts were coated onto the glassy carbon working electrode with a metal loading of 40 µgcm$^{-2}$ in conjunction with 10 µL of a 0.05 wt % Nafion solution. In addition to PdNTs and AuNTs, the following commercial catalysts were examined for reference: Pt/C (20 wt %, E-TEK), PtRu/C (50 wt % Pt, 25 wt % Ru, Johnson Matthey), Pd/C (20 wt %, Premetek Company), and Au/C (20 wt %, Premetek Company).

ORR experiments were performed in a 0.1 m KOH electrolyte at a rate 20 mVs$^{-1}$ during an anodic polarization scan at 1600 rpm. Kinetic ORR mass and specific activities were calculated at 0.9 V vs. RHE in order to compare these results to those obtained in acidic electrolytes. ORR specific activities were calculated through ECSAs. The ECSA of Pt/C was calculated in the hydrogen adsorption region, assuming a coulombic charge of 210 $\mu Ccm^{-2}$ (FIG. 36). The ECSA of PtRu/C was calculated from the peak associated with carbon monoxide oxidation, assuming a coulombic charge of 420 $\mu Ccm^{-2}$ (FIG. 15). The ECSAs of Pd/C and Au/C were calculated from the peaks associated with metal oxide reduction, assuming coulombic charges of 420 and 543 $\mu Ccm^{-2}$, respectively (FIG. 36).[129, 130] The validity of these charges was confirmed with studies on BPPd and BPAu electrodes, which expressed rugosities of 1.21 and 1.05, respectively.

Alcohol oxidation voltammograms were performed at 5 mVs$^{-1}$ in a 0.1 m KOH electrolyte containing 1.0 m alcohol. Quasi steady state polarization curves were performed with an anodic scan at 1 mVs$^{-1}$ in a 0.1 m KOH electrolyte containing 1.0 m alcohol. The slower scan rate was employed to minimize the contributions of carbon and metal redox. Potential values vs. the mercury mercurous oxide reference electrode were converted to RHE by measuring the potential difference between the reference electrode and a bulk polycrystalline electrode in a hydrogen saturated 0.1 m KOH electrolyte.[70] The time electrolytes were used was limited in an effort to prevent carbonation.[90]

Platinum Monolayered Palladium Nanotubes as Oxygen Reducing Electrocatalysts

PEMFCs are transformative technologies intended to create a new paradigm in the way energy is used. Although PEMFCs have a high energy density, commercialization of this technology is limited by high catalyst cost and low durability.[6, 7] The development of highly active cathode catalysts is of particular interest since the overpotential for ORR is significantly larger than the hydrogen oxidation reaction (HOR).[14, 15] Pt/C is commonly used as an ORR catalyst; the low specific activity of Pt/C, however, prevents PEMFC deployment.[19, 20] To promote the development of Pt catalysts with high ORR activity, the DOE set benchmarks (2010-2015) for mass activity (0.44 Amg$^{-1}$) and specific activity (0.72 mAcm$^{-2}$). The ORR activity of Pt/C also dramatically drops following durability testing; Pt loss is typically attributed to surface tension driven aggregation, dissolution, Ostwald ripening, and degradation of the carbon support.[21]

Pt coatings have previously been studied for ORR activity.[26, 131] Adzic et al. electrochemically coated Pd with a monolayer of Pt; although Pt coated Pd had a higher ORR activity than pure Pt, electrochemical deposition is impractical in large scale synthesis.[131] Furthermore, Nørskov et al. examined polycrystalline Pt films alloyed with nickel, cobalt (Co), iron, vanadium, and titanium.[26] While the specific ORR activity of the Pt$_3$Co film was three times greater than pure Pt, Pt$_3$Co nanomaterials are unavailable and would likely have too high of a Pt loading to meet the DOE mass activity benchmark. Solution based synthesis of Pt Pd catalysts was also studied previously by Xia et al. in the form of nanodendrites.[23] Although Pt Pd nanodendrites had a reasonably high surface area, the ORR specific activity was modest and catalyst durability was poor considering the high Pt content (85 wt %). The practical application of Pt coated Pd is desirable due to the moderate ORR activity and reduced cost of Pd; solution based synthesis of such a catalyst, however, was not previously completed in part due to the low Pt Pd surface segregation energy.[132]

Previously, PtNTs and PdNTs were examined as ORR catalysts; the extended network and lattice tuning produced an activity significantly larger than conventional nanoparticles.[42, 79] In order to meet the DOE mass activity benchmark, PdNTs were coated with Pt; due to a similar crystal structure and lattice parameters, PdNTs were partially displaced with Pt allowing for Pd to remain subsurface, reducing catalyst cost while maintaining ORR activity. This study is the first to coat atomic layers of Pt onto a Pd substrate without the aid of electrochemical deposition.

Pt/PdNTs with a wall thickness of 5 nm, an outer diameter of 60 nm, and a length of 5-20 μm are synthesized via incomplete galvanic replacement with PdNTs. Pt coatings are controlled to a loading of 9-18 wt %. ORR and durability experiments have been used to evaluate Pt/PdNTs, PtNTs, PdNTs, and Pt/C activity for PEMFC cathodes. The cost and specific ORR activities of all Pt/PdNTs exceed the DOE benchmark, with 9 wt % Pt producing a Pt normalized mass activity of 1.8 Amg$^{-1}$. Following durability testing, Pt/PdNTs with a 9, 14, and 18 Pt wt % retain 79.6%, 77.3%, and 54.3% of their original ORR mass activities. In comparison, Pt/C retains 5.3% of its ORR mass activity following durability testing.

Results and Discussion

Figure 16:
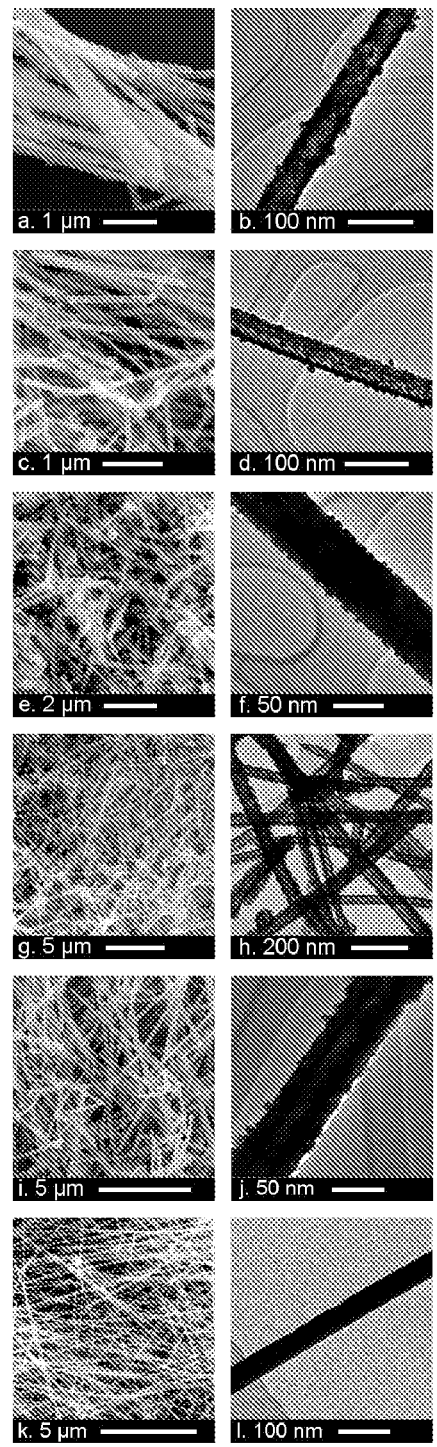
FIG. 16. SEM images of a) PtPd 9, c) PtPd 14, e) PtPd 18, g) PtNTs, i) PdNTs, and k) AgNWs. TEM images of b) PtPd 9, d) PtPd 14, f) PtPd 18, h) PtNTs, j) PdNTs, and l) AgNWs.

Pt/PdNTs were synthesized with Pt loadings of 9 wt % (PtPd 9), 14 wt % (PtPd 14), and 18 wt % (PtPd 18) (FIG. 16 a-f). PtNTs and PdNTs were also included as benchmarks to aid in catalyst evaluation (FIG. 16 g-j). Each nanotube had a wall thickness of 5 nm, an outer diameter of 60 nm, and a length of 5-20 μm. The morphology of the nanotubes was templated by the galvanic displacement of AgNWs, synthesized with a 60 nm diameter and a length of 10-500 μm (FIG. 16 k-l). Pt content within the Pt/PdNTs was determined by energy dispersive x-ray spectroscopy (EDS).

Figure 17:
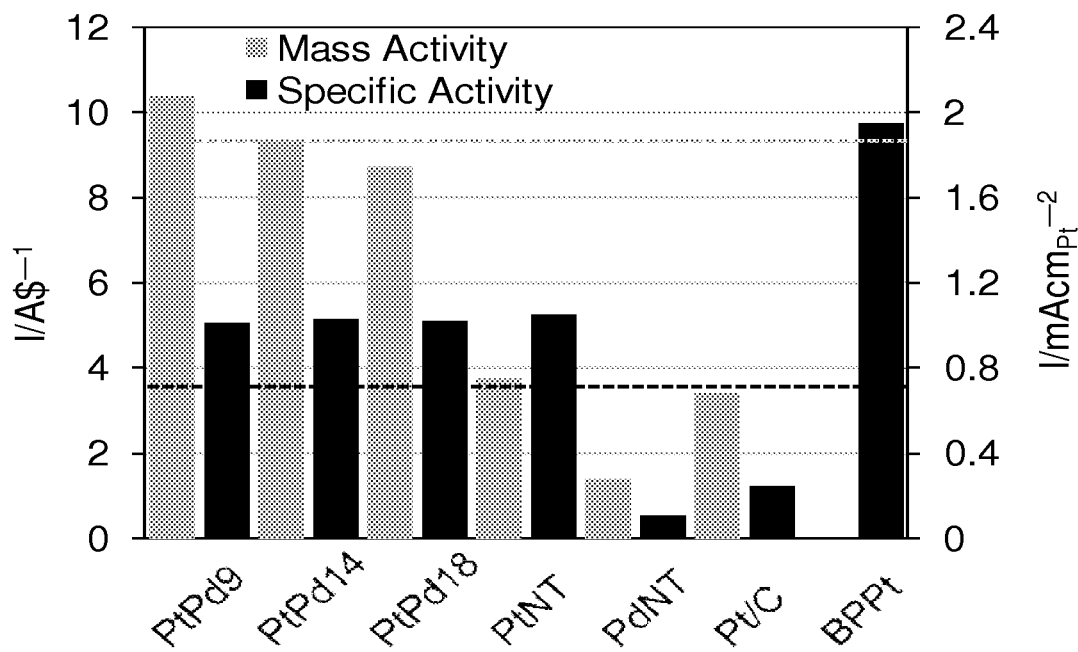
FIG. 17. Cost normalized mass activities and specific activities of PtPd 9, PtPd 14, PtPd 18, PtNTs, PdNTs, Pt/C, and BPPt. Catalysts cost was determined from a five year mean metal price; the cost of the AgNW template and carbon support (Pt/C) was not included. DOE benchmarks for mass and specific activity are denoted by dotted lines ( - - - ).
Figure 39:
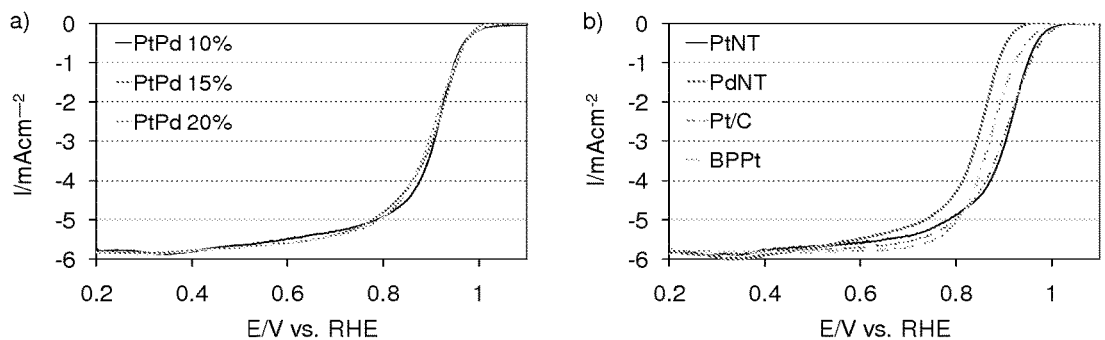
FIG. 39. Anodic polarization scans of a) PtPd 9, PtPd 14, and PtPd 18, and b) PtNTs, PdNTs, Pt/C, and BPPt in an oxygen saturated 0.1 M HClO$_4$ electrolyte. Data was collected at a scan rate of 20 mVs$^{-1}$ and a rotation speed of 1600 rpm.
Figure 40:
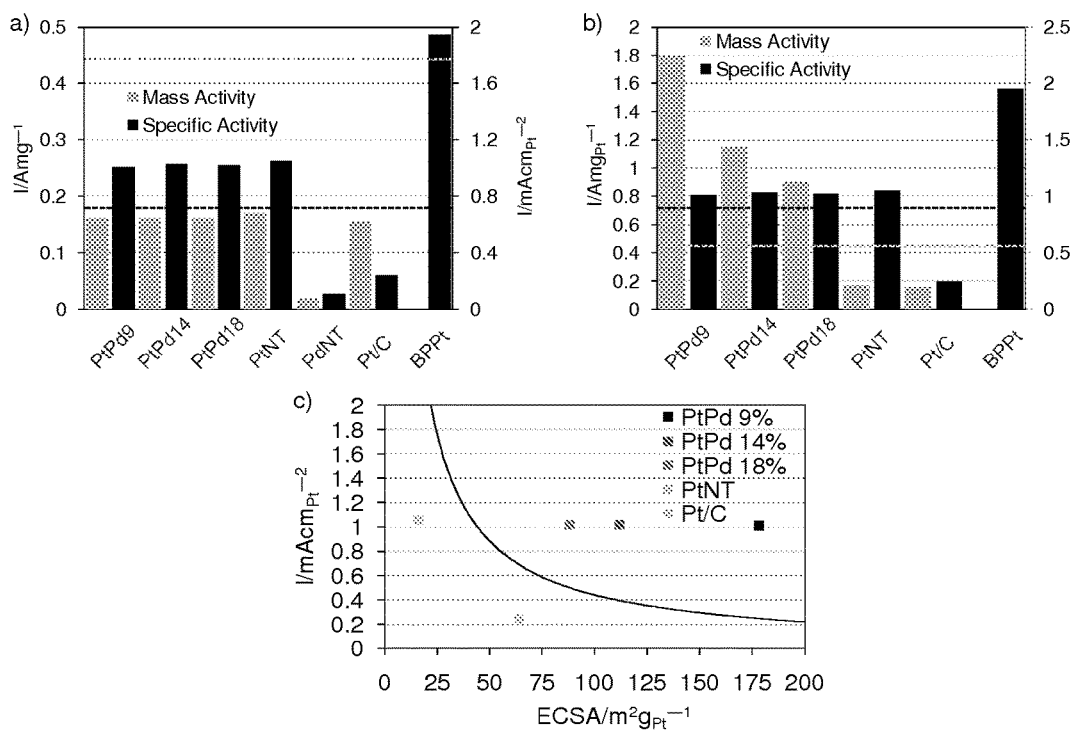
FIG. 40 a) Mass and specific activities of PtPd 9, PtPd 14, PtPd 18, PtNTs, PdNTs, Pt/C and BPPt. b) Pt normalized mass and specific activities of PtPd 9, PtPd 14, PtPd 18, PtNTs, PdNTs, Pt/C and BPPt; DOE benchmarks are denoted by dotted lines ( - - - ). c) Specific activity as a function of Pt normalized surface area; DOE mass activity benchmark denoted by a solid line ( — ).
Figure 41:
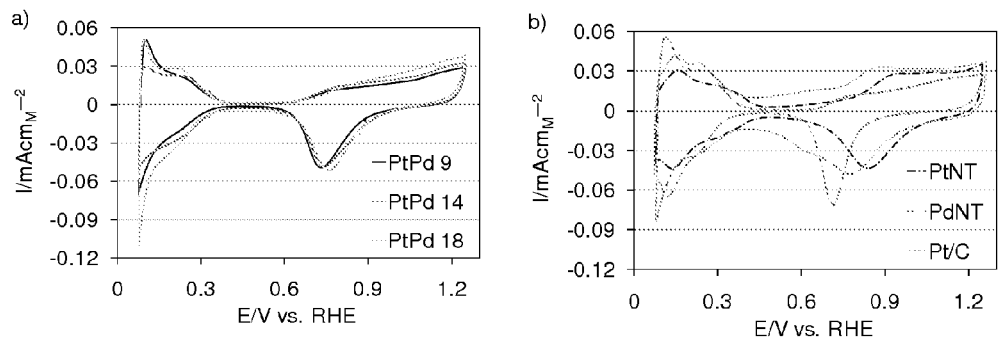
FIG. 41. ECSA normalized cyclic voltammograms of a) PtPd 9, PtPd 14, and PtPd 18, and b) PtNTs, PdNTs, and Pt/C in an argon saturated 0.1 M HClO$_4$ electrolyte.

Catalyst activity for ORR was evaluated in terms of cost normalized mass activity and specific activity (FIG. 17 and FIG. 39). The cost activity of PtPd 9 was 10.39 A$$^{-1}$, exceeding the DOE benchmark by 7.4%. Although PtPd 14 and PtPd 18 produced 96.7% and 90.4% of the benchmark value, each of the Pt/PdNTs dramatically exceeded the cost activity of Pt/C (2.5-3.0 times). The Pt/PdNTs further exceeded the specific activities of the DOE benchmark by 40.2%-43.1%.

Although the benchmark value for mass activity was not previously normalized for the metal price, a cost normalized mass activity was utilized in this case to objectively quantify the cost benefit of Pt/PdNTs. Normalization of mass activities to the Pt content does not adequately account for the cost of the Pd support; in contrast, normalizing the mass activity to the total catalyst mass does not appropriately emphasize that Pd (82-91 wt % of Pt/PdNTs) has a 5 year average metal price 27.7% of Pt (FIG. 39). The 5 year average metal prices (July 2006-2011) for Pt and Pd were $ 1414.68 t oz$^{-1}$ and $392.95 t oz$^{-1}$, respectively. The DOE mass activity benchmark (0.44 Amg$_{Pt}^{-1}$) corresponded to a cost normalized mass activity of 9.67 A$$^{-1}$.

Assuming a uniform coating of Pt, a wall thickness of 5 nm, and a {100} lattice spacing of 2.5 Å. the Pt loadings of 9 wt %, 14 wt %, and 18 wt % corresponded to a coating of 1.1, 1.8, and 2.3 Pt atoms. Although spectroscopy techniques were unable to determine the purity of the Pt shell, ORR specific activities and carbon monoxide oxidation voltammograms were utilized to confirm the presence of a core shell structure.

The lattice spacing and growth directions of all synthesized nanotubes were templated from the AgNW substrate. While previous studies have demonstrated that the electrochemical application of a Pt monolayer on Pd produced a higher ORR activity than pure Pt, differences in activity were attributed to an increased oxidation potential and lattice compression.[131] Electrochemical protocols have since evolved to prevent erosion of ORR hysteresis on Pt and the lattices of Pt/PdNTs and PtNTs were identical; therefore the specific ORR activities of Pt/PdNTs could not have exceeded PtNTs. By linear extrapolation between the specific ORR activities of PtNTs and PdNTs, it was determined the Pt shells of PtPd 9, PtPd 14, and PtPd 18 contained 4.3, 2.1, and 3.2% Pd.

Figure 45:
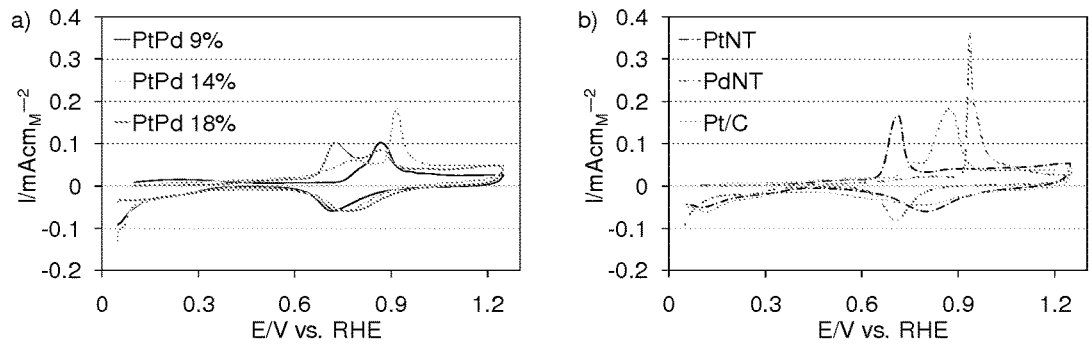
FIG. 45. ECSA normalized carbon monoxide oxidation voltammograms of a) PtPd 9, PtPd 14, PtPd 18, and b) PtNTs, PdNTs, and Pt/C in an carbon monoxide saturated 0.1 M HClO4 electrolyte. Catalysts are exposed for 10 minutes to a carbon monoxide mixture (10% carbon monoxide, balance nitrogen) at 0.1 V vs. RHE; followed by 10 minutes in argon at 0.1 V vs. RHE.

Carbon monoxide oxidation voltammograms further confirmed a thickening of the Pt shell as the Pt loading was increased (FIG. 45).[133] Previously, Eichhorn and Mavrikakis et al. and Sunde et al. confirmed the presence of Pt shell Ru core nanoparticles by the presence of multiple carbon monoxide oxidation peaks; repeated oxidation experiments induced the dissolution of surface Ru, thereby determining if the original shell was pure Pt.[134, 135] Since the immediate dissolution of Pd was impractical, the location of the carbon monoxide oxidation peaks was used to confirm the Pt coating. PtNTs and PdNTs produced carbon monoxide oxidation peaks at potentials of 0.70 and 0.94 V, respectively. Pt/PdNTs produced two characteristic peaks: at 0.71 V indicating Pt bound to subsurface Pt (Pt—Pt), and at 0.85 V indicating Pt bound to subsurface Pd (Pt—Pd). The shift in peak position of Pt—Pd (0.85 V) was attributed to the presence of a Pt surface tuned by the Pd substrate. The PtPd 9 voltammogram was dominated by the Pt—Pd peak; although similar to a pure Pd catalyst, the voltammogram confirmed a uniform surface consistent with the theoretical 1.1 Pt atom coating. For PtPd 14 and PtPd 18, the presence of the two peaks was more apparent and the Pt—Pt peak increased with the Pt loading. For PtPd 18, the Pt—Pt peak accounted for greater than 50% of the surface area, anticipated from the theoretical 2.3 Pt atom coating. Although the two oxidation peaks would also be consistent with an alloy, the carbon monoxide data when coupled with ORR specific activity confirms the presence of an approximate Pt coating.

Figure 18:
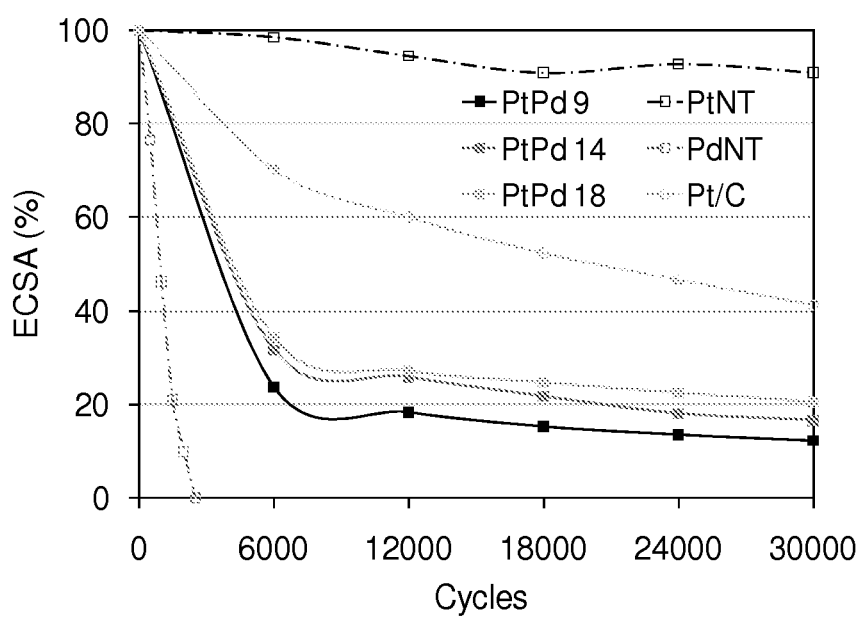
FIG. 18. ECSAs as a function of durability cycles. Durability experiments were conducted by potential cycling 0.6-1.1 V vs. RHE 30,000 times in an argon saturated 0.1 $HClO_4$ electrolyte. Cyclic voltammograms were taken every 6,000 cycles to determine ECSAs, except for PdNTs where ECSA were determined every 500 cycles.
Figure 42:
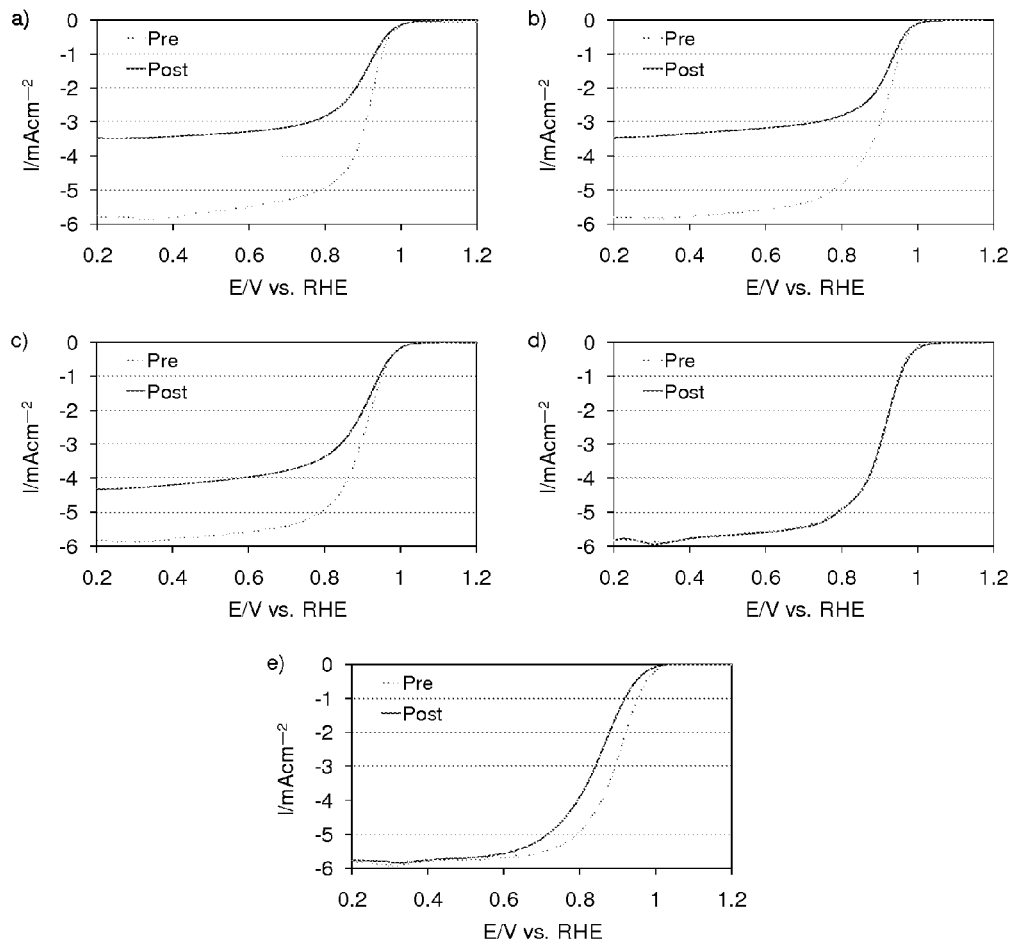
FIG. 42. Anodic polarization scans of a) PtPd 9, b) PtPd 14, c) PtPd 18, d) PtNTs, and e) Pt/C prior to and following durability testing in an oxygen saturated 0.1 M HClO$_4$ electrolyte. Data was collected at a scan rate of 20 mVs$^{-1}$ and a rotation speed of 1600 rpm.

Durability experiments were conducted to evaluate the ability of catalysts to retain surface area and ORR activity. Potential was cycled (0.6-1.1 V) 30,000 times with ECSA measurements taken every 6,000 cycles (FIG. 18). Although the ECSA retention of PtNTs (92.7%) was much higher than Pt/C (46.7%), Pt/PdNT losses were more severe. The ECSA loss of Pt/PdNTs was attributed to the lower dissolution potential of Pd (0.915 V) in comparison to Pt (1.188 V); Pd dissolution was further confirmed through the PdNT ECSA, EDS measurements, and the receding Pt/PdNT ORR diffusion limiting current following durability testing (FIG. 18 and FIG. 42). Dissolution normalized ECSAs of Pt/PdNTs yielded similar results to Pt/C; although the extended network previously benefitted durability, the thickness of the Pt layer (1.1-2.3 atoms) may have increased the rate of Pt degradation and loss.

Figure 19:
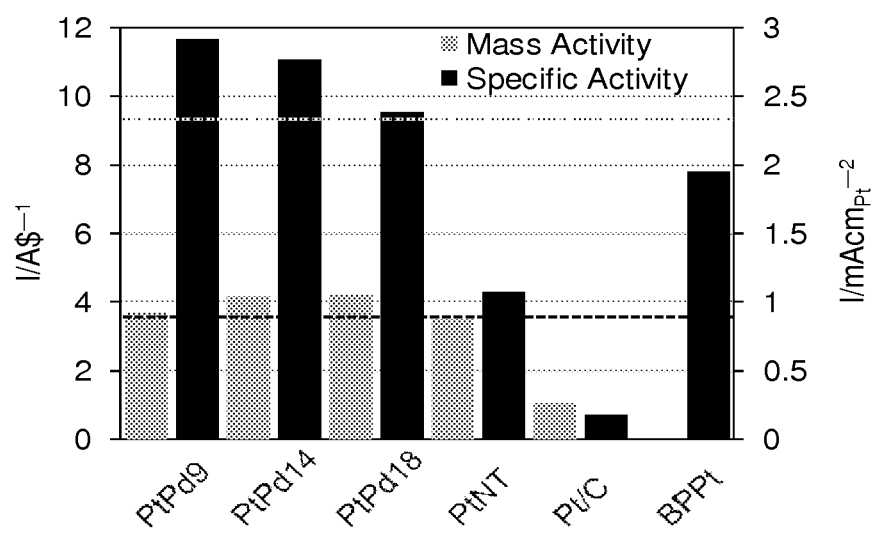
FIG. 19. Cost normalized mass activities and specific activities of PtPd 9, PtPd 14, PtPd 18, PtNTs. PdNTs, Pt/C, and BPPt following durability testing. DOE benchmarks for mass and specific activity are denoted by dotted lines ( - - - ).
Figure 43:
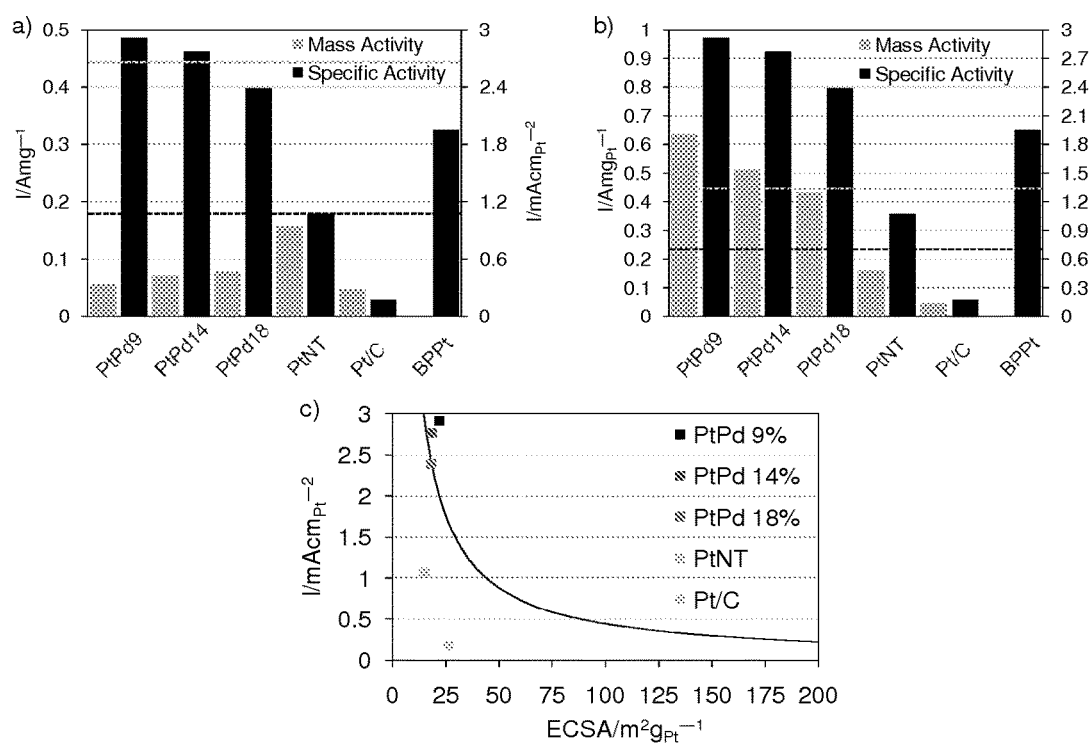
FIG. 43. a) Mass and specific activities of PtPd 9, PtPd 14, PtPd 18, PtNTs, Pt/C and BPPt following durability testing. b) Pt normalized mass and specific activities of PtPd 9, PtPd 14, PtPd 18, PtNTs, Pt/C and BPPt following durability testing; DOE benchmarks are denoted by dotted lines ( - - - ). c) Specific activity as a function of Pt normalized surface area; DOE mass activity benchmark denoted by a solid line ( — ).
Figure 44:
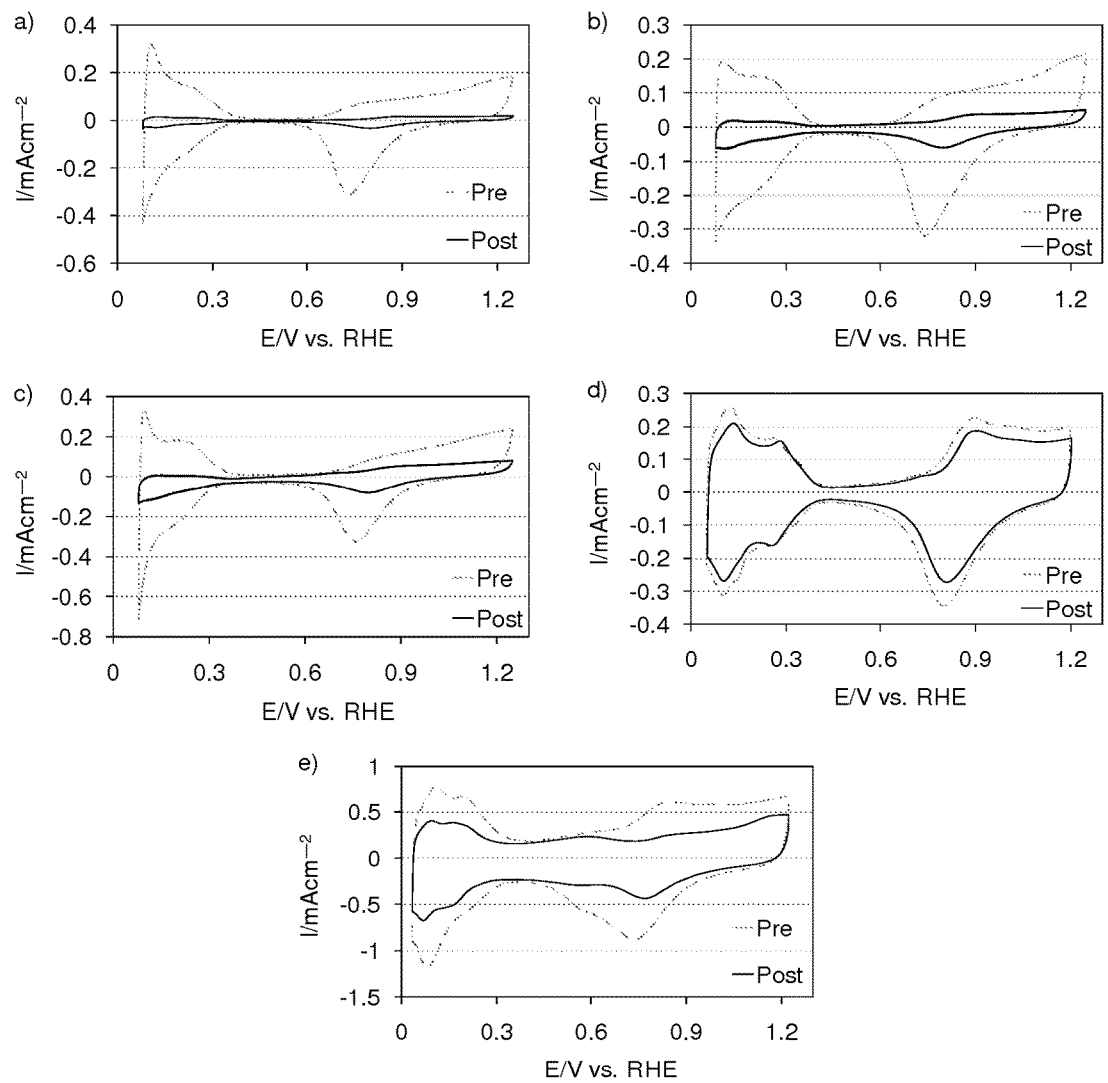
FIG. 44. Cyclic voltammograms prior to and following durability testing for a) PtPd 9, b) PtPd 14, c) PtPd 18, d) PtNTs, and e) Pt/C.

Catalyst activity for ORR following durability testing was evaluated in terms of cost normalized mass activity and specific activity (FIG. 19, FIG. 42, and FIG. 43). Of particular interest was that Pt/PdNTs maintained high activity for ORR in spite of Pd dissolution and heavy ECSA losses. The specific ORR activities of Pt/PdNTs and PtNTs exceeded the benchmark following durability testing by 3.3-4.1 times and 49.0%, respectively. Although the cost activities decreased following durability testing, PtPd 18 produced a cost activity 83.9% of the benchmark when the mass loading was normalized to account for Pd dissolution. Furthermore, Pt/PdNTs produced cost activities 3.5-4.1 times greater than Pt/C following durability testing, without normalization for Pd dissolution.

Figure 46:
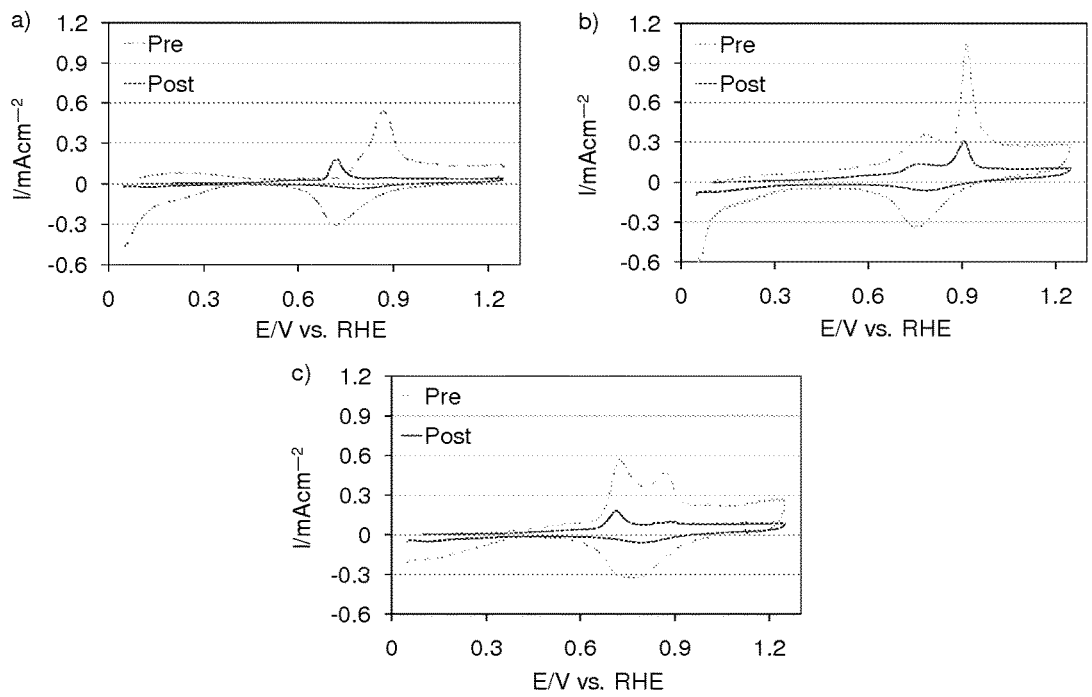
FIG. 46. Carbon monoxide oxidation voltammograms prior to and following durability testing for a) PtPd 9, b) PtPd 14, and c) PtPd 18.
Figure 47:
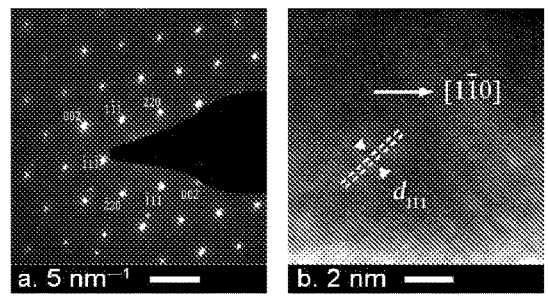
FIG. 47. a) SAED pattern and b) HRTEM image of PtNTs.

Carbon monoxide oxidation voltammograms were conducted following durability testing (FIG. 46). While the charge response decreased in proportion to the ECSA loss, the Pt—Pt and Pt—Pd peak proportions did not change for PtPd 14 and PtPd 18. In the case of PtPd 9, however, the Pt—Pd peak severely decreased in size and was replaced by the Pt—Pt peak. The peak shift indicated a higher degree of Pd loss, as anticipated with the thinner Pt coating; The larger degree of Pd dissolution was confirmed by EDS and ORR measurements.

Conclusions

In summation, the work presented here demonstrates that nanotube templated Pt coatings are clearly the path for the development of PEMFC cathode catalysts. The Pt content of pure PtNTs was decreased to 9 wt %, replacing nearly all subsurface Pt with Pd; PtPd 9 produced an ORR mass activity 95% of PtNTs. The cost activity of PtPd 9, therefore, was 2.8 times greater and exceeded the DOE benchmark. The specific activity of Pt/PdNTs further matched PtNTs and outperformed the DOE benchmark by greater than 40%. In comparison to Pt/C, Pt/PdNTs maintained higher ORR activities in spite of the presence of a Pd substrate. It is anticipated that Pt/PdNTs would allow for a thin electrode catalyst layer, improving Pt utilization and mass transport. The solution based synthesis of sub nanometer templated coatings is a milestone in its own right and pertinent to a variety of applications for nanomaterial electrocatalysts.

Experimental

AgNWs were synthesized via the reduction of Ag nitrate with ethylene glycol in the presence of chloroplatinic acid, provided for wire seeding, and polyvinyl pyrollidone, provided for morphological control. PtNTs and PdNTs were synthesized by the galvanic displacement of AgNWs. Pt/PdNTs were synthesized by the partial galvanic replacement of PdNTs with Pt.

Ethylene glycol was refluxed over 4 hrs. in the presence of argon prior to AgNW synthesis to ensure impurity removal. For AgNW synthesis, 15 mL of ethylene glycol was heated to 170° C. in a 3-neck round bottom flask equipped with a thermocouple, condenser passing argon, addition funnel, and stir bar. After 10 min. at 170° C., a 1.25 mL solution of chloroplatinic acid in ethylene glycol was injected. Following a 5 min. wait period, 18 mL of 0.1 M polyvinyl pyrollidone and 0.05 M silver nitrate in ethylene glycol was added to the flask dropwise over 19 min via the addition funnel. The reaction was allowed to continue for 5 min., at which point the flask was immersed in an ice bath. AgNWs (5 mL aliquots) were distributed into 50 mL centrifuge tubes and washed in ethanol, acetone, and water.

In PtNT synthesis, 20 mL of cleaned AgNWs were dispersed in 200 mL of water saturated with sodium chloride. The solution was added to a 500 mL 3-neck round bottom flask equipped with a thermocouple, condenser passing argon, stir bar, and an addition funnel containing 100 mL of 0.86 mm chloroplatinic acid. Following 15 min. at reflux, the chloroplatinic acid solution was added dropwise to the flask over a period of 15 min. The flask then proceeded at reflux for 1 hr. before the reaction was quenched in an ice bath, and the flask contents were subsequently washed with a saturated sodium chloride solution and water. PdNTs were synthesized by dispersing 20 mL of cleaned AgNWs in 400 mL of a 16.7 mm polyvinyl pyrollidone in water solution saturated with sodium chloride. The solution was added to an experimental apparatus identical to PtNT synthesis, with the addition funnel containing 200 mL of 1.8 mm sodium tetrachloropalladate. Reaction and cleaning protocols were identical to the PtNT synthesis.

Pt/PdNTs were synthesized by adding 400 mL of an aqueous solution of 1.2 mm PdNT to a 1-L 3-neck round bottom flask containing a thermocouple, condenser passing argon, stir bar, and addition funnel containing 200 mL of chloroplatinic acid with varying concentration. Reaction and cleaning protocols were identical to the PtNT synthesis. Prior to electrochemical testing, PtNTs, PdNTs, and Pt/PdNTs were washed with 0.5 M $HNO_3$ in an argon environment for 2 h. PtNTs and PdNTs were subsequently annealed at 250° C. in a forming gas environment (5% hydrogen). Pt/PdNTs were annealed at 150° C. to prevent migration of surface Pt into the Pd substrate.

SEM images were taken at 20 kV using a Philips XL30-FEG microscope. TEM images were taken at 300 kV using a Philips CM300 microscope with samples pipetted onto a holey carbon coatings supported on copper grids. Electrochemical experiments were completed with a multichannel potentiostat (Princeton Applied Research) and a Modulated Speed Rotator rotator equipped with a 5 mm glassy carbon electrode (Pine Instruments). RDE experiments were conducted in a three-electrode cell, with a glassy carbon electrode, platinum wire, and double junction silver/silver chloride electrode (Pine Instruments) utilized as the working, counter, and reference electrodes, respectively. Catalysts were applied to the working electrode with a fixed metal loading of 40 $\mu gcm^{-2}$. Following catalyst addition, 10 µL of 0.05 wt. % Nafion (Liquion) were pipetted onto the working electrode to protect the catalyst layer during rotation.

ORR and cyclic voltammetry experiments were completed at a scan rate of 20 $mVs^{-1}$ in a 0.1 M $HClO_4$ electrolyte. Specific activities were calculated with ECSAs as determined by carbon monoxide oxidation and verified with charge associated with hydrogen adsorption during cyclic voltammetry experiments (FIG. 41, FIG. 44, FIG. 45, and FIG. 46). Durability experiments were completed by potential cycling between 0.6-1.1 V versus RHE at 50 $mVs^{-1}$ in an argon-saturated 0.1 M $HClO_4$ electrolyte. Conversions between the Ag/AgCl reference electrode and RHE were conducted by measuring the potential drop between the reference electrode and a bulk polycrystalline Pt electrode in a hydrogen-saturated electrolyte.[70]

Copper Templated Platinum Nanotubes as Oxygen Reducing Electrocatalysts

The commercial deployment of PEMFCs is limited by high catalyst cost and low durability.[6, 7] The development of catalysts with high ORR activity is essential to PEMFCs since the majority of activation losses occur at the cathode.[14, 15] Pt/C is typically utilized as the ORR catalyst, but will be unable to eliminate the technological barrier to PEMFC commercialization. The ORR activity of Pt/C is limited by a Pt particle size effect; to promote the development of highly active ORR catalysts, the DOE set mass (0.44 $Amg^{-1}$) and specific (0.72 $mAcm^{-2}$) activity benchmarks for 2010-2015.[19, 20] The durability of Pt/C is further limited by the degradation of the carbon support and the degradation of Pt through Ostwald ripening, surface tension driven agglomeration, and potential driven dissolution and migration into the proton exchange membrane.[21]

CuNWs were previously used as a nanotube template by Xia et al. who studied PtNTs for formic acid oxidation activity.[136] Although the activity of PtNTs was significantly larger than Pt/C, the templated growth directions were not preserved and ORR activity was not examined. Pt coatings were also studied by Nørskov et al.; electronic tuning effects on Pt, introduced with alloying, were examined for alterations in ORR activity.[26] While the specific ORR activity of the $Pt_3Co$ film was three times greater than pure Pt, high surface area $Pt_3Co$ catalysts are unavailable and the high Pt content diminishes the Pt mass activity.

Previously, PtNTs were synthesized by galvanically displacing AgNWs and studied for ORR activity.[42, 79] PdNTs were further coated with Pt in an effort to reduce the Pt loading, thereby increasing the ORR cost normalized mass activity. In this study, CuNWs were utilized as the template, creating PtNTs with growth directions and lattice parameters unique from nanotubes previously examined. Pt/CuNWs were also synthesized by the partial displacement of Cu with Pt to meet the DOE mass activity benchmark.

PtNTs with a wall thickness of 11 nm, an outer diameter of 100 nm, and a length of 5-20 µm are synthesized by the galvanic displacement of copper nanowires (CuNWs). Pt/CuNWs (Pt 18 wt %) and Pt/PdNTs (9 wt % Pt) are synthesized by the incomplete galvanic displacement of CuNWs and PdNTs, respectively. CuNWs are synthesized by the sodium hydroxide and hydrazine reduction of Cu nitrate. ORR and durability experiments have been conducted on PtNTs, PdNTs, Pt/CuNWs, Pt/PdNTs, and Pt/C to evaluate catalyst activity for use as PEMFC cathodes. The ORR specific activities of all Pt extended surface catalysts (1.22-1.31 $mAcm^{-2}$) exceed the DOE benchmark; Pt/CuNWs also exceed the DOE cost activity benchmark. Durability testing of each catalyst shows improved retention of ORR activity in comparison to Pt/C.

Results and Discussion

Figure 20:
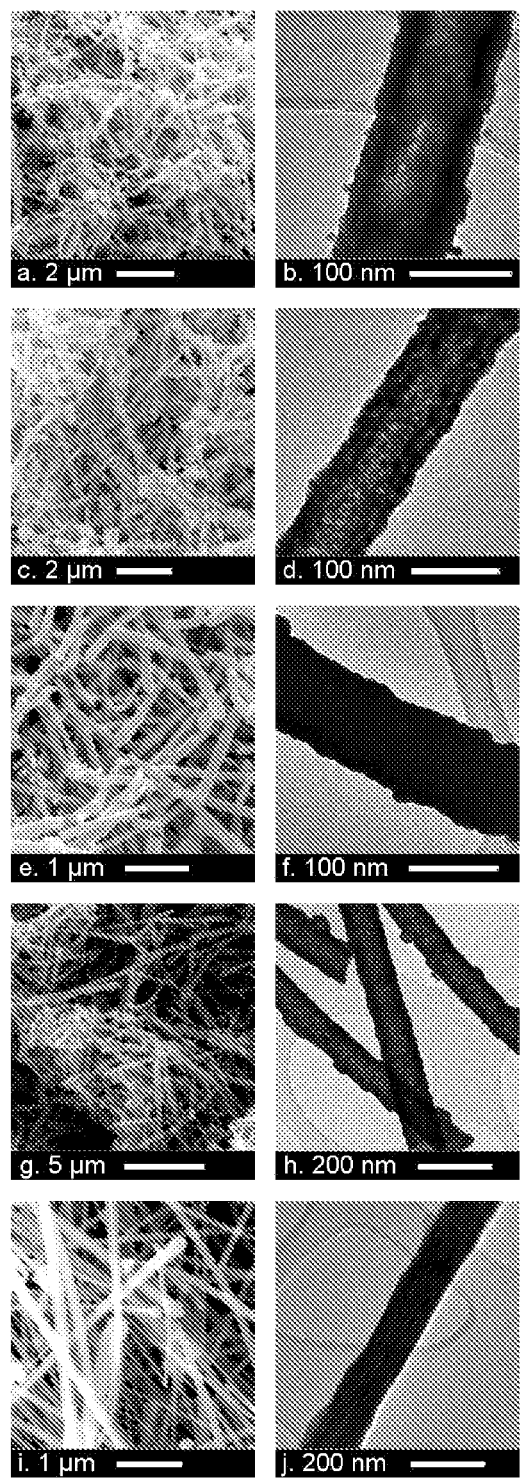
FIG. 20. SEM images of a) Pt/PdNTs, c) Pt/CuNWs, e) PtNTs, g) PdNTs, and i) CuNWs. TEM images of b) Pt/PdNTs, d) Pt/CuNWs, f) PtNTs, h) PdNTs, and j) CuNWs.

Pt/CuNWs were synthesized with a diameter of 100 nm and a length of 25-40 µm (FIG. 20 c-d). Pt/PdNTs were synthesized with a wall thickness of 11 nm, an outer diameter of 100 nm, and a length of 4-15 µm (FIG. 20 a-b). PtNTs and PdNTs were synthesized with wall thicknesses of 11 nm, outer diameters of 100 nm, and lengths of 5-20 µm (FIG. 20 e-h). All nanotubes were formed by the galvanic displacement of CuNWs, which had an outer diameter of 100 nm and a length of 40-50 µm (FIG. 20 i-j). The Pt loadings of Pt/CuNWs and Pt/PdNTs were 18 wt % and 9 wt %, as determined by EDS.

Figure 48:
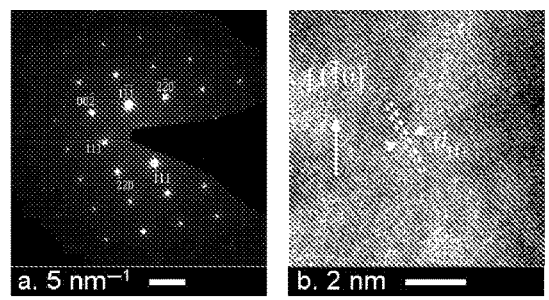
FIG. 48. a) SAED pattern and b) HRTEM image of CuNWs.

SAED images confirmed the presence of single twinned CuNWs with <110> and <111> growth directions (FIG. 48).[137] CuNW lattice spacing, confirmed by high resolution TEM and SAED, was determined to be 1.31 Å ({100} lattice), 1.60 Å ({110} lattice), and 2.33 Å ({111} lattice). PtNTs grew in the <110> and <111> directions, with a lattice spacing of 1.40 Å ({100} lattice), 1.84 Å ({110} lattice), and 2.63 Å ({111} lattice) (FIG. E.1). PdNTs grew in the <110> and <111> directions, with a lattice spacing of 1.38 Å ({100} lattice), 1.75 Å ({110} lattice), and 2.64 Å ({111} lattice). The common growth directions and lattice spacing of CuNWs, PtNTs, and PdNTs was due to matches in crystal structure and atomic size and confirms the templated nanotube growth.

Figure 21:
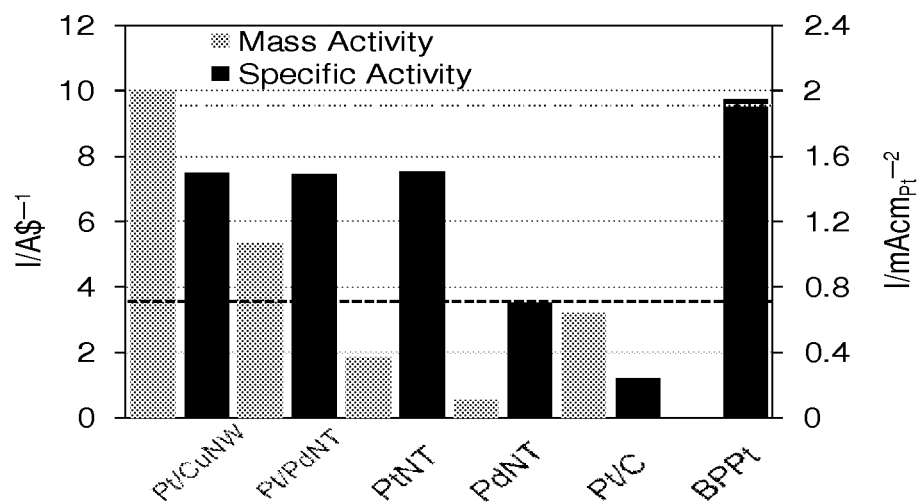
FIG. 21. Cost normalized mass activities and specific activities of Pt/CuNWs, Pt/PdNTs, PtNTs. PdNTs, Pt/C, and BPPt. Catalysts cost was determined from a five year mean metal price; the cost of the CuNW template and carbon support (Pt/C) was not included. DOE benchmarks for mass and specific activity are denoted by dotted lines ( - - - ).
Figure 49:
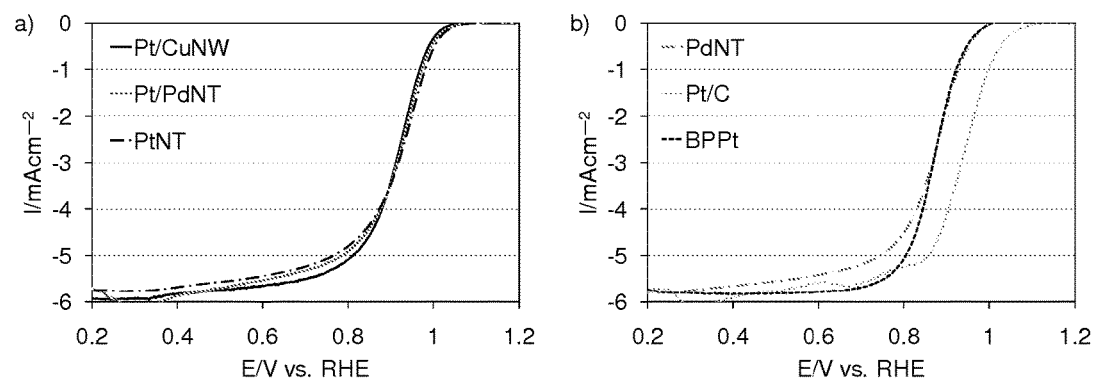
FIG. 49. Anodic polarization curves of a) Pt/PdNTs, Pt/CuNWs, and PtNTs, and b) PdNTs, Pt/C, and BPPt. ORR polarization curves were taken at 20 mVs$^{-1}$ and 1600 rpm in a 0.1 M HClO$_4$ electrolyte.
Figure 50:
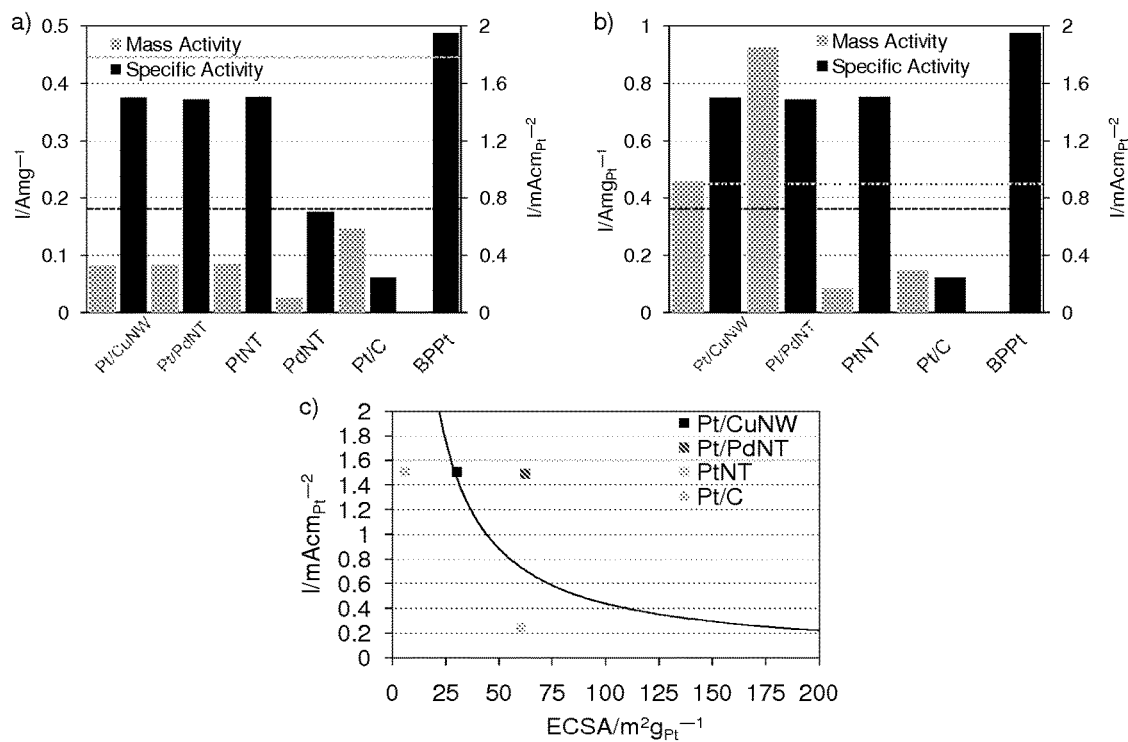
FIG. 50. Mass and specific activities of Pt/PdNTs, Pt/CuNWs, PtNTs. PdNTs, Pt/C and BPPt. b) Pt normalized mass and specific activities of Pt/PdNTs, Pt/CuNWs, PtNTs, PdNTs, Pt/C and BPPt; DOE benchmarks are denoted by dotted lines ( - - - ). c) Specific activity as a function of Pt normalized surface area; DOE mass activity benchmark denoted by a solid line ( — ).
Figure 51:
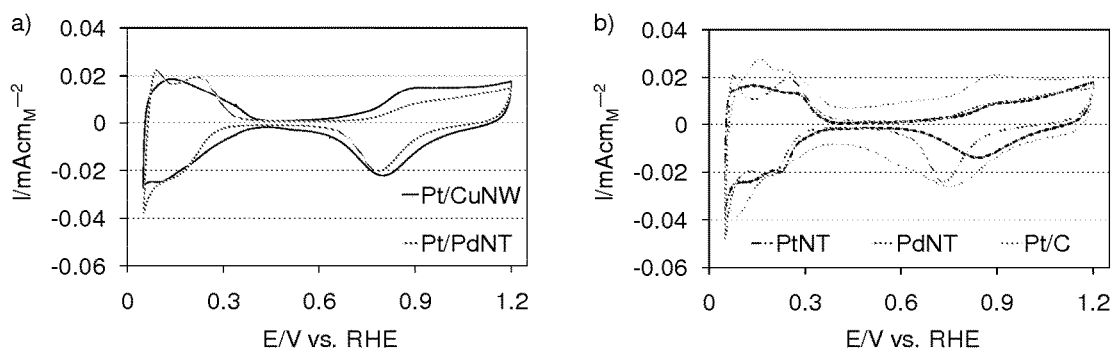
FIG. 51. Cyclic voltammograms of a) Pt/PdNTs and Pt/CuNWs, and b) PtNTs, PdNTs, and Pt/C. Current response was normalized to catalyst ECSA.

Catalyst activity for ORR was evaluated in terms of cost normalized mass activity and specific activity (FIG. 21, FIG. 49, and FIG. 50). Pt/CuNWS produced a cost activity of 10.0 $A\$^{-1}$, 3.5% greater than the DOE benchmark; Pt/PdNTs produced a cost activity of 5.4 $A\$^{-1}$, 55.3% of the benchmark. In this analysis, the cost normalized mass activity was used to objectively include the metal price of Pd. The 5 year average (July 2006-2011) price for Pt and Pd metals were $1414.68 t $oz^{-1}$ and $392.95 t $oz^{-1}$, respectively. The DOE mass activity benchmark 0.44 $Amg_{Pt}^{-1}$, corresponded to a cost normalized mass activity of 9.7 $A\$^{-1}$.

Of particular interest was the enormous specific ORR activity of the nanotubes, with Pt/CuNWs, Pt/PdNTs, and PtNTs each expressing a twofold improvement to the DOE benchmark. Pt/CuNWs, Pt/PdNTs, PtNTs, and PdNTs also exceeded the specific activity of Pt/C by 6.2, 6.1, 6.2, and 2.9 times; the Pt based nanotubes further produced specific activities 77% of BPPt and 43% greater than PtNTs synthesized from AgNWs (PtNTs-Ag). PtNTs-Ag grew similarly in the <110> and <111> directions; unlike the CuNW templated catalysts, however, PtNTs-Ag were fivefold twinned. The side surface of PtNTs-Ag was dominated by the {100} facet and higher indices in the <110> zone axis. The increased prevalence of the {100} facet, the least active low index facet, diminished the ORR specific activity of PtNTs-Ag.[27] In contrast, catalysts templated by CuNWs were single twinned and expressed a lower proportion of the {100} facet on the side surface. Nanotubes templated from CuNWs and AgNWs each grew axially in the <110> direction; therefore the {110} facet, the most active low index facet, could not appear on the side surface.[27] The BPPt electrode examined was a statistical average of facets; since BPPt contained a higher proportion of {110} and a lower proportion of {100}, BPPt exceeded the specific activity of all examined catalysts. The lattice constant of the CuNW templated catalysts was also smaller than PtNTs-Ag, Pt nanoparticles, and BPPt.[55, 126] It was anticipated that the lattice and electronic tuning may have further improved the ORR specific activity of the examined catalysts.[28]

Assuming a uniform Pt coating, a PdNT wall thickness of 11 nm, and a {100} lattice spacing of 1.4 Å, Pt/PdNTs theoretically had a 3.5 atom Pt coating. Assuming a uniform Pt coating, a CuNW diameter of 100 nm, and a {100} lattice spacing of 1.4 Å, Pt/CuNWs theoretically had a 14.1 atom Pt coating. Cu was unstable during cyclic voltammetry and ORR experiments due to a low dissolution potential (0.159 V); due to the ease of electrochemically removing Cu, it was unlikely that Pt/CuNWs contained impurities in the Pt shell during ORR testing. In the case of Pt/PdNTs, however, further analysis was conducted to confirm the presence of a core shell structure.

Figure 52:
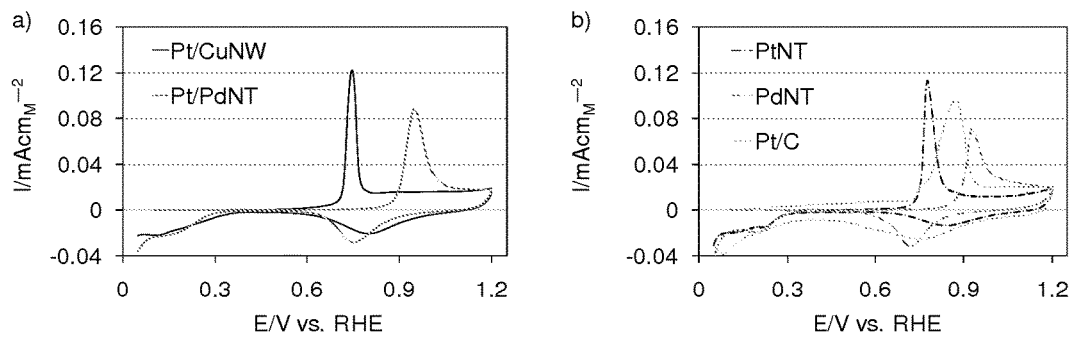
FIG. 52. Carbon monoxide oxidation voltammograms of a) Pt/PdNTs and Pt/CuNWs, and b) PtNTs, PdNTs, and Pt/C. Current response was normalized to catalyst ECSA.

Since CuNWs, PtNTs, and PdNTs had comparable growth directions and lattice constants, the specific ORR activity of Pt/PdNTs should have matched PtNTs. Pd impurities in the Pt shell would have proportionally decreased the ORR specific activity. Linear extrapolation between the specific ORR activities of PtNTs and PdNTs determined that Pt/PdNTs contained a 2.0% Pd impurity. Carbon monoxide oxidation voltammograms further confirmed a uniform surface (FIG. 52). The peak carbon monoxide oxidation potentials of Pt/CuNWs, Pt/PdNTs, PtNTs, and PdNTs were 0.74 V, 0.94 V, 0.77 V, and 0.92 V, respectively. The peak potential shift of Pt/PdNTs toward PdNTs suggested Pt modification due to the Pd substrate; the absence of a second peak further suggested that an excess of Pt—Pt layers were not formed. Although unable to explicitly differentiate between a Pt shell and a homogenous Pt Pd alloy, the carbon monoxide and ORR data was consistent with a Pt shell Pd core catalyst.

Figure 22:
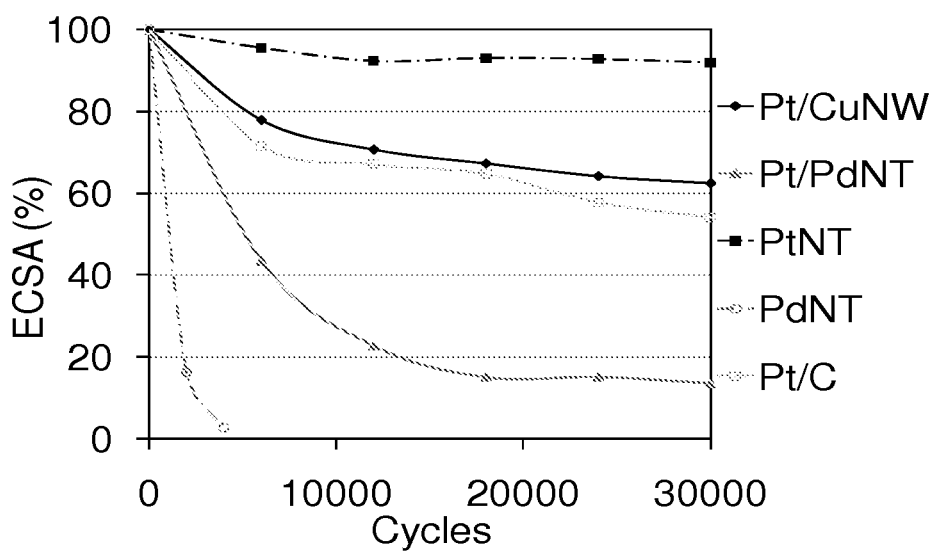
FIG. 22. ECSA loss of Pt/CuNWs, Pt/PdNTs, PtNTs, PdNTs, and Pt/C as a function of cycles in durability testing. ECSAs were calculated from the hydrogen adsorption/desorption charges at noted intervals while cycling potential in the range of 0.6-1.1 V vs. RHE.
Figure 53:
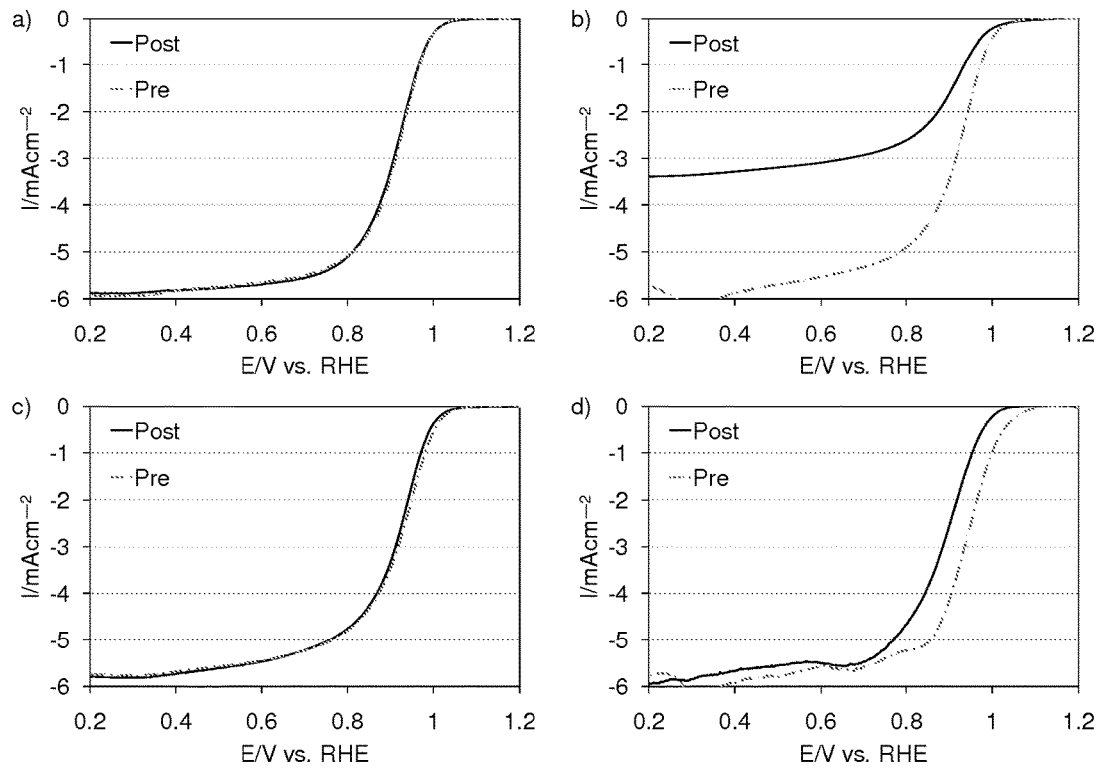
FIG. 53. Anodic polarization curves prior to and following durability testing for a) Pt/CuNWs, b) Pt/PdNTs, c) PtNTs, and d) Pt/C. ORR polarization curves were taken at 20 mVs$^{-1}$ and 1600 rpm in a 0.1 M HClO$_4$ electrolyte.
Figure 56:
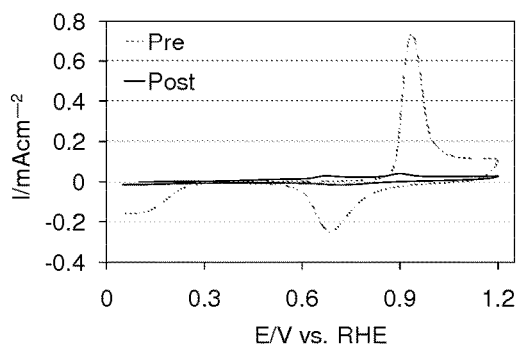
FIG. 56. Carbon monoxide oxidation voltammograms prior to and following durability testing for Pt/PdNTs.
Figure 57:
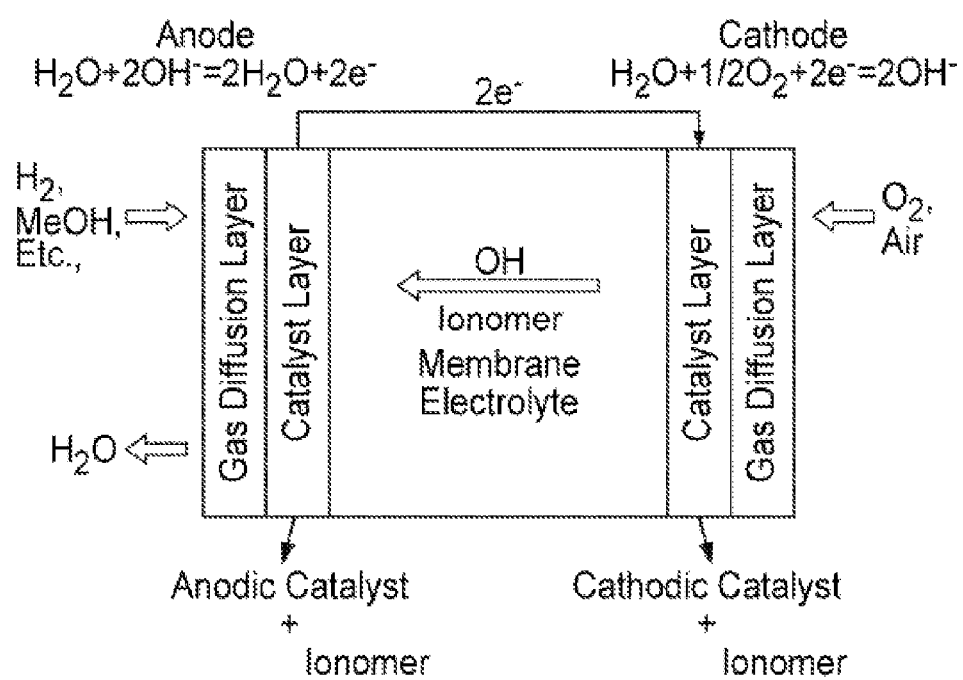
FIG. 57 shows a typical fuel cell with an anode portion (illustrated on the left) and a cathode portion (illustrated here on the right).

Accelerated durability tests were conducted by potential cycling, with ECSA measurements taken every 6,000 cycles (FIG. 22). Pt/CuNWs, Pt/PdNTs, PtNTs, and Pt/C retained 62.3%, 13.5%, 91.9%, and 54.1% of their original ECSAs, respectively. PtNTs showed a significant durability improvement to Pt/C, attributed to the elimination of the carbon support and the extended network reducing Pt degradation and loss. In comparison to PtNTs, the durability characteristics of Pt/CuNWs and Pt/PdNTs decreased, attributed to the low dissolution potential of Cu and Pd (0.915 V). Although Cu had a lower dissolution potential than Pd, the thicker Pt coating (Pt/CuNWs: 14.1 atom layer; Pt/PdNTs: 3.5 atom layer) appeared to slow the rate of dissolution. The instability of Pd in potential cycling experiments was further confirmed through PdNT ECSA, Pt/PdNT ORR activity, and Pt/PdNT carbon monoxide oxidation data following durability testing (FIG. 22, FIG. 53, and FIG. 56). Pt/PdNTs ECSA values, adjusted to account for Pd dissolution, were similar to Pt/C; it was therefore likely that the PtNT wall thickness contributed to the high durability.

Figure 23:
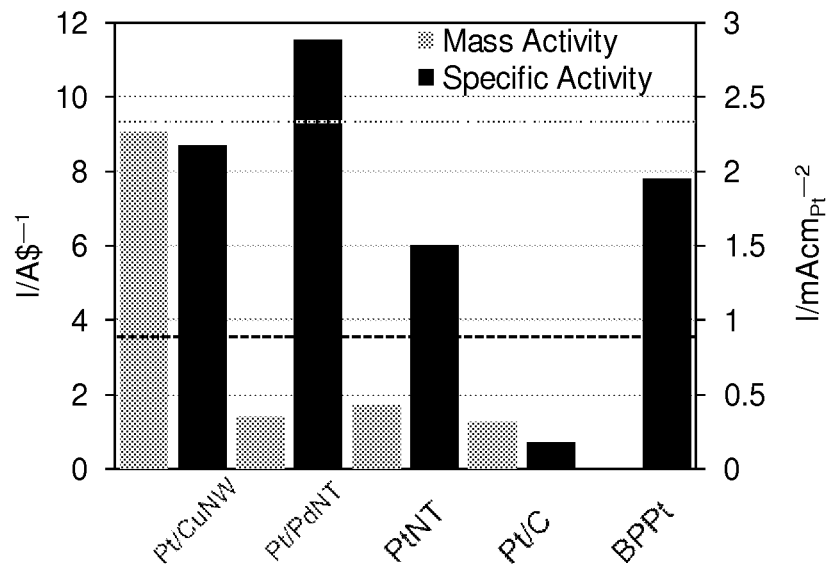
FIG. 23. Cost normalized mass activities and specific activities of Pt/CuNWs, Pt/PdNTs, PtNTs. Pt/C, and BPPt following durability testing. Catalysts cost was determined from a five year mean metal price; the cost of the CuNW template and carbon support (Pt/C) was not included. DOE benchmarks for mass and specific activity are denoted by dotted lines ( - - - ).
Figure 24:
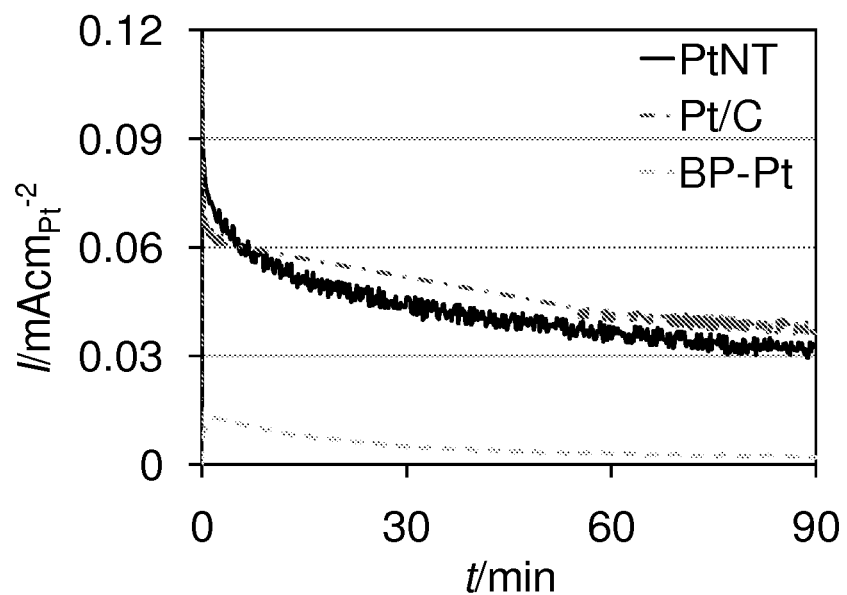
FIG. 24. Chronoamperometry of PtNTs, Pt/C, and BPPt at a constant potential of 0.6 vs. RHE for 90 min.
Figure 25:
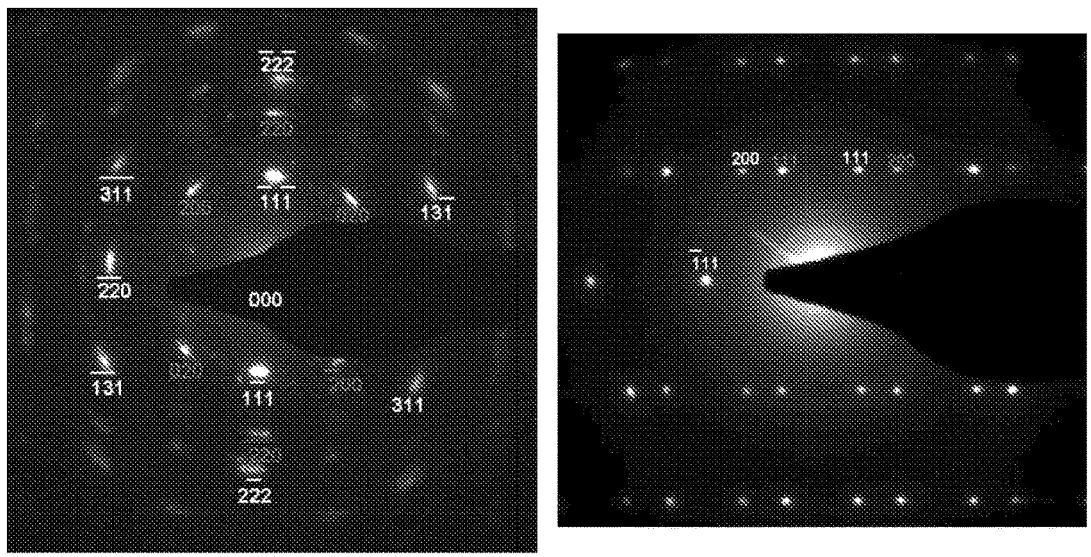
FIG. 25. The twin structure of AgNWs as confirmed by the SAED pattern.
Figure 54:
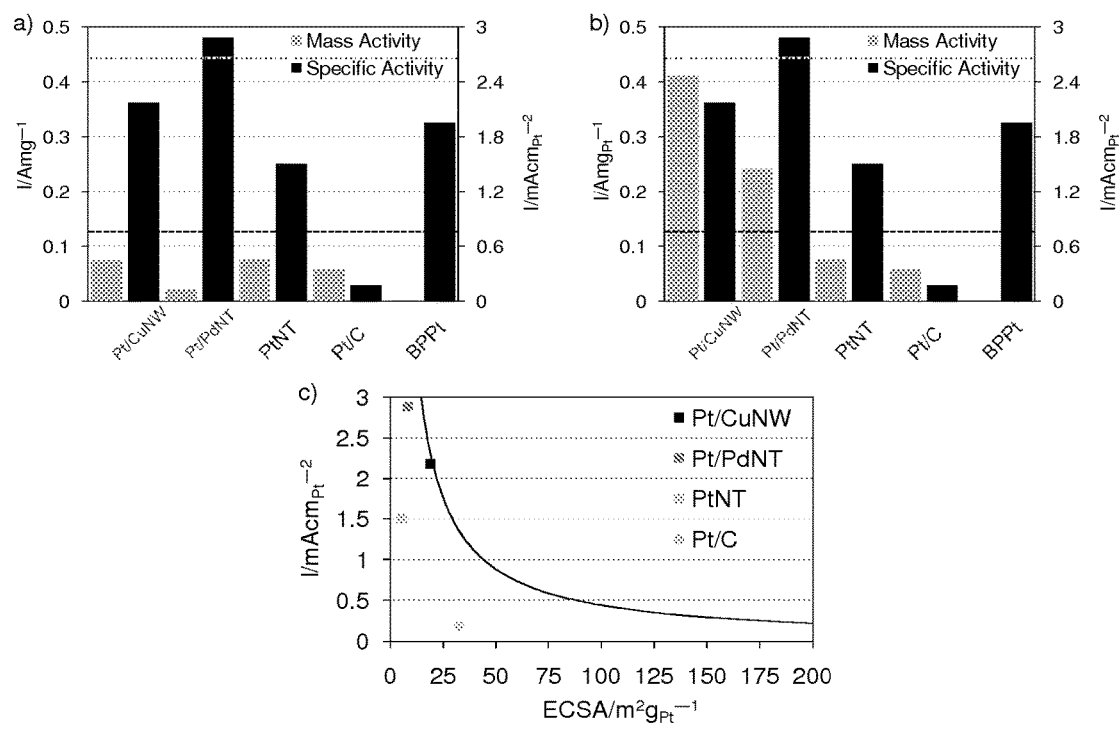
FIG. 54. Mass and specific activities of Pt/PdNTs, Pt/CuNWs, PtNTs. Pt/C and BPPt following durability testing. b) Pt normalized mass and specific activities of Pt/PdNTs, Pt/CuNWs, PtNTs, Pt/C and BPPt following durability testing; DOE benchmarks are denoted by dotted lines (- - -). c) Specific activity post durability as a function of Pt normalized surface area; DOE mass activity benchmark denoted by a solid line (—).
Figure 55:
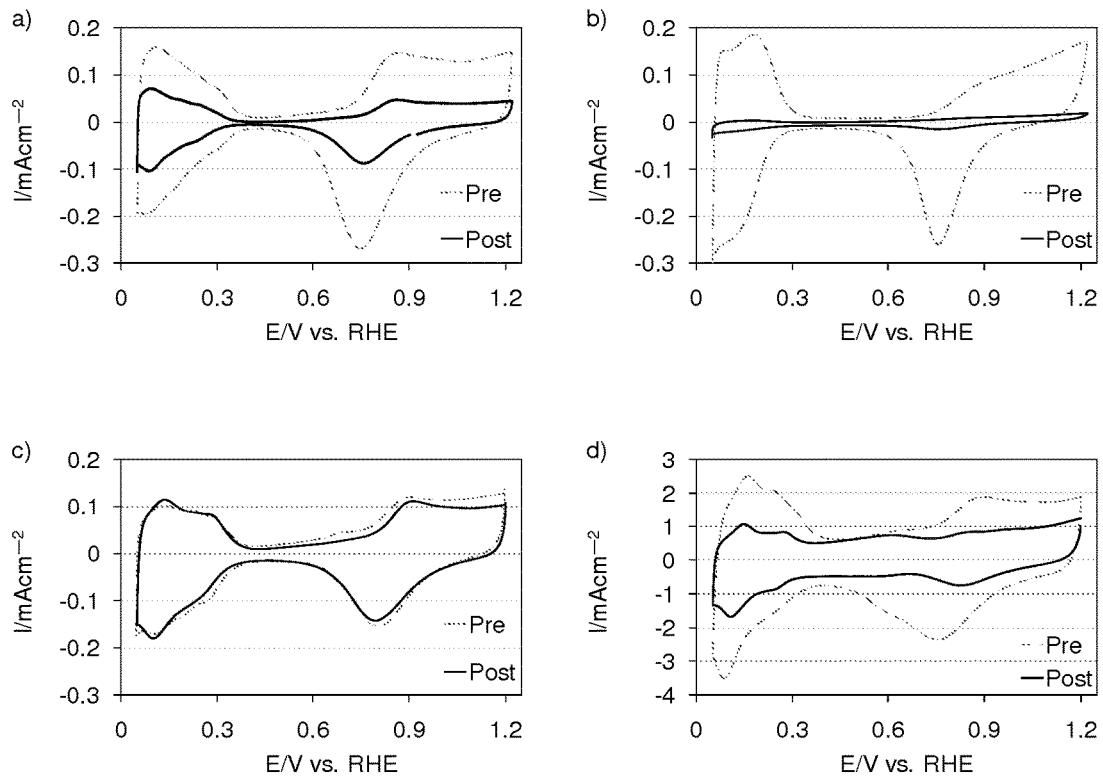
FIG. 55. Cyclic voltammograms prior to and following durability testing for a) Pt/CuNWs, b) Pt/PdNTs, c) PtNTs, and d) Pt/C.

The cost normalized mass activities and specific activities of Pt/CuNWs, Pt/PdNTs, PtNTs, and Pt/C were determined following durability testing (FIG. 23, FIG. 53, and FIG. 54). The extraordinarily large cost activity of Pt/CuNWs was of particle interest; post durability Pt/CuNWs produced an ORR cost activity 93.6% of the DOE benchmark and 90.4% of pre durability Pt/CuNWs. Pt/CuNWs, Pt/PdNTs, and PtNTs further produced cost activities 7.1, 1.1, and 1.3 times of Pt/C. In terms of specific activity, the nanotube catalysts exceeded the DOE benchmark twofold to fourfold.

Conclusions

This study emphatically demonstrates that CuNW templated Pt nanomaterials are the future of ORR catalyst development for PEMFCs. Templated growth directions and lattices allowed for the synthesis of Pt catalysts with specific ORR activities of 1.5 mAcm$^{-2}$, significantly greater than Pt nanoparticles or PtNTs-Ag. The high specific activity allowed for Pt/CuNWs to surpass the DOE cost activity benchmark while expressing a surface area of only 5.5 m$^2$ g$^{-1}$. Pt/CuNWs further retained greater surface area and ORR activity than Pt/C, particularly noteworthy due to the use of the Cu substrate. The use of CuNWs is more cost effective than AgNW templates; the aqueous, low temperature synthesis of CuNWs and Pt/CuNWs is also a benefit from the production perspective and can potentially make a larger impact in the commercialization of PEMFCs. Furthermore, CuNW templated catalysts eliminate the carbon support, resulting in a thinner catalyst layer; it is anticipated that the thinner catalyst layer will improve Pt utilization and mass transport within the PEMFC.

Experimental

CuNWs were synthesized by the hydrazine (N$_2$H$_4$, 35 wt. %) and NaOH reduction of Cu(NO$_3$)$_2$ in the presence of ethylenediamine (EDA), added to control wire morphology.[138] In CuNW synthesis, 10 mL of an aqueous 0.1 M Cu(NO$_3$)$_2$ solution was added to 200 mL of 15 M NaOH in a 500 mL round bottom flask. EDA was subsequently added to the flask (1.5 mL), followed by N$_2$H$_4$ (0.25 mL). Following each addition step, the flask was capped and shaken to evenly distribute the reactants. Once N$_2$H$_4$ was added, the flask was capped and placed in a 60° C. water bath for 1 hr. Following the reaction, the flask contents were cooled in an ice bath and filtered. Filtering continued with excess water until the effluent reached a neutral pH. The filter cake was briefly allowed to dry on the filter paper before it entered an argon environment for storage.

PtNTs were synthesized via the galvanic displacement of CuNWs.[139] CuNWs (200 mL, 0.66 mM) were added to a 500 mL round bottom flask equipped with an addition funnel, stir bar, and adapter passing argon. Following 15 min. with flowing argon, 100 mL of 0.88 mM H$_2$PtCl$_6$ was added dropwise over a period of 15 min. The flask proceeded for 1 hr. to ensure a complete reaction.

PdNTs were synthesized via the galvanic displacement of CuNWs.[139] CuNWs (400 mL, 0.66 mm) in an aqueous solution of polyvinyl pyrollidone (16.7 M) were added to a 1 L round bottom flask, with 200 mL of 1.75 mm sodium tetrachloropalladate in the addition funnel. Pt/CuNWs were synthesized via an incomplete galvanic displacement reaction with CuNWs. CuNWs (200 mL, 0.66 mM) were added to a 500 mL round bottom flask, with 100 mL of 0.086 mm $H_2PtCl_6$ in the addition funnel. Synthesis procedures of the PdNTs and Pt/CuNWs were identical to the aforementioned PtNTs and the syntheses were conducted at room temperature. Following synthesis, PtNTs, PdNTs, and Pt/CuNWs were washed in 1 M HCl and water. Prior to electrochemical experiments, PtNTs and PdNTs were annealed at 250° C. in forming gas for 1 h. Pt/CuNWs were annealed at 150° C. in forming gas for 1 h. to prevent Pt—Cu alloying.

Pt/PdNTs were synthesized by adding 35 mL of a 1.2 mm PdNT solution in a 3-neck round bottom flask equipped with condenser flowing argon, thermocouple, addition funnel with 18 mL of 0.13 mm $H_2PtCl_6$, and stir bar. Following 15 min. at reflux, the $H_2PtCl_6$ was added dropwise over a period of 15 min. The reaction proceeded at reflux for 1 hr., at which point it was quenched in an ice bath. The Pt/PdNTs were washed in 1M HCl and water and annealed at 150° C. in forming gas for 1 hr. prior to electrochemical experiments.

SEM images were taken at 20 kV with a Phillips XL-30 FEG microscope. TEM images were taken at 300 kV with Phillips CM300 microscope. TEM samples were prepared on holey-carbon copper grids (Ted Pella, Inc.). The alignment of PtNT particles was examined by SAED at a length of 24.5 cm.

Electrochemical experiments were conducted in a 3-electrode cell equipped with Ag/AgCl reference electrode, Pt wire counter electrode, and 5 mm diameter glassy carbon working electrode. Measurements were taken on a multichannel potentiostat and the working electrode was fixed to a modulated speed rotator. Catalysts were coated to the glassy carbon electrode at a metal loading of 100 $\mu gcm^{-2}$. Following catalyst coating, 10 µL of 0.05 wt. % Nafion was pipetted onto the electrode and dried at room temperature in air. Catalyst specific activities for ORR were based on ECSAs calculated from the charge associated with carbon monoxide oxidation and verified with the charge associated with hydrogen adsorption (FIG. 51, FIG. 52, FIG. 55, and FIG. 56). Reference electrode values were converted to RHE with measurements between the reference and a bulk polycrystalline Pt electrode in a hydrogen saturated 0.1 M $HClO_4$ electrolyte.[70]

PEMFC cathode catalysts were developed were developed in three phases: PPtNTs were formed by the displacement of AgNWs; Pt/PdNTs were formed by the partial displacement of PdNTs with Pt; and Pt/CuNWs were formed by the partial displacement of CuNWs with Pt. PPtNTs were found to produce an ORR mass activity greater than Pt/C, in spite of having approximately one third the surface area. Following durability testing, PPtNTs also lost 30% less surface area than Pt/C; in terms of ORR activity, PPtNTs exceeded the mass activity of Pt/C greater than twentyfold following durability testing.

In the synthesis of Pt/PdNTs, the Pt loading of pure PtNTs was decreased to 9 wt %, replacing nearly all subsurface Pt with Pd. Although the catalyst cost was reduced, the consistency in growth directions, lattice spacing, and conductivity preserved ORR activity. PtPd 9 produced an ORR mass activity 95% of PtNTs and a cost activity greater than the DOE benchmark; PtPd 9 further exceeded the DOE specific activity benchmark by 40%. In comparison to Pt/C, Pt/PdNTs maintained higher ORR activity following durability testing in spite of the use of a Pd substrate.

PtNTs and Pt/CuNWs were synthesized from a CuNW substrate; the single twinned growth directions yielded Pt catalysts with a specific ORR activity 40% greater than PtNTs templated from AgNWs and twice the DOE benchmark. Pt/CuNWs reduced the Pt loading to 18 wt % and exceeded the DOE cost activity benchmark with a surface area of only 5.5 $m^2$ $g^{-1}$. Following durability testing, Pt/CuNWs retained a greater proportion of surface area than Pt/C, particularly significant due to the high Cu loading. In terms of ORR activity, Pt/CuNWs exceeded the cost activity of Pt/C greater than sevenfold following durability testing.

HEMFC catalysts were developed in two phases: AgNWs were formed by the ethylene glycol reduction of Ag nitrate; and PdNTs and AuNTs were formed by the displacement of AgNWs. AgNWs with a 25 nm diameter were found to produce an ORR mass activity greater than 2.4 nm AgNPs, in spite of having approximately one fifth the surface area. AgNWs also produced hydrogen peroxide an order of magnitude lower than AgNPs; decreasing AgNW diameter further reduced the peroxide formation and increased the ORR specific activity.

Since Ag catalysts generally produce an ORR activity an order of magnitude less than Pt/C, PdNTs and AuNTs were also developed as ORR catalysts; PdNTs and AuNTs exceeded the ORR specific activity of Pt/C by 42% and 21%, respectively. The characterization of PdNTs and AuNTs demonstrated that the alkaline environment allows for non-Pt catalysts to produce a higher ORR activity at a lower cost.

DAFC catalysts were developed in two phases: porous PtNTs; and PdNTs and AuNTs, each formed by the displacement of AgNWs. PPtNTs were characterized in an acidic electrolyte, producing an activity for MOR two times greater than Pt/C. In terms of intermediate tolerance, porous PtNTs further require a lower potential to remove carbon monoxide and maintain higher MOR activity at a fixed potential.

PdNTs and AuNTs were characterized in an alkaline electrolyte. PdNTs outperform Pt/C in methanol, ethanol, and ethylene glycol oxidation by an order of magnitude; in terms of onset potential, PdNTs also require a potential approximately 150 mV less. In comparison to Pt/C and PtRu/C, PdNTs produce comparable oxidation activity and a lower onset potential in the case of methanol and ethylene glycol. Due to a high surface area, AuNTs also produce alcohol oxidation activities in excess of Au/C.

Galvanic displacement allowed for the control of growth directions and the tuning of lattice parameters based on the nanowire substrate. The use of extended nanowire and nanotube surfaces improved catalytic activity and durability characteristics compared to conventional nanoparticles. It is further expected that the elimination of the carbon support would allow for a thinner electrode catalyst layer, thereby improving mass transport and catalyst utilization.

Obviously, numerous modifications and variations of the present invention are possible in light of the above teachings. It is therefore to be understood that within the scope of the appended claims, the invention may be practiced otherwise than as specifically described herein.

Acronyms

Ag: Silver
AgNP: Silver nanoparticle
AgNW: Silver nanowire

Au: Gold
Au/C: Gold nanoparticles supported on carbon
AuNT: Gold nanotube
BPAg: Bulk polycrystalline silver electrode
BPAu: Bulk polycrystalline gold electrode
BPPd: Bulk polycrystalline palladium electrode
BPPt: Bulk polycrystalline platinum electrode
Cu: Copper
CuNW: Copper nanowire
DAFC: Direct alcohol fuel cell
DDTC: Didecylamine dithicarbamate
DMFC: Direct methanol fuel cell
DOE: United States Department of Energy
$E_{1/2}$: Half wave potential
ECSA: Electrochemically active surface area
EDS: Energy dispersive x-ray spectroscopy
EOR: Ethanol oxidation reaction
EGOR: Ethylene glycol oxidation reaction
FCC: Face centered cubic
$H_2O_2$: Hydrogen peroxide
HEM: Hydroxide exchange membrane
HEMFC: Hydroxide exchange membrane fuel cell
HOR: Hydrogen oxidation reaction
MOR: Methanol oxidation reaction
ORR: Oxygen reduction reaction
PEMFC: Proton exchange membrane fuel cell
Pd: Palladium
Pd/C: Palladium nanoparticles supported on carbon
PdNT: Palladium nanotube
PPtNT: Porous platinum nanotube
Pt: Platinum
Pt/C: Platinum nanoparticles supported on carbon
Pt/CuNW: Platinum coated copper nanowire
Pt/PdNT: Platinum coated palladium nanotube
PtRu/C: Platinum ruthenium nanoparticles supported on carbon
PtNT: Platinum nanotube
PtNT-Ag: Platinum nanotube templated from a silver nanowire
PtPd 9: Platinum coated palladium nanotubes with a 9 wt % platinum loading
PtPd 14: Platinum coated palladium nanotubes with a 14 wt % platinum loading
PtPd 18: Platinum coated palladium nanotubes with an 18 wt % platinum loading
RDE: Rotating disk electrode
RHE: Reversible hydrogen electrode
RRDE: Rotating ring disk electrode
Ru: Ruthenium
SAED: Selected area electron diffraction
SEM: Scanning electron microscopy
TEM: Transmission electron microscopy
US: United States References (which are all incorporated by reference in their entirety)

[1] *International Energy Outlook*, U.S. Energy Information Administration, 2010.
[2] *International Energy Outlook*, U.S. Energy Information Administration, 2011.
[3] *Annual Energy Review*, U.S. Energy Information Administration, 2010.
[4] *Annual Energy Review*, U.S. Energy Information Administration, 2009.
[5] *Petroleum Exploration and Production Statistics*, IHS Energy, Geneva, London, 2006.
[6] R. Borup, J. Meyers, B. Pivovar, Y. S. Kim, R. Mukundan, N. Garland, D. Myers, M. Wilson, F. Garzon, D. Wood, P. Zelenay, K. More, K. Stroh, T. Zawodzinski, J. Boncella, J. E. McGrath, M. Inaba, K. Miyatake, M. Hori, K. Ota, Z. Ogumi, S. Miyata, A. Nishikata, Z. Siroma, Y. Uchimoto, K. Yasuda, K. I. Kimijima, N. Iwashita, *Chemical Reviews* 2007, 107, 3904.
[7] H. A. Gasteiger, S. S. Kocha, B. Sompalli, F. T. Wagner, *Applied Catalysis B-Environmental* 2005, 56, 9.
[8] M. Singh, A. Vyas, E. Steiner, *VISION Model: Description of Model Used to Estimate the Impact of Highway Technologies and Fuels on Energy Use and Carbon Emissions to 2050*, Argonne National Laboratory, 2003.
[9] C. Lamy, A. Lima, V. LeRhun, F. Delime, C. Coutanceau, J.-M. Léger, *Journal of Power Sources* 2002, 105, 283.
[10] C. Lamy, E. M. Belgsir, J. M. Lêger, *Journal of Applied Electrochemistry* 2001, 31, 799.
[11] C. Coutanceau, L. Demarconnay, C. Lamy, J. M. Leger, *Journal of Power Sources* 2006, 156, 14.
[12] *Hydrogen Posture Plan: An Integrated Research, Development, and Demonstration Plan*, U.S. Department of Energy, U.S. Department of Transportation, 2006.
[13] J. S. Spendelow, A. Wieckowski, *Physical Chemistry Chemical Physics* 2007, 9, 2654.
[14] N. M. Markovic, B. N. Grgur, P. N. Ross, *Journal of Physical Chemistry B* 1997, 101, 5405.
[15] U. A. Paulus, T. J. Schmidt, H. A. Gasteiger, R. J. Behm, *Journal of Electroanalytical Chemistry* 2001, 495, 134.
[16] J. K. Norskov, J. Rossmeisl, A. Logadottir, L. Lindqvist, J. R. Kitchin, T. Bligaard, H. Jonsson, *Journal of Physical Chemistry B* 2004, 108, 17886.
[17] R. R. Adzic, M. H. Shao, T. Huang, P. Liu, J. Zhang, K. Sasaki, M. B. Vukmirovic, *Langmuir* 2006, 22, 10409.
[18] P. Zelenay, G. Wu, K. L. More, C. M. Johnston, *Science* 2011, 332, 443.
[19] L. J. Bregoli, *Electrochimica Acta* 1978, 23, 489.
[20] K. Kinoshita, *Journal of the Electrochemical Society* 1990, 137, 845.
[21] R. M. Darling, J. P. Meyers, *Journal of the Electrochemical Society* 2003, 150, A1523.
[22] N. Tian, Z. Y. Thou, S. G. Sun, Y. Ding, Z. L. Wang, *Science* 2007, 316, 732.
[23] Y. A. Xia, B. Lim, M. J. Jiang, P. H. C. Camargo, E. C. Cho, J. Tao, X. M. Lu, Y. M. Zhu, *Science* 2009, 324, 1302.
[24] M. Mavrikakis, J. L. Zhang, M. B. Vukmirovic, Y. Xu, R. R. Adzic, *Angewandte Chemie-International Edition* 2005, 44, 2132.
[25] R. R. Adzic, M. Shao, K. Sasaki, N. S. Marinkovic, L. Zhang, *Electrochemistry Communications* 2007, 9, 2848.
[26] V. Stamenkovic, B. S. Mun, K. J. J. Mayrhofer, P. N. Ross, N. M. Markovic, J. Rossmeisl, J. Greeley, J. K. Nørskov, *Angewandte Chemie* 2006, 118, 2963.
[27] N. M. Markovic, R. R. Adzic, B. D. Cahan, E. B. Yeager, *Journal of Electroanalytical Chemistry* 1994, 377, 249.
[28] S. Mukerjee, S. Srinivasan, M. P. Soriaga, J. Mcbreen, *Journal of the Electrochemical Society* 1995, 142, 1409.
[29] S. Gu, R. Cai, T. Luo, Z. W. Chen, M. W. Sun, Y. Liu, G. H. He, Y. S. Yan, *Angewandte Chemie-International Edition* 2009, 48, 6499.
[30] S. Gu, R. Cai, T. Luo, K. Jensen, C. Contreras, Y. S. Yan, *Chemsuschem* 2010, 3, 555.
[31] S. Gu, R. Cai, Y. S. Yan, *Chemical Communications* 2011, 47, 2856.
[32] J. R. Varcoe, R. C. T. Slade, *Fuel Cells* 2005, 5, 187.

[33] T. J. Clark, N. J. Robertson, H. A. Kostalik, E. B. Lobkovsky, P. F. Mutolo, H. D. Abruna, G. W. Coates, *Journal of the American Chemical Society* 2009, 131, 12888.

[34] H. A. Kostalik, T. J. Clark, N. J. Robertson, P. F. Mutolo, J. M. Longo, H. D. Abruna, G. W. Coates, *Macromolecules* 2010, 43, 7147.

[35] N. J. Robertson, H. A. Kostalik, T. J. Clark, P. F. Mutolo, H. D. Abruna, G. W. Coates, *Journal of the American Chemical Society* 2010, 132, 3400.

[36] J. Pan, S. F. Lu, Y. Li, A. B. Huang, L. Zhuang, J. T. Lu, *Advanced Functional Materials* 2010, 20, 312.

[37] J. H. Wang, Z. Zhao, F. X. Gong, S. H. Li, S. B. Zhang, *Macromolecules* 2009, 42, 8711.

[38] J. H. Wang, S. H. Li, S. B. Zhang, *Macromolecules* 2010, 43, 3890.

[39] N. M. Markovic, S. T. Sarraf, H. A. Gasteiger, P. N. Ross, *Journal of the Chemical Society-Faraday Transactions* 1996, 92, 3719.

[40] N. M. Markovic, H. A. Gasteiger, P. N. Ross, *Journal of Physical Chemistry* 1995, 99, 3411.

[41] J. Zhang, K. Sasaki, E. Sutter, R. R. Adzic, *Science* 2007, 315, 220.

[42] Z. W. Chen, M. Waje, W. Z. Li, Y. S. Yan, *Angewandte Chemie-International Edition* 2007, 46, 4060.

[43] M. L. Sattler, P. N. Ross, *Ultramicroscopy* 1986, 20, 21.

[44] Y. Takasu, N. Ohashi, X. G. Zhang, Y. Murakami, H. Minagawa, S. Sato, K. Yahikozawa, *Electrochimica Acta* 1996, 41, 2595.

[45] J. Luo, M. M. Maye, N. N. Kariuki, L. Y. Wang, P. Njoki, Y. Lin, M. Schadt, H. R. Naslund, C. J. Zhong, *Catalysis Today* 2005, 99, 291.

[46] H. Laborde, J. M. Leger, C. Lamy, *Journal of Applied Electrochemistry* 1994, 24, 219.

[47] B. Beden, F. Hahn, J. M. Leger, C. Lamy, C. L. Perdriel, N. R. Detacconi, R. O. Lezna, A. J. Arvia, *Journal of Electroanalytical Chemistry* 1991, 301, 129.

[48] C. Lamy, *Electrochimica Acta* 1984, 29, 1581.

[49] X. Wang, M. Waje, Y. S. Yan, *Electrochemical and Solid State Letters* 2005, 8, A42.

[50] T. Biegler, D. A. J. Rand, R. Woods, *Journal of Electroanalytical Chemistry* 1971, 29, 269.

[51] Y. Sun, B. Mayers, T. Herricks, Y. Xia, *Nano Letters* 2003, 3, 955.

[52] K. J. J. Mayrhofer, D. Strmcnik, B. B. Blizanac, V. Stamenkovic, M. Arenz, N. M. Markovic, *Electrochimica Acta* 2008, 53, 3181.

[53] Y. G. Sun, Y. D. Yin, B. T. Mayers, T. Herricks, Y. N. Xia, *Chemistry of Materials* 2002, 14, 4736.

[54] Y. N. Xia, P. D. Yang, Y. G. Sun, Y. Y. Wu, B. Mayers, B. Gates, Y. D. Yin, F. Kim, Y. Q. Yan, *Advanced Materials* 2003, 15, 353.

[55] Y. G. Sun, B. Gates, B. Mayers, Y. N. Xia, *Nano Letters* 2002, 2, 165.

[56] Y. G. Sun, Z. L. Tao, J. Chen, T. Herricks, Y. N. Xia, *Journal of the American Chemical Society* 2004, 126, 5940.

[57] Y. G. Sun, B. Wiley, Z. Y. Li, Y. N. Xia, *Journal of the American Chemical Society* 2004, 126, 9399.

[58] Y. G. Sun, B. Mayers, Y. N. Xia, *Advanced Materials* 2003, 15, 641.

[59] Y. G. Sun, B. T. Mayers, Y. N. Xia, *Nano Letters* 2002, 2, 481.

[60] X. Lu, J. Chen, S. E. Skrabalak, Y. N. Xia, *Proceedings of the Institution of Mechanical Engineers, Part N: Journal of Nanoengineering and Nanosystems* 2008, 221, 1.

[61] C. M. Cobley, D. J. Campbell, Y. N. Xia, *Advanced Materials* 2008, 20, 748.

[62] Y. G. Sun, Y. N. Xia, *Advanced Materials* 2004, 16, 264.

[63] S. E. Skrabalak, J. Chen, L. Au, X. Lu, X. Li, Y. Xia, *Advanced Materials* 2007, 19, 3177.

[64] S. K. Wonnell, J. M. Delaye, M. Bibole, Y. Limoge, *Journal of Applied Physics* 1992, 72, 5195.

[65] Y. G. Sun, Y. Xia, in *Materials Research Society Symposium Proceedings*, Vol. 776, 2003, pp. Q2.7.1.

[66] B. Wiley, Y. G. Sun, J. Y. Chen, H. Cang, Z. Y. Li, X. D. Li, Y. N. Xia, *Mrs Bulletin* 2005, 30, 356.

[67] R. Woods, A. J. Bard, *Electroanalytical Chemistry, Vol. 9*, Marcel Dekker, New York, 1976.

[68] Kinoshita. K, Lundquis. Jt, Stonehar. P, *Journal of Electroanalytical Chemistry* 1973, 48, 157.

[69] J. Prabhuram, T. S. Zhao, Z. X. Liang, R. Chen, *Electrochimica Acta* 2007, 52, 2649.

[70] D. J. G. Ives, G. J. Janz, *Reference Electrodes, Theory and Practice*, Academic Press, New York, 1961.

[71] A. E. S. Sleightholme, J. R. Varcoe, A. R. Kucernak, *Electrochemistry Communications* 2008, 10, 151.

[72] B. B. Blizanac, P. N. Ross, N. M. Markovic, *Journal of Physical Chemistry B* 2006, 110, 4735.

[73] B. B. Blizanac, P. N. Ross, N. M. Markovic, *Electrochimica Acta* 2007, 52, 2264.

[74] M. A. Kostowskyj, R. J. Gilliam, D. W. Kirk, S. J. Thorpe, *International Journal of Hydrogen Energy* 2008, 33, 5773.

[75] K. Ni, L. Chen, G. X. Lu, *Electrochemistry Communications* 2008, 10, 1027.

[76] G. K. H. Wiberg, K. J. J. Mayrhofer, M. Arenz, *Fuel Cells* 2010, 10, 575.

[77] L. Demarconnay, C. Coutanceau, J. M. Leger, *Electrochimica Acta* 2004, 49, 4513.

[78] Y. F. Yang, Y. H. Zhou, *Journal of Electroanalytical Chemistry* 1995, 397, 271.

[79] S. M. Alia, G. Zhang, D. Kisailus, D. S. Li, S. Gu, K. Jensen, Y. S. Yan, *Advanced Functional Materials* 2010, 20, 3742.

[80] Y. G. Sun, B. Mayers, T. Herricks, Y. N. Xia, *Nano Letters* 2003, 3, 955.

[81] J. O. M. Bockris, B. E. Conway, R. E. White, *Modern Aspects of Electrochemistry, Vol.* 21, Springer, 1990.

[82] J. Lipkowski, P. Ross, *Electrocatalysis*, Wiley-VCH, 1998.

[83] A. Zwetanova, K. Juttner, *Journal of Electroanalytical Chemistry* 1981, 119, 149.

[84] S. Strbac, R. R. Adzic, *Journal of Electroanalytical Chemistry* 1996, 403, 169.

[85] Y. J. Xiong, B. Wiley, Y. N. Xia, *Angewandte Chemie-International Edition* 2007, 46, 7157.

[86] B. Gurau, E. S. Smotkin, *Journal of Power Sources* 2002, 112, 339.

[87] Y. G. Sun, Y. N. Xia, *Advanced Materials* 2002, 14, 833.

[88] M. C. Tong, W. Chen, J. Sun, D. Ghosh, S. W. Chen, *Journal of Physical Chemistry B* 2006, 110, 19238.

[89] Y. Zhao, W. Perez-Segarra, Q. C. Shi, A. Wei, *Journal of the American Chemical Society* 2005, 127, 7328.

[90] G. F. McLean, T. Niet, S. Prince-Richard, N. Djilali, *International Journal of Hydrogen Energy* 2002, 27, 507.

[91] N. M. Markovic, H. A. Gasteiger, N. Philip, *Journal of Physical Chemistry* 1996, 100, 6715.

[92] N. Markovic, H. Gasteiger, P. N. Ross, *Journal of the Electrochemical Society* 1997, 144, 1591.

[93] K. F. Blurton, E. Mcmullin, *Energy Conversion* 1969, 9, 141.

[94] S. L. Gojkovic, S. K. Zecevic, R. F. Savinell, *Journal of the Electrochemical Society* 1998, 145, 3713.
[95] K. L. Hsuch, E. R. Gonzalez, S. Srinivasan, *Electrochimica Acta* 1983, 28, 691.
[96] J. X. Wang, N. M. Markovic, R. R. Adzic, *Journal of Physical Chemistry B* 2004, 108, 4127.
[97] J. A. Appleby, *Energy* 1986, 11, 137.
[98] J. G. Becerra, R. Salvarezza, A. J. Arvia, *Electrochimica Acta* 1990, 35, 595.
[99] J. G. Becerra, R. C. Salvarezza, A. J. Arvia, *Electrochimica Acta* 1988, 33, 1431.
[100] R. C. Salvarezza, J. G. Becerra, A. J. Arvia, *Electrochimica Acta* 1988, 33, 1753.
[101] O. Antoine, R. Durand, *Journal of Applied Electrochemistry* 2000, 30, 839.
[102] E. Yeager, *Electrochimica Acta* 1984, 29, 1527.
[103] E. Yeager, *NBS Special Publication* 1976, 455, 203.
[104] M. Shao, *Journal of Power Sources* 2011, 196, 2433.
[105] S. D. Poynton, J. P. Kizewski, R. C. T. Slade, J. R. Varcoe, *Solid State Ionics* 2010, 181, 219.
[106] L. Jiang, A. Hsu, D. Chu, R. Chen, *Journal of the Electrochemical Society* 2009, 156, B643.
[107] L. Jiang, A. Hsu, D. Chu, R. Chen, *Journal of the Electrochemical Society* 2009, 156, B370.
[108] S. Kondo, M. Nakamura, N. Maki, N. Hoshi, *Journal of Physical Chemistry C* 2009, 113, 12625.
[109] M. H. Shao, P. Liu, J. L. Zhang, R. Adzic, *Journal of Physical Chemistry B* 2007, 111, 6772.
[110] J. Kim, J. E. Park, T. Momma, T. Osaka, *Electrochimica Acta* 2009, 54, 3412.
[111] W. Tang, H. F. Lin, A. Kleiman-Shwarstein, G. D. Stucky, E. W. McFarland, *Journal of Physical Chemistry C* 2008, 112, 10515.
[112] R. R. Adzic, A. V. Tripkovic, N. M. Markovic, *Journal of Electroanalytical Chemistry* 1983, 150, 79.
[113] K. Juttner, *Electrochimica Acta* 1984, 29, 1597.
[114] L. Kuai, B. Y. Geng, S. Z. Wang, Y. Y. Zhao, Y. C. Luo, H. Jiang, *Chemistry-a European Journal* 2011, 17, 3482.
[115] J. Hernandez, J. Solla-Gullon, E. Herrero, A. Aldaz, J. M. Feliu, *Journal of Physical Chemistry C* 2007, 111, 14078.
[116] A. V. Tripkovic, K. D. Popovic, B. N. Grgur, B. Blizanac, P. N. Ross, N. M. Markovic, *Electrochimica Acta* 2002, 47, 3707.
[117] E. H. Yu, K. Scott, *Journal of Power Sources* 2004, 137, 248.
[118] F. Kadirgan, B. Beden, J. M. Leger, C. Lamy, *Journal of Electroanalytical Chemistry* 1981, 125, 89.
[119] M. Watanabe, S. Motoo, *Journal of Electroanalytical Chemistry* 1975, 60, 259.
[120] E. Antolini, E. R. Gonzalez, *Journal of Power Sources* 2010, 195, 3431.
[121] C. W. Xu, L. Q. Cheng, P. K. Shen, Y. L. Liu, *Electrochemistry Communications* 2007, 9, 997.
[122] H. Wang, C. W. Xu, F. L. Cheng, S. P. Jiang, *Electrochemistry Communications* 2007, 9, 1212.
[123] A. A. Elshafei, H. M. Shabanah, M. N. H. Moussa, *Journal of Power Sources* 1993, 46, 17.
[124] H. Bunazawa, Y. Yamazaki, *Journal of Power Sources* 2009, 190, 210.
[125] B. Xue, P. Chen, Q. Hong, J. Y. Lin, K. L. Tan, *Journal of Materials Chemistry* 2001, 11, 2378.
[126] J. Luo, M. M. Maye, V. Petkov, N. N. Kariuki, L. Y. Wang, P. Njoki, D. Mott, Y. Lln, C. J. Zhong, *Chemistry of Materials* 2005, 17, 3086.
[127] A. L. N. Pinheiro, M. S. Zei, G. Ertl, *Physical Chemistry Chemical Physics* 2005, 7, 1300.
[128] S. H. Yoo, S. Park, *Electrochimica Acta* 2008, 53, 3656.
[129] H. Wolfschmidt, R. Bussar, U. Stimming, *Journal of Physics-Condensed Matter* 2008, 20.
[130] A. Habrioux, E. Sibert, K. Servat, W. Vogel, K. B. Kokoh, N. Alonso-Vante, *Journal of Physical Chemistry B* 2007, 111, 10329.
[131] J. Zhang, Y. Mo, M. B. Vukmirovic, R. Klie, K. Sasaki, R. R. Adzic, *Journal of Physical Chemistry B* 2004, 108, 10955.
[132] A. V. Ruban, H. L. Shiver, oslash, J. K. rskov, *Physical Review B* 1999, 59, 15990.
[133] P. Jakob, A. Schlapka, M. Lischka, A. Gross, U. Kasberger, *Physical Review Letters* 2003, 91.
[134] M. Mavrikakis, S. Alayoglu, A. U. Nilekar, B. Eichhorn, *Nature Materials* 2008, 7, 333.
[135] S. Sunde, P. Ochal, J. L. G. de la Fuente, M. Tsypkin, F. Seland, N. Muthuswamy, M. Ronning, D. Chen, S. Garcia, S. Alayoglu, B. Eichhorn, *Journal of Electroanalytical Chemistry* 2011, 655, 140.
[136] X. Lu, M. McKiernan, Z. Peng, E. P. Lee, H. Yang, Y. Xia, *Science of Advanced Materials*, 2, 413.
[137] B. J. Wiley, A. R. Rathmell, S. M. Bergin, Y. L. Hua, Z. Y. Li, *Advanced Materials* 2010, 22, 3558.
[138] Y. Chang, M. L. Lye, H. C. Zeng, *Langmuir* 2005, 21, 3746.
[139] X. Lu, M. McKiernan, Z. Peng, E. P. Lee, H. Yang, Y. Xia, *Science of Advanced Materials* 2010, 2, 413.

The invention claimed is:
1. Metal nanotubes comprising a composition having formula $(M_1)NT$:
   wherein $M_1$=Pd;
   wherein the nanotubes have:
      a wall thickness of from 2 to 12 nm;
      an outer diameter of from 30 to 100 nm; and
      a length of from 5 to 30 μm,
   wherein the metal nanotubes have a loading of Pt in an amount of from 5 wt % to 20 wt % on a surface of the metal nanotubes.
2. The metal nanotubes of claim 1, wherein the wall thickness of the nanotubes is from 3 to 11 nm.
3. The metal nanotubes of claim 1, wherein the outer diameter of the nanotubes is from 30 to 80 nm.
4. The metal nanotubes of claim 1, wherein the length of the nanotubes is from 5 to 20 μm.
5. The metal nanotubes of claim 1, wherein the metal nanotubes have wall thickness of from 3 to 8 nm, outer diameter of from 30 to 80 nm, and length of from 5 to 30 μm.
6. The metal nanotubes of claim 1, wherein the metal nanotubes are formed by galvanic displacement of a metal nanowire $(M_2)NW$, where $M_2$=Ag or Cu.
7. The metal nanotubes of claim 6, wherein $M_2$=Ag.
8. The metal nanotubes of claim 6, wherein $M_2$=Cu.
9. A fuel cell comprising:
   at least one anode;
   at least one cathode;
   an electrolyte membrane between the at least one anode and at least one cathode; and
   a catalyst comprising the metal nanotubes as claimed in claim 1.
10. The fuel cell of claim 9, wherein the fuel cell is a proton exchange membrane fuel cell.
11. The fuel cell of claim 9, wherein the fuel cell is a hydroxyl exchange membrane fuel cell.

* * * * *